US010166973B2

United States Patent
Yang et al.

(10) Patent No.: US 10,166,973 B2
(45) Date of Patent: Jan. 1, 2019

(54) VEHICLE AND SHIFTING CONTROL METHOD AND POWER TRANSMISSION SYSTEM THEREOF

(71) Applicant: BYD COMPANY LIMITED, Shenzhen, Guangdong (CN)

(72) Inventors: Dongsheng Yang, Guangdong (CN); Yubo Lian, Guangdong (CN); Jintao Zhang, Guangdong (CN); Hongbin Luo, Guangdong (CN)

(73) Assignee: BYD Company Limited, Shenzhen (CN)

(*) Notice: Subject to any disclaimer, the term of this patent is extended or adjusted under 35 U.S.C. 154(b) by 106 days.

(21) Appl. No.: 15/230,992

(22) Filed: Aug. 8, 2016

(65) Prior Publication Data

US 2016/0339907 A1    Nov. 24, 2016

Related U.S. Application Data

(63) Continuation-in-part of application No. 14/644,740, filed on Mar. 11, 2015, now Pat. No. 9,421,966.

(30) Foreign Application Priority Data

Oct. 20, 2014  (CN) .......................... 2014 1 0559860

(51) Int. Cl.
*B60L 9/00* (2006.01)
*B60W 20/30* (2016.01)
(Continued)

(52) U.S. Cl.
CPC ............. *B60W 20/30* (2013.01); *B60K 6/547* (2013.01); *B60W 10/02* (2013.01); *B60W 10/06* (2013.01);
(Continued)

(58) Field of Classification Search
CPC ........ B60W 20/30; B60W 10/02; B60K 6/547
See application file for complete search history.

(56) References Cited

U.S. PATENT DOCUMENTS

| 4,132,133 A | 1/1979 | Ballendux |
| 4,676,115 A | 6/1987 | Morscheck et al. |

(Continued)

FOREIGN PATENT DOCUMENTS

| CN | 102166962 | 8/2011 |
| CN | 102343824 | 2/2012 |

(Continued)

OTHER PUBLICATIONS

Non-Final Office Action for U.S. Appl. No. 14/527,522, dated Aug. 7, 2017, 11 pages.

(Continued)

*Primary Examiner* — Adam M Alharbi
(74) *Attorney, Agent, or Firm* — Sheppard Mullin Richter & Hampton LLP

(57) ABSTRACT

The present disclosure discloses a shifting control method for a hybrid vehicle. The shifting control method includes: detecting operating parameters of the hybrid vehicle, where the operating parameters of the hybrid vehicle includes vehicle speed, vehicle acceleration as reflected from an accelerator-pedal signal and a current gear of the hybrid vehicle; determining a work mode of the hybrid vehicle; performing speed adjustment and shifting control to the first motor-generator according to a work mode and the operating parameters of the hybrid vehicle to implement shifting control of the hybrid vehicle, where the work mode includes an electric-vehicle mode and a hybrid-electric-vehicle mode. The method considers performing speed adjustment and shifting control under various working conditions. This improves smoothness and comfort of the vehicle and enlarges the use scope. The present disclosure further dis- (Continued)

closes a power transmission system of a hybrid vehicle and a hybrid vehicle.

16 Claims, 30 Drawing Sheets

(51) Int. Cl.
*B60W 10/02* (2006.01)
*B60W 10/06* (2006.01)
*B60W 10/08* (2006.01)
*B60W 10/113* (2012.01)
*B60W 10/11* (2012.01)
*B60W 30/19* (2012.01)
*F16H 3/00* (2006.01)
*B60K 6/547* (2007.10)
*B60W 20/40* (2016.01)
*B60W 20/20* (2016.01)
*B60W 50/00* (2006.01)
*B60K 6/48* (2007.10)

(52) U.S. Cl.
CPC ............ *B60W 10/08* (2013.01); *B60W 10/11* (2013.01); *B60W 10/113* (2013.01); *B60W 20/20* (2013.01); *B60W 20/40* (2013.01); *B60W 30/19* (2013.01); *F16H 3/006* (2013.01); *B60K 2006/4808* (2013.01); *B60W 2050/0011* (2013.01); *B60W 2510/081* (2013.01); *B60W 2510/1005* (2013.01); *B60W 2520/04* (2013.01); *B60W 2520/10* (2013.01); *B60W 2520/105* (2013.01); *B60W 2540/10* (2013.01); *B60W 2540/12* (2013.01); *B60W 2540/16* (2013.01); *B60W 2710/021* (2013.01); *B60W 2710/0644* (2013.01); *B60W 2710/081* (2013.01); *B60W 2710/083* (2013.01); *B60W 2710/1005* (2013.01); *B60W 2720/10* (2013.01); *B60W 2720/106* (2013.01); *Y02T 10/626* (2013.01); *Y02T 10/6286* (2013.01); *Y10S 903/902* (2013.01)

(56) References Cited

U.S. PATENT DOCUMENTS

| | | | |
|---|---|---|---|
| 5,081,365 A | 1/1992 | Field et al. |
| 5,586,613 A | 12/1996 | Ehsani |
| 5,890,392 A | 4/1999 | Ludanek et al. |
| 6,120,115 A | 9/2000 | Kouta et al. |
| 6,364,434 B1 | 2/2002 | Min et al. |
| 6,634,247 B2 | 10/2003 | Pels |
| 7,296,648 B2 | 11/2007 | Tatara et al. |
| 7,383,749 B2 | 6/2008 | Schafer et al. |
| 7,395,889 B2 | 7/2008 | Sugiyama et al. |
| 7,428,852 B2 | 9/2008 | Baldwin et al. |
| 7,437,966 B2 | 10/2008 | Maillard et al. |
| 7,730,982 B2 | 6/2010 | Hidaka et al. |
| 7,987,739 B2 | 8/2011 | Okadome et al. |
| 8,297,141 B2 | 10/2012 | Cimatti |
| 8,505,400 B2 | 8/2013 | Mellet et al. |
| 8,523,734 B2 | 9/2013 | Mepham et al. |
| 8,579,059 B2 | 11/2013 | Teraya |
| 8,608,615 B2 | 12/2013 | Fuechtner et al. |
| 8,887,588 B2 | 11/2014 | Koyama et al. |
| 8,931,371 B2 | 1/2015 | Xie et al. |
| 9,145,951 B2 | 3/2015 | Ho et al. |
| 9,003,907 B2 | 4/2015 | Weller et al. |
| 9,341,239 B2 | 5/2016 | Lee et al. |
| 9,568,066 B2 | 2/2017 | Yang et al. |
| 2002/0177504 A1 | 11/2002 | Pels et al. |
| 2003/0184147 A1 | 10/2003 | Perach |
| 2005/0139035 A1 | 6/2005 | Lee et al. |
| 2006/0048516 A1 | 3/2006 | Tenbrock et al. |
| 2006/0175103 A1 | 8/2006 | Iida et al. |
| 2007/0028718 A1 | 2/2007 | Lee et al. |
| 2007/0102211 A1 | 5/2007 | Nozaki et al. |
| 2007/0266810 A1 | 11/2007 | Forsyth |
| 2007/0272457 A1 | 11/2007 | Kodama et al. |
| 2008/0099305 A1 | 5/2008 | Ogasawara |
| 2008/0134819 A1 | 6/2008 | Kapp et al. |
| 2008/0202267 A1 | 8/2008 | Hendrickson et al. |
| 2008/0234914 A1* | 9/2008 | Tabata ............... B60K 6/365 701/99 |
| 2009/0145673 A1 | 6/2009 | Soliman et al. |
| 2010/0076657 A1 | 3/2010 | Jinno et al. |
| 2010/0320016 A1 | 12/2010 | Wang et al. |
| 2011/0098151 A1 | 4/2011 | Ziemer |
| 2011/0113923 A1 | 5/2011 | Pesola et al. |
| 2011/0245033 A1 | 10/2011 | Sato et al. |
| 2011/0265601 A1 | 11/2011 | Pastorello et al. |
| 2012/0053011 A1 | 3/2012 | Onomura et al. |
| 2012/0160044 A1 | 6/2012 | Kahl |
| 2012/0245781 A1 | 9/2012 | Kanamori et al. |
| 2012/0303201 A1 | 11/2012 | Tsuneishi et al. |
| 2012/0310461 A1 | 12/2012 | Maruyama et al. |
| 2012/0325048 A1 | 12/2012 | Raisch |
| 2012/0325573 A1 | 12/2012 | Miller |
| 2013/0090202 A1 | 4/2013 | Hiraiwa |
| 2013/0096749 A1 | 4/2013 | Hussain et al. |
| 2013/0096784 A1 | 4/2013 | Kohler et al. |
| 2013/0105253 A1* | 5/2013 | Kim ................ F16D 55/226 188/72.1 |
| 2013/0166118 A1 | 6/2013 | Kim |
| 2014/0128205 A1 | 5/2014 | Phillips et al. |
| 2015/0167786 A1 | 6/2015 | Kim |
| 2015/0167803 A1 | 6/2015 | Lee et al. |
| 2015/0291154 A1 | 10/2015 | Kaltenbach et al. |
| 2015/0336568 A1* | 11/2015 | Porras ............... B60W 20/00 701/22 |
| 2016/0084351 A1 | 3/2016 | Lee et al. |
| 2016/0298733 A1 | 10/2016 | Helmut et al. |

FOREIGN PATENT DOCUMENTS

| | | |
|---|---|---|
| CN | 102381178 | 3/2012 |
| CN | 102717714 | 10/2012 |
| CN | 202641405 | 1/2013 |
| DE | 10239540 | 3/2004 |
| DE | 102008002381 | 12/2009 |
| DE | 102011086743 | 5/2013 |
| DE | 102011089467 | 6/2013 |
| DE | 102012222122 A1 | 6/2014 |
| EP | 1375241 | 2/2004 |
| EP | 1555184 | 7/2005 |
| EP | 1979185 | 10/2008 |
| EP | 1990229 A2 | 12/2008 |
| EP | 2080682 | 7/2009 |
| EP | 2133252 | 12/2009 |
| EP | 2390127 | 11/2011 |
| EP | 2460704 | 6/2012 |
| EP | 2631103 | 8/2013 |
| EP | 2636554 | 9/2013 |
| EP | 2636566 | 9/2013 |
| EP | 2636567 | 9/2013 |
| EP | 2995477 | 3/2016 |
| EP | 2995487 | 3/2016 |
| JP | H0993714 | 4/1997 |
| JP | 2001157305 | 6/2001 |
| JP | 2001191814 | 7/2001 |
| JP | 2005133682 | 5/2005 |
| JP | 2010070188 A | 4/2010 |
| JP | 2010076761 A | 4/2010 |
| JP | 2010179789 | 8/2010 |
| JP | 2010281237 | 12/2010 |
| JP | 2012086701 | 5/2012 |
| JP | 2013199909 | 10/2013 |
| KR | 101339264 | 12/2013 |
| WO | 9921263 | 4/1999 |
| WO | 2010054210 | 5/2010 |
| WO | 2011138308 | 11/2011 |

(56) References Cited

FOREIGN PATENT DOCUMENTS

| WO | 2012152613 | 11/2012 |
|---|---|---|
| WO | 2015032346 | 3/2015 |

OTHER PUBLICATIONS

Final Office Action for U.S. Appl. No. 14/755,540, dated Sep. 19, 2017, 10 pages.
Non-Final Office Action for U.S. Appl. No. 14/527,572, dated Aug. 23, 2017, 31 pages.
European Search Report dated Dec. 10, 2015, issued in related European Patent Application No. 15158696.3 (8 pages).
European Search Report dated Dec. 10, 2015, issued in related European Patent Application No. 15158701.1 (8 pages).
European Search Report dated Feb. 2, 2016, issued in related European Patent Application No. 15158686.4 (9 pages).
Extended European Search Report dated Jun. 29, 2016, issued in related European Patent Application No. 15158699.7 (8 pages).
Final Office Action dated Jun. 17, 2016, issued in related U.S. Appl. No. 14/527,600 (19 pages).
Final Office Action dated Jun. 28, 2016, issued in related U.S. Appl. No. 14/527,410 (21 pages).
Non-Final Office Action dated Jun. 2, 2016, issued in related U.S. Appl. No. 14/526,816 (8 pages).
Non-Final Office Action dated Mar. 7, 2016, issued in related U.S. Appl. No. 14/527,600 (11 pages).
Non-Final Office Action dated Mar. 8, 2016, issued in related U.S. Appl. No. 14/527,410 (21 pages).
Non-Final Office Action dated May 31, 2016, issued in related U.S. Appl. No. 14/527,446 (9 pages).
Non-Final Office Action dated May 5, 2016, issued in related U.S. Appl. No. 14/527,496 (8 pages).
Non-Final Office Action dated Sep. 24, 2015, issued in related U.S. Appl. No. 14/527,522 (17 pages).
Notice of Allowance dated Oct. 19, 2016, issued in related U.S. Appl. No. 14/527,446 (7 pages).
Final Office Action dated Oct. 20, 2016, issued in related U.S. Appl. No. 14/527,496 (8 pages).
Notice of Allowance dated Oct. 26, 2016, issued in related U.S. Appl. No. 14/527,600 (19 pages).
Notice of Allowance dated Nov. 1, 2016, issued in related U.S. Appl. No. 14/644,943 (8 pages).
Notice of Allowance dated Nov. 4, 2016, issued in related U.S. Appl. No. 14/527,496 (8 pages).
Notice of Allowance dated Nov. 4, 2016, issued in related U.S. Appl. No. 14/644,818 (7 pages).
European Search Report and Written Opinion for Application No. 14880411.5, dated Apr. 11, 2017, 12 pages.
European Search Report and Written Opinion for Application No. 14881104.5, dated May 5, 2017, 8 pages.
Non-Final Office Action for U.S. Appl. No. 14/527,410, dated Jan. 13, 2017, 23 pages.
Non-Final Office Action for U.S. Appl. No. 14/755,540, dated Jan. 26, 2017, 15 pages.
Non-Final Office Action for U.S. Appl. No. 14/755,695, dated May 4, 2017, 6 pages.
Non-Final Office Action for U.S. Appl. No. 14/755,775, dated May 10, 2017, 9 pages.
Non-Final Office Action for U.S. Appl. No. 14/755,629, dated May 17, 2017, 6 pages.
Non-Final Office Action for U.S. Appl. No. 14/644,881, dated May 19, 2017, 29 pages.
Final Office Action for U.S. Appl. No. 14/755,540, dated May 24, 2017, 11 pages.
Final Office Action for U.S. Appl. No. 14/527,410, dated Jun. 6, 2017, 26 pages.

* cited by examiner

VEHICLE AND SHIFTING CONTROL METHOD AND POWER TRANSMISSION SYSTEM THEREOF

CROSS-REFERENCE TO RELATED APPLICATION

This application is a continuation-in-part application of U.S. application Ser. No. 14/644,740, entitled Hybrid Vehicle and Shifting Control Method and Power Transmission System Thereof, filed on Mar. 11, 2015, which claims priority to and benefits of Chinese Patent Application Serial No. 201410559860.9, filed with the State Intellectual Property Office of P. R. China on Oct. 20, 2014. The entire contents of the above-referenced applications are incorporated herein by reference.

FIELD

Embodiments of the present disclosure relate to vehicle technologies, and more particularly, a power transmission system of a vehicle, a shifting control method for the power transmission system, and a vehicle including the power transmission system and the control method thereof.

BACKGROUND

A shifting control method for a hybrid vehicle having an AMT (automatic mechanical transmission) is provided in a related art, which typically includes the following steps. First, an HCU (hybrid control unit) determines whether shifting control information have been received from a TCU (transmission control unit). Second, when HCU receives the shifting control information from TCU, HCU sends instructions to a motor and an engine simultaneously to reduce their torque to zero respectively. Third, when the torque of the motor and the engine is reduced to zero, TCU controls a synchronizer to move to a neutral position. Fourth, when TCU controls the synchronizer to move to the neutral position, HCU sends an instruction to the motor to generate reverse torque to perform speed adjustment, and when the torque of the motor is zero, TCU controls the synchronizer to move to a preset gear and lock.

The above shifting control method has the following disadvantage: switching of modes (for example, between an electric-vehicle mode and a hybrid-electric-vehicle mode) is lacking, and only a single controlling mode is provided; therefore, driving requirements of different modes cannot be satisfied, while fuel economy is low.

SUMMARY

The present disclosure aims to solve one of the technical problems at least to some extent. Therefore, it is an objective of the present disclosure to provide a shifting control method for a vehicle. The method considers motor speed adjustment and shifting control under various working conditions, thereby making the use scope wider. This improves smoothness and comfort of the vehicle and enlarges use scope.

It is a second objective of the present disclosure to provide a power transmission system of a vehicle.

It is a third objective of the present disclosure to provide a vehicle.

In order to implement the above objective, a first-aspect embodiment of the present disclosure provides a shifting control method for a hybrid vehicle including a power transmission system. The power transmission system includes an engine, a number of input shafts, a number of output shafts, a motor shaft and a first motor-generator. The engine is configured to selectively couple with at least one of the input shafts. A gear driving gear is set on each of the input shafts. A gear driven gear set is on each of the output shafts. The gear driven gear meshes with the gear driving gear correspondingly. The motor shaft is configured to rotate together with one of the input shafts. The first motor-generator is configured to rotate together with the motor shaft. The shifting control method includes following steps: detecting operating parameters of the hybrid vehicle, wherein the operating parameters of the hybrid vehicle includes vehicle speed, vehicle acceleration as reflected from an accelerator-pedal signal and a current gear of the hybrid vehicle; determining a work mode of the hybrid vehicle; performing speed adjustment and shifting control to the first motor-generator according to a work mode and the operating parameters of the hybrid vehicle to implement shifting control of the hybrid vehicle, wherein the work mode includes an electric-vehicle mode and a hybrid-electric-vehicle mode.

The shifting control method for the vehicle, according to embodiments of the present disclosure, detects operating parameters of the vehicle, determines work mode of the hybrid vehicle, then performs speed adjustment and shifting control to the first motor-generator according to work mode and the operating parameters of the hybrid vehicle to implement shifting control of the hybrid vehicle. The method includes various working conditions for performing speed adjustment and shifting control to the first motor-generator, for example speed adjustment and shifting control when upshifting/downshifting under the EV mode, speed adjustment and shifting control when upshifting/downshifting under the HEV mode, speed adjustment and shifting control when upshifting/downshifting under switching from the EV mode to the HEV mode, speed adjustment and shifting control when generating electric power in place to moving at gear D. This improves smoothness and comfort of the vehicle. The method considers a lot of working conditions, thereby making the use scope wider.

In order to implement the above objective, a power transmission system of a hybrid vehicle of a second-aspect embodiment of the present disclosure, includes: an engine; a number of input shafts, the engine being configured to selectively couple with at least one of the input shafts, a gear driving gear being set on each of the input shafts; a number of output shafts, a gear driven gear being set on each of the output shafts, the gear driven gear meshing with the gear driving gear correspondingly; a motor shaft, the motor shaft being configured to rotate together with one of the input shafts; a first motor-generator, the first motor-generator being configured to rotate together with the motor shaft; a detecting module configured to detect operating parameters of the hybrid vehicle, where the operating parameters of the hybrid vehicle includes vehicle speed, vehicle acceleration as reflected from an accelerator-pedal signal and a current gear of the hybrid vehicle; an electromotor controller configured to determine a work mode of the hybrid vehicle, and perform speed adjustment and shifting control to the first motor-generator according to a work mode and the operating parameters of the hybrid vehicle to implement shifting control of the hybrid vehicle, where the work mode includes an electric-vehicle mode and a hybrid-electric-vehicle mode.

According to the power transmission system of the hybrid vehicle of embodiments of the present disclosure, the detecting module detects operating parameters of the hybrid vehicle. The electromotor controller determines a work mode of the hybrid vehicle, then performs speed adjustment and shifting control to the first motor-generator according to work mode and the operating parameters of the hybrid vehicle to implement shifting control of the hybrid vehicle. The system includes various working conditions for performing speed adjustment and shifting control to the first motor-generator, for example speed adjustment and shifting control when upshifting/downshifting under the EV mode, speed adjustment and shifting control when upshifting/downshifting under the HEV mode, speed adjustment and shifting control when upshifting/downshifting under switching from the EV mode to the HEV mode, speed adjustment and shifting control when generating electric power in place to moving at gear D. This improves smoothness and comfort of the vehicle. The system considers a lot of working conditions, thereby making the use scope wider.

In order to implement the above objective, a vehicle of a third-aspect embodiment of the present disclosure includes the power transmission system of the hybrid vehicle of the second-aspect embodiment of the present disclosure.

Because the hybrid vehicle of embodiments of the present disclosure has the power transmission system of the hybrid vehicle, and considers performing speed adjustment and shifting control under various working conditions. This improves smoothness and comfort of the vehicle and enlarges the use scope.

DETAILED DESCRIPTION

Figure 1:
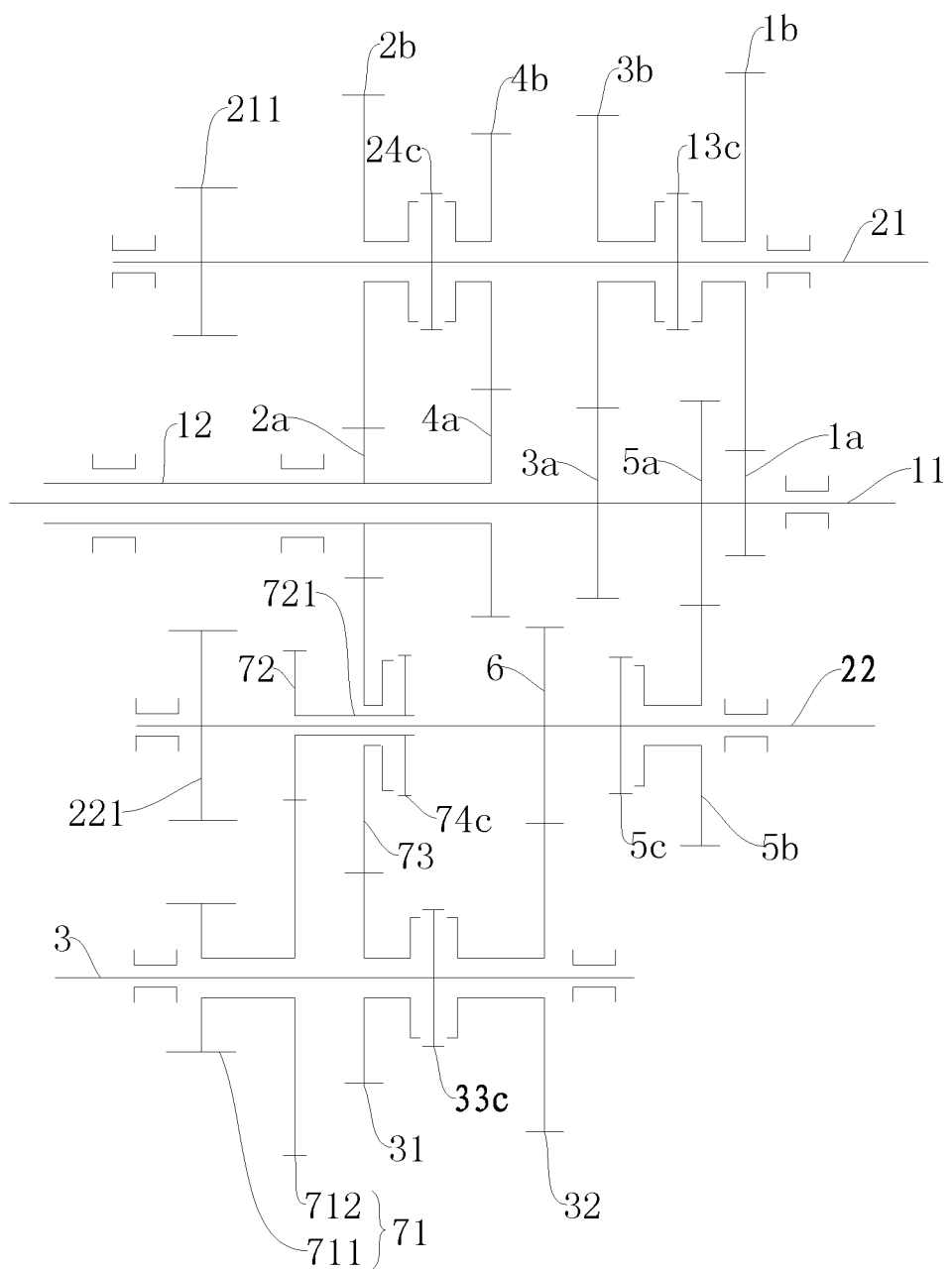
FIG. 1 is a schematic view of an exemplary transmission system according to one embodiment of the present disclosure.

Embodiments of the present disclosure will be described in detail in the following descriptions, examples of which are shown in the accompanying drawings, in which the same or similar elements and elements having same or similar functions are denoted by like reference numerals throughout the descriptions. The embodiments described herein with reference to the accompanying drawings are explanatory and illustrative, which are used to generally understand the present disclosure. The embodiments shall not be construed to limit the present disclosure.

Figure 4:
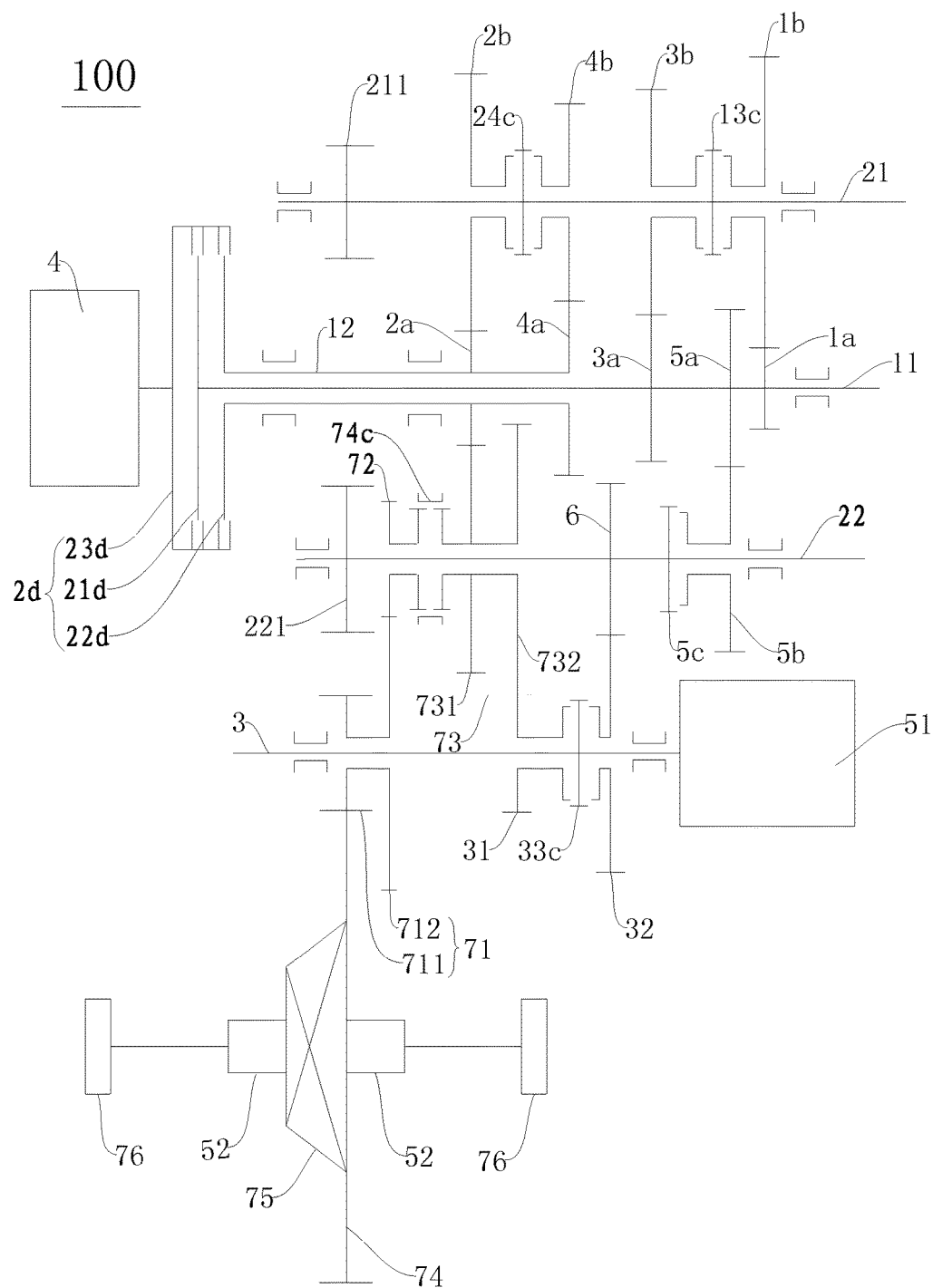
FIG. 4 is a schematic view of an exemplary power transmission system according to further embodiment of the present disclosure.

Referring to FIG. 1 and FIG. 4, a power transmission system 100, according to an embodiment of the present disclosure, is described in detail. The power transmission system 100 is suitable for a vehicle, for example a hybrid vehicle and is used for a power system of the vehicle and provides enough driving power and electric power for normal movement of the vehicle.

The power transmission system 100, according to embodiments of the present disclosure, may include a plurality of input shafts, a gear driving gear on each of the input shafts, a plurality of output shafts, a gear driven gear on each of the output shafts. The gear driven gear meshes with the gear driving gear correspondingly. The system may further includes a motor shaft configured to rotate together with one of the input shafts, a first motor-generator configured to rotate together with the motor shaft, and a detecting module configured to detect operating parameters of the vehicle. The vehicle may further include an electromotor controller configured to perform speed adjustment and shifting control to the first motor-generator according to operating parameters of the vehicle to implement shifting control of the vehicle. The operating parameters of the vehicle may include a vehicle speed, vehicle acceleration as reflected from an accelerator-pedal signal and a current gear of the vehicle.

The power transmission system 100, according to embodiments of the present disclosure, mainly includes two parts: one can be a power source, which may be an engine 4, a motor-generator, etc; another can be a transmission (as shown in FIG. 1), and the transmission is used for implementing shifting function of power outputted by the power source, which satisfies with moving requirement or charging requirement of the vehicle.

Figure 2:
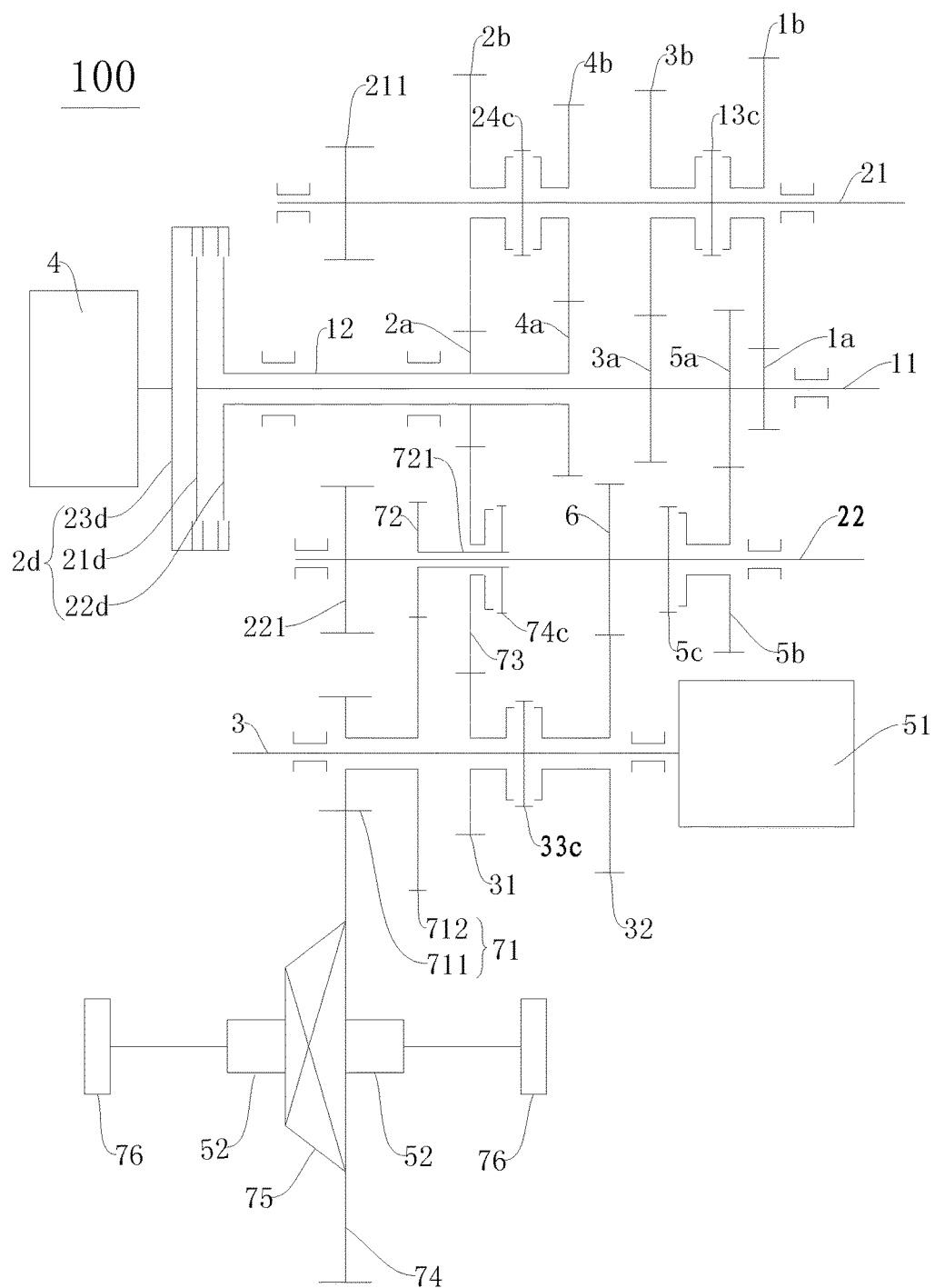
FIG. 2 is a schematic view of an exemplary power transmission system according to one embodiment of the present disclosure.
Figure 3:
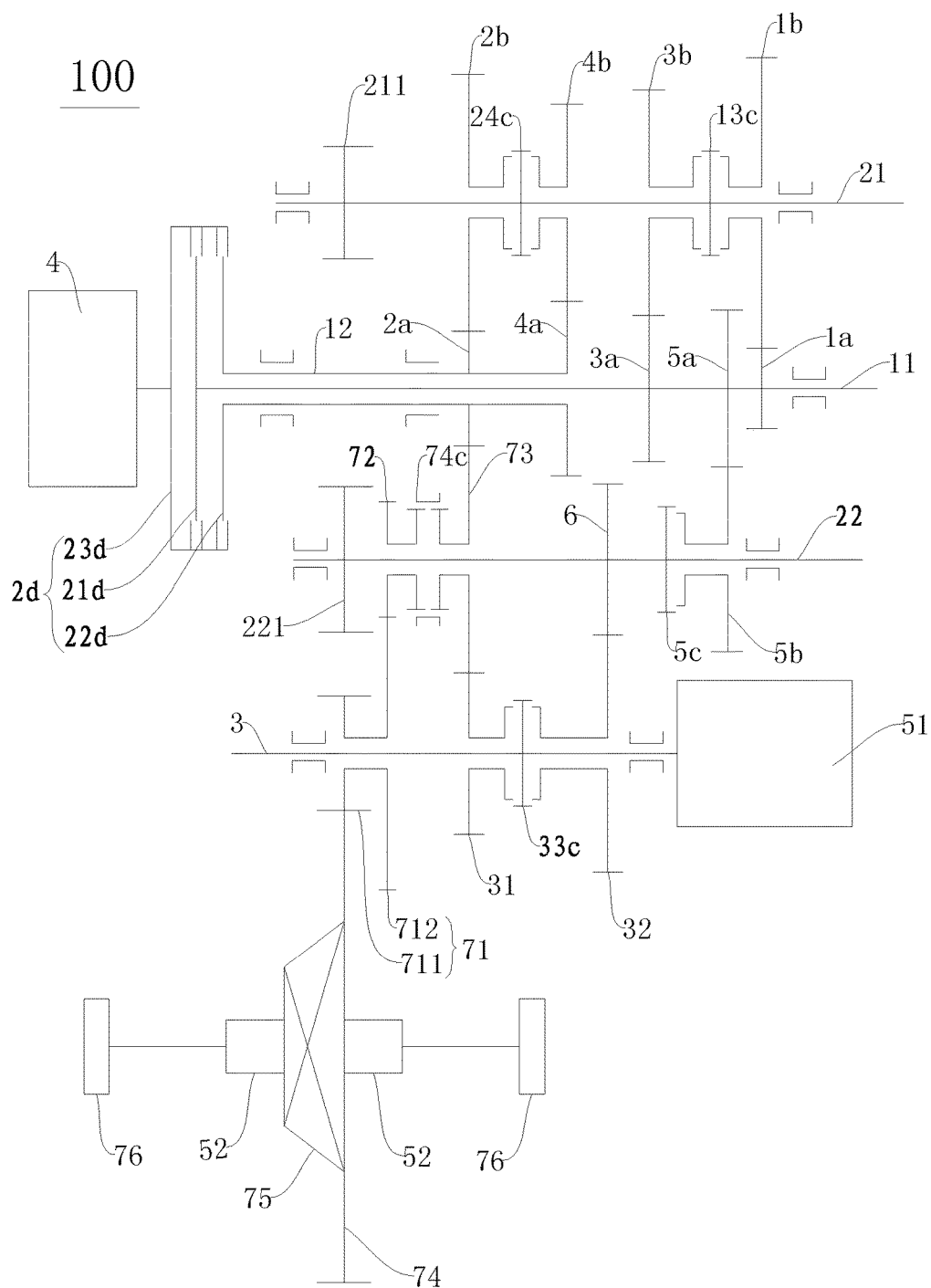
FIG. 3 is a schematic view of an exemplary power transmission system according to another embodiment of the present disclosure.

For example, in some embodiments, as show in FIG. 2 to FIG. 4, the power transmission system 100 can include, but is not limited to, an engine 4, a first motor-generator 51 and a transmission system.

For speaking of the engine 4, it uses mixture of liquid fuel (for example gasoline, diesel oil, etc.) and air directly inputted to a combustion chamber to be burnt to generate energy and then transforms it into mechanical energy. Generally, the engine 4 can include a housing assembly, a crank mechanism, an air distributing mechanism, a supply system, an ignition system, a cooling system and a lubrication system, etc. The housing assembly is an assembly body for every mechanism, system of the engine 4. The crank mechanism is configured to change a linear reciprocating motion of a piston into a rotational motion of a crankshaft and to output driving power. The air distributing mechanism is configured to introduce air and eject air on time, which ensures smooth cycles of the engine 4. The supple system is configured to supply mixture of gas and air into a cylinder to be burnt. The cooling system is configured to cool the engine 4, which ensures that work temperature of the engine 4 is in a proper temperature range. The lubrication system is configured to lubricate every movement inside the engine 4, which reduces wear and energy loss.

It is understood that, specific structures and work principles of each sub system, sub mechanism of the engine 4 and the engine 4 are available technologies and known by those skilled in the art. For conciseness, they are not described in detail one by one here.

Referring to FIG. 1, in some embodiments, the transmission system includes a number of input shafts (for example, a first input shaft 11, a second input shaft 12), a number of output shafts (for example, a first output shaft 21, a second output shaft 22), and a motor shaft 3 and related gears and shifting elements (for example, synchronizers) on each shaft.

When driving power is transferred between the engine 4 and the input shaft, the engine 4 is configured to selectively couple with at least one of the input shafts. For example, when the engine 4 transfers the driving power to the input shaft, the engine 4 can couple with one of the input shafts to transfer the driving power, or the engine 4 also can couple with two or more of the input shafts simultaneously to transfer the driving power.

For example, in examples of FIG. 1 to FIG. 4, a number of input shafts can include two input shafts: a first input shaft 11 and a second input shaft 12. In some embodiments, the motor-generator can selectively couple with either the first input shaft 11 or the second input shaft 12 and the motor-generator can also couple with the first input shaft 11 and the second input shaft 12 simultaneously. In some embodiments, the engine 4 can selectively couple with either the first input shaft 11 or the second input shaft 12. In some embodiments, the engine 4 can also couple with the first input shaft 11 and the second input shaft 12 simultaneously. The engine 4 also can uncouple from the first input shaft 11 and the second input shaft 12.

For those skilled in the art, it will be understood that the coupling state of the engine 4 and the input shaft is related to specific working conditions of the power transmission system 100. Detailed descriptions incorporated with specific embodiments will follow and are not mentioned here.

Gear pairs can be used between the input shafts and the output shafts to transfer the driving power. For example, a gear driving gear is set on each input shaft, and a gear driven gear is set on each output shaft. The gear driven gear meshes with the gear driving gear correspondingly, thereby forming a number of gear pairs having different speed ratios.

In some embodiments of the present disclosure, the transmission system can be a five-forward-gear transmission and can include: a gear-one gear pair, a gear-two gear pair, a gear-three gear pair, a gear-four gear pair and a gear-five gear pair. However, the present disclosure is not limited to this, and for those skilled in the art, number of gear pair can be increased or reduced according to a transmission requirement and is not limited to the five-gear transmission shown in embodiments of the present disclosure.

As shown in FIG. 1 to FIG. 4, the motor shaft 3 is configured to rotate together with one of the input shafts (for example, the second input shaft 12). In some embodiments, when the driving power from the input shaft is to be transferred to the motor shaft 3, the motor shaft 3 rotates together with the input shaft to transfer the driving power. In some embodiments, when the driving power from the motor shaft 3 is to be transferred to the input shaft, the input shaft rotates together with the motor shaft 3 to transfer the driving power.

Generally, when the vehicle having the power transmission system 100, according to embodiments of the present disclosure, is under some sort of working conditions (specific working conditions will be described in detail with specific embodiments), and the driving power is to be transferred between the motor shaft 3 and the input shaft, the input shaft is configured to rotate together with the motor shaft 3.

In some embodiments that a gear rotates together with a shaft, i.e. when the gear rotates, the relative shaft rotates correspondingly; alternatively, when the shaft rotates, the relative gear rotates correspondingly.

In some embodiments that one shaft rotates together with the other one shaft, i.e. when the one shaft rotates, the other one shaft rotates correspondingly.

In some embodiments that one gear rotate together with the other one gear, i.e. when the one gear rotates, the other one gear rotates correspondingly.

In some embodiments, the first motor-generator 51 is configured to rotate together with the motor shaft 3. For example, when used as an electric motor, the driving power generated by the first motor-generator 51 can be outputted to the motor shaft 3. When the first motor-generator 51 is used as an electric-power generator, the driving power from the motor shaft 3 can also be outputted to the first motor-generator to drive the first motor-generator 51 to generate electric power.

It is noted that, unless specifically stated otherwise, the motor-generator can be understood to be a motor having functions of an electric-power generator and an electric motor.

As stated above, the motor shaft 3 can rotate together with one of the input shafts. Particularly, when the motor shaft 3 rotates together with one of the input shafts, the first motor-generator 51 can use at least parts of the driving power outputted by the engine 4 to generate electric power when the vehicle moves and is parked.

In other words, when the vehicle is at a moving state and the motor shaft 3 rotates together with one of the input shafts, at least parts of the driving power of the engine 4 are outputted to the first motor-generator 51 through the motor shaft 3, thereby driving the first motor-generator 51 to generate electric power and achieving a driving-while-charging working condition of the engine 4. When the vehicle is at a parked state (e.g., when the vehicle stops but the engine 4 is still in a work state) and the motor shaft 3 rotates together with one of the input shafts, at least parts of the driving power of the engine 4 are outputted to the first motor-generator 51 through the motor shaft 3, thereby driving the first motor-generator 51 to generate electric power and achieving a parked-and-charging function (i.e., "stop" and charging).

Further, the motor shaft 3 is configured to rotate together with one of the output shafts (e.g., the second output shaft 22). For example, when the driving power from the motor shaft 3 is to be transferred to the output shaft, the motor shaft 3 can rotate together with the output shaft to transfer the driving power. Particularly, when the motor shaft 3 rotates together with the one of the output shafts, the first motor-generator 51 can output the driving power generated through the one of the output shafts, thereby driving the vehicle to move. For example, when the motor shaft 3 rotates together with the output shaft, the first motor-generator 51 can be used as an electric motor and output the driving power to drive the vehicle to move.

It is noted that, in the descriptions of the present disclosure, the motor shaft 3 can be a motor shaft of the first motor-generator 51 itself. It is also understood that the motor shaft 3 and the motor shaft of the first motor-generator 51 can be two independent shafts.

Therefore, the power transmission system 100, according to embodiments of the present disclosure, can achieve the charging function when the vehicle moves and is parked, thereby adding different charging modes and improves the low charging efficiency of current power transmission system which allows a single charging mode. For example, the power transmission system 100, according to embodiments of the present disclosure, allows two kinds of charging modes: moving-and-charging, and parked-and-charging.

Referring to FIG. 1 to FIG. 4, detailed descriptions with specific embodiments are made to specific configurations of the transmission system.

Firstly, detailed descriptions are made to a motor shaft synchronizer 33c, a first motor shaft gear 31 and a second motor shaft gear 32 on the motor shaft 3.

Specifically, the first motor shaft gear 31 and the second motor shaft gear 32 are sleeved on the motor shaft 3, i.e., the motor shaft 3 and the first motor shaft gear 31 can rotate at different speeds. Similarly, the motor shaft 3 and the second motor shaft gear 32 can rotate at different speeds.

As shown in FIG. 1 to FIG. 4, the first motor shaft gear 31 is configured to rotate together with the one of the input shafts. The second motor shaft gear 32 is configured to rotate together with the one of the output shafts. In some embodiments of FIG. 1 to FIG. 4, the first motor shaft gear 31 is rotating together with the second input shaft 12, and the second motor shaft gear 32 is rotating together with the second output shaft 22, but the present disclosure is not limited to these.

Further, the motor shaft synchronizer 33c is set between the first motor shaft gear 31 and the second motor shaft gear 32. A coupling sleeve of the motor shaft synchronizer 33c can move along an axial direction of the motor shaft 3. For example, in the examples of FIG. 1 to FIG. 4, the coupling sleeve of the motor shaft synchronizer 33c can move left or right along the axial direction of the motor shaft 3 under the drive of a fork mechanism.

Because the motor shaft synchronizer 33c is set between the first motor shaft gear 31 and the second motor shaft gear 32, the motor shaft synchronizer 33c is configured to selectively couple one of the first motor shaft gear 31 or the second motor shaft gear 32 with the motor shaft 3.

Together with the examples of FIG. 1 to FIG. 4, the coupling sleeve of the motor shaft synchronizer 33c moves left along the axial direction and can couple the first motor shaft gear 31 with the motor shaft 3, enabling the motor shaft 3 and the first motor shaft gear 31 to rotate synchronously. The coupling sleeve of the motor shaft synchronizer 33c moves right along the axial direction and can couple the second motor shaft gear 32 with the motor shaft 3, enabling the motor shaft 3 and the second motor shaft gear 32 to rotate synchronously.

It is understood that, the coupling sleeve of the motor shaft synchronizer 33c also can stay in a middle position (for example, an initial position). What that happens, the motor shaft synchronizer 33c uncouples from the first motor shaft gear 31 and the second motor shaft 32.

In addition, those skilled in the art will understand that in order to facilitate coupling between the first motor shaft gear 31, the second motor shaft gear 32 and the motor shaft synchronizer 33c, coupling teeth rings can be set on sides of the first motor shaft gear 31 and the second motor shaft gear 32 facing the motor shaft synchronizer 33c.

Therefore, the motor shaft 3 is configured to selectively rotate together with the one of the input shafts or the one of the output shafts through synchronization of the motor shaft synchronizer 33c (i.e., synchronization for the first motor shaft gear 31 or the second motor shaft gear 32). Specifically, the motor shaft synchronizer 33c can perform synchronization for the first motor shaft gear 31 by, for example, coupling the first motor shaft gear 31 with the motor shaft 3, thereby allowing the motor shaft 3 to rotate together with the one of the input shafts (e.g., the second input shaft 12). In some examples, the motor shaft synchronizer 33c can perform synchronization for the second motor shaft gear 32 by, for example, coupling the second motor shaft gear 32 with the motor shaft 3, thereby allowing the motor shaft 3 to rotate together with the one of the output shafts (e.g., the second output shaft 22).

Following are descriptions made together with figures to a reverse-gear structure of the power transmission system 100, according to embodiments of the present disclosure.

As stated above, the first motor shaft gear 31 rotates together with the one of the input shafts. In some illustrative embodiments of the present disclosure, the first motor shaft gear 31 engages directly or indirectly with a driving gear on the one of the input shafts, thereby achieving rotating together with the input shaft. For example, in the examples of FIG. 1 to FIG. 4, the first motor shaft gear 31 engages with a corresponding driving gear, for example a gear-two driving gear 2a, through an intermediate idler gear 73. In other words, the intermediate idler gear 73 meshes with the corresponding driving gear and the first motor shaft gear 31.

Further, a reverse gear 71 is sleeved on the motor shaft 3, a reverse intermediate gear 72 meshes with the reverse gear 71. The reverse intermediate gear 72 is configured to selectively rotate together with the intermediate idler gear 73. Referring to the embodiments of FIG. 1 to FIG. 4, the reverse intermediate gear 72 is sleeved on the second output shaft 22, and can rotate at different speeds with the intermediate idler gear 73 and, when necessary, can couple with each other to rotate synchronously.

Furthermore, the intermediate idler gear 73 and the reverse intermediate gear 72 can rotate together with each other through a reverse-gear synchronizer 74c by, for example, including the reverse-gear synchronizer 74c configured to synchronize the reverse intermediate gear 72 and the intermediate idler gear 73.

Detail descriptions are made, together with FIG. 1 to FIG. 4, to input shafts, output shafts and gears, according to embodiments of the present disclosure.

In some embodiments of the present disclosure, as shown in FIG. 1 to FIG. 4, number of the input shaft can be two, i.e., the input shafts include a first input shaft 11 and a second input shaft 12. The second input shaft 12 can be a hollow shaft and the first input shaft 11 can be a solid shaft. One part of the first input shaft 11 can be embedded into the second input shaft 12, and another part of the first input shaft 11 can extend outwards from the second input shaft 12 along an axial direction. The first input shaft 11 and the second input shaft 12 can be set coaxially.

Number of the output shaft can be two, i.e., a first output shaft 21 and a second output shaft 22. The first output shaft 21 and the second output shaft 22 are set in parallel with the input shafts. The first output shaft 21 and the second output shaft 22 can be solid shafts.

The power transmission system 100, according to embodiments of the present disclosure, can have five forward gears. Specifically, gear driving gears of odd number can be set on the first input shaft 11 and gear driving gears of even number can be set on the second input shaft 12. Therefore, the first input shaft 11 is responsible for power transmission of odd-gear gear pairs and the second input shaft 12 is responsible for power transmission of even-gear gear pairs.

More specifically, as shown in FIG. 1 to FIG. 4, a gear-one driving gear 1a, a gear-three driving gear 3a and a gear-five driving gear 5a can be set on the first input shaft 11. A gear-two driving gear 2a and a gear-four driving gear 4a can be set on the second input shaft 12. Each gear driving gear rotates synchronously as the corresponding input shaft rotates.

Correspondingly, a gear-one driven gear 1b, a gear-two driven gear 2b, a gear-three driven gear 3b and a gear-four driven gear 4b are set on the first output shaft 21. A gear-five driven gear 5b is set on the second output shaft 22. Each driven gear is sleeved on the corresponding output shaft, i.e., each driven gear can rotate at a different speed compared with the corresponding output shaft.

The gear-one driven gear 1b meshes with the gear-one driving gear 1a to cooperatively form a gear-one gear pair. The gear-two driven gear 2b meshes with the gear-two driving gear 2a to cooperatively form a gear-two gear pair. The gear-three driven gear 3b meshes with the gear-three driving gear 3a to cooperatively form a gear-three gear pair. The gear-four driven gear 4b meshes with the gear-four driving gear 4a to cooperatively form a gear-four gear pair. The gear-five driven gear 5b meshes with the gear-five driving gear 5a to cooperatively form a gear-five gear pair.

Because of an empty sleeve structure between the driven gear and the output shaft, a synchronizer is needed to synchronize the corresponding driven gear and the output shaft, thereby achieving output of the driving power.

In some embodiments, as shown in FIG. 1 to FIG. 4, the power transmission system 100 includes a gear-one-three synchronizer 13c, a gear-two-four synchronizer 24c and a gear-five synchronizer 5c.

As shown in FIG. 1, the gear-one-three synchronizer 13c is set on the first output shaft 21 and between the gear-one driven gear 1b and the gear-three driven gear 3b. The gear-one-three synchronizer 13c can couple the gear-one driven gear 1b or the gear-three driven gear 3b with the first input shaft 11, enabling the driven gear to rotate synchronously with the output shaft.

For example, as shown in FIG. 1, a coupling sleeve of the gear-one-three synchronizer 13c moves left to couple the gear-three driven gear 3b with the first input shaft 11, enabling the gear-three driven gear 3b and the first output shaft 21 to rotate synchronously. The coupling sleeve of the gear-one-three synchronizer 13c moves right to couple the gear-one driven gear 1b with the first input shaft 11, enabling the gear-one driven gear 1b and the first output shaft 21 to rotate synchronously.

As shown in FIG. 1, similarly, the gear-two-four synchronizer 24c is set on the first output shaft 21 and between the gear-two driven gear 2b and gear-four driven gear 4b. The gear-two-four synchronizer 24c can couple the gear-two driven gear 2b or the gear-four driven gear 4b with the first input shaft 11, enabling the driven gear to rotate synchronously with the output shaft.

For example, as shown in FIG. 1, a coupling sleeve of the gear-two-four synchronizer 24c moves left to couple the gear-two driven gear 2b with the first output shaft 21, enabling the gear-two driven gear 2b and the first output shaft 21 to rotate synchronously. The coupling sleeve of the gear-two-four synchronizer 24c moves right to couple the gear-four driven gear 4b with the first output shaft 21, enabling the gear-four driven gear 4b and the first output shaft 21 to rotate synchronously.

As shown in FIG. 1, similarly, the gear-five synchronizer 5c is set on the second output shaft 22. The gear-five synchronizer 5c is at a side, for example a left side, of the gear-five driven gear 5b. The gear-five synchronizer 5c is configured to couple the gear-five driven gear 5b with the second output shaft 22. For example, a coupling sleeve of the gear-five synchronizer 5c moves right and can couple the gear-five driven gear 5b with the second output shaft 22, thereby enabling the gear-five driven gear 5b and the second output shaft 22 to rotate synchronously.

Referring to the embodiments of FIG. 1 to FIG. 4, because the reverse intermediate gear 72 and the intermediate idler gear 73 are on the second output shaft 22, and the gear-five driven gear 5b is also on the second output shaft 22, and the gear-five synchronizer 5c is only configured to couple the gear-five driven gear 5b, and the reverse-gear synchronizer 74c is only configured to couple the intermediate idler gear 73 and the reverse intermediate gear 72. Therefore, as a preferable embodiment, the reverse-gear synchronizer 74c and the gear-five synchronizer 5c share one fork mechanism.

Therefore, another fork mechanism is omitted, which makes the power transmission system 100 more compact and smaller in size.

It is understood that, when the coupling sleeves of the gear-five synchronizer 5c and the reverse-gear synchronizer 74c are driven through the fork mechanism, referring to FIG. 1, when the coupling sleeve of the gear-five synchronizer 5c is driven to right through a fork of the fork mechanism, the gear-five synchronizer 5c couples with the gear-five driven gear 5b. At this time, the coupling sleeve of the reverse-gear synchronizer 74c does not couple with the reverse intermediate gear 72 and the intermediate idler gear 73. When the coupling sleeve of the reverse-gear synchronizer 74c is driven through the fork of the fork mechanism to couple with the reverse intermediate gear 72 and the intermediate idler gear 73, the coupling sleeve of the gear-five synchronizer 5c does not couple with the gear-five driven gear 5b. Of course, the operating process of the fork mechanism driving the reverse-gear synchronizer 74c and the gear-five synchronizer 5c is exemplary and cannot be understood as a limitation to the present disclosure.

In some embodiments of the present disclosure, transmission or separate of the driving power between the engine 4 and the first input shaft 11 and the second input shaft 12 can be implemented through a dual clutch transmission 2d.

Referring to FIG. 2 to FIG. 4, the dual clutch transmission 2d has an input terminal 23d, a first output terminal 21d and a second output terminal 22d. The engine 4 is connected with the input terminal 23d of the dual clutch transmission 2d. Specifically, the engine 4 can be connected with the input terminal 23d through various ways, for example, a flywheel, a shock absorber or a reversing plate.

The first output terminal 21d of the dual clutch transmission 2d is connected with the first input shaft 11, thereby enabling the first output terminal 21d and the first input shaft 11 to rotate synchronously. The second output terminal 22d of the dual clutch transmission 2d is connected with the second input shaft 12, thereby enabling the second output terminal 22d and the second input shaft 12 to rotate synchronously.

The input terminal 23d of the dual clutch transmission 2d can be a housing of the dual clutch transmission 2d, and the first output terminal 21d and the second output terminal 22d thereof can be two driven plates. Generally, the housing uncouples from the two driven plates, i.e., the input terminal 23d uncouples from the first output terminal 21d and the second output terminal 22d. When the housing is to couple with one driven plate, the housing can be controlled to couple with corresponding driven plate, thereby enabling to rotate synchronously. That is to say, the input terminal 23d couples with one of the first output terminal 21d or the second output terminal 22d. Therefore, the driving power transferred from the input terminal 23d can be outputted through the first output terminal 21d or the second output terminal 22d.

In some embodiments, the housing can couple with the two driven plates simultaneously, i.e., the input terminal 23d can couple with the first output terminal 21d and the second output terminal 22d simultaneously. Therefore, the driving power transferred from the input terminal 23d can be outputted through the first output terminal 21d and the second output terminal 22d simultaneously.

It is understood that, the specific coupling state of the dual clutch transmission 2d is affected by a control strategy. For those skilled in the art, the control strategy can be set correspondingly according to practical transmission modes. Therefore, multiple modes, for example a mode of the input terminal 23d uncoupling from the two output terminals and a mode of the input terminal 23d coupling from at least one of the two output terminals, can be switched.

Reference is now made to the second motor shaft gear 32. As stated above, the second motor shaft gear 32 is configured to rotate together with the one of the output shafts. Specifically, in some embodiments, a transmission gear 6 is set on the second output shaft 22. The transmission gear 6 meshes with the second motor shaft gear 32 directly.

Detail descriptions are made, together with FIG. 2 to FIG. 4, to three power output shafts (i.e., the first output shaft 21, the second output shaft 22 and the motor shaft 3) and a vehicle differential 75.

The differential 75 of the vehicle can be arranged between a pair of front wheels or between a pair of rear wheels. In some examples of the present disclosure, the differential 75 is arranged between the pair of front wheels. Function of the differential 75 is for, when the vehicle is turning or moving on an uneven road surface, making left and right driving wheels to roll at different angular speeds, thereby ensuring pure rolling motions between two-side driving wheels and the road surface. A primary decelerator driven gear 74 is set on the differential 75. For example, the primary decelerator driven gear 74 can be arranged on the housing of the differential 75. The primary decelerator driven gear 74 can be, but is not limited to, a bevel gear.

Further, a first output-shaft output gear 211 is fixed on the first output shaft 21. The first output-shaft output gear 211 rotates synchronously as the first output shaft 21 rotates. The first output-shaft output gear 211 meshes with the primary decelerator driven gear 74. Therefore, the driving power from the first output shaft 21 can be transferred from the first output-shaft output gear 211 to the primary decelerator driven gear 74 and the differential 75.

Similarly, a second output-shaft output gear 221 is fixed on the second output shaft 22. The second output-shaft output gear 221 can rotate synchronously as the second output shaft 22 rotates. The second output-shaft output gear 221 meshes with the primary decelerator driven gear 74. Therefore, the driving power from the second output shaft 22 can be transferred from the second output-shaft output gear 221 to the primary decelerator driven gear 74 and the differential 75.

As stated above, the reverse gear 71 is used as the driving power output terminal of a reverse mode mostly. Therefore, the reverse gear 71 also meshes with the primary decelerator driven gear 74. Because the reverse gear 71 also meshes with the reverse intermediate gear 72 simultaneously, and to obtain a proper reverse-gear speed ratio, as an optional embodiment, the reverse gear 71 can be configured to be a double helical gear. One part of the reverse gear 71 with the double-helical-gear configuration meshes with the reverse intermediate gear 72 and another part of the reverse gear 71 with the double-helical-gear configuration meshes with the primary decelerator driven gear 74. In other words, one teeth portion 712 of the reverse gear 71 meshes with the reverse intermediate gear 72 and another teeth portion 711 meshes with the primary decelerator driven gear 74. Therefore, not only that a better reverse-gear speed ratio can be obtained, but also that when the reverse driving power is transferred, the gears are not intervened, thereby facilitating a reliable transmission of the reverse driving power.

Some typical working conditions of the power transmission system 100, according to embodiments of the present disclosure, include parked and electric power generation, driving while charging under a condition of simultaneous coupling of the dual clutch transmission 2d, and a gear-two speed adjustment of the first motor-generator 51.

The typical condition of parked and electric power generation is described first. When the vehicle is in a parked state, the engine 4 is configured to output the driving power generated to the one of the input shafts (i.e., the input shaft, for example the second input shaft 12, which rotates together with the first motor shaft gear 31), and output the driving power to the first motor-generator 51 through synchronization of the motor shaft synchronizer 33c to the first motor shaft gear 31, thereby driving the first motor-generator 51 to generate electric power.

Specifically, referring to specific embodiments of FIG. 2 to FIG. 4, after the vehicle is parked, the engine 4 can output the driving power to the second input shaft 12 through the dual clutch transmission 2d. The second input shaft 12 rotates together with the first motor shaft gear 31 on the motor shaft 3. The motor shaft synchronizer 33c is controlled to couple the motor shaft 3 with the first motor shaft gear 31. Then, the driving power outputted by the engine 4 is outputted to the motor shaft 3 from the second input shaft 12, the intermediate idler gear 73, the first motor shaft gear 31 and the motor shaft synchronizer 33c. Finally, the driving power is outputted to the first motor-generator 51 from the motor shaft 3, thereby driving the first motor-generator 51 as an electric-power generator to generate electric power.

Thus, the function of parked and electric power generation is achieved, which adds to the charging modes. Moreover, when the vehicle is in a stationary state under this condition, all of the driving power of the engine 4 can be used for charging, which increases the charging efficiency and achieves a fast electric-power-supply function.

Next, the working condition of driving while charging under a condition of simultaneous coupling of the dual clutch transmission 2d is described. Under this working condition, by the simultaneous coupling of the input terminal 23d, the first output terminal 21d, and the second output terminal 22d, the engine 4 can output part of the driving power to the wheels as a driving power for driving the vehicle through one output shaft, and output another part of the driving power to the first motor-generator 51 through the motor shaft 3, thereby driving the first motor-generator 51 to generate electric power.

Specifically, referring to the embodiments of FIG. 2 to FIG. 4, under this working condition, part of the driving power of the engine 4 can be outputted from the first output shaft 21 or the second output shaft 22 through, for example, the gear-one gear pair, the gear-three gear pair, or the gear-five gear pair. Another part of the driving power of the engine 4 can be outputted to the first motor-generator 51 through a path from the first motor shaft gear 31, the motor shaft synchronizer 33c, and the motor shaft 3, thereby driving the first motor-generator 51 to generate electric power.

Because, in a conventional power transmission system having a dual clutch transmission, only one clutch of the dual clutch transmission 2d is in working state at a time, the power transmission system 100, according to embodiments of the present disclosure, can achieve an efficient application for the dual transmission clutch 2d, such that under the coupling state of two clutches of the dual clutch transmission 2d (the input terminal 23d couples with the first output terminal 21d and the second output terminal 22d simultaneously), part of the driving power of the engine 4 can be outputted by one output shaft for driving the vehicle to move and another part of the driving power to be outputted to the first motor-generator 51 for driving the first motor-generator 51 to generate electric power, which enriches the transmission modes and meets the vehicle driving and charging requirements.

Function of the gear-two speed adjustment of the first motor-generator 51 is described next. Specifically, referring to FIG. 2 to FIG. 4, because the motor shaft synchronizer 33c is arranged between the first motor shaft gear 31 and the second motor shaft gear 32, when outputting the driving power as an electric motor, the first motor-generator 51 can output selectively through the first motor shaft gear 31 or the second motor shaft gear 31.

During switching, synchronous switching of the motor shaft synchronizer 33c may be needed. For example, in the process of switching from the first motor shaft gear 31 outputting the motor driving power to the second motor shaft gear 32 outputting the motor driving power, the coupling sleeve of the motor shaft synchronizer 33c may need to be switched from a position where the coupling sleeve couples with the first motor shaft gear 31 to a position where the coupling sleeve couples with the second motor shaft gear 32. Because the speed ratio of the transmission path from the first motor shaft gear 31 to the primary decelerator driven gear 74 is different from that of the transmission path from the second motor shaft gear 32 to the primary decelerator driven gear 74, in the process of switching the synchronizer to synchronize the second motor shaft gear 32, the second motor shaft gear 32 and the motor shaft 3 may rotate at different speeds. This can increase synchronization time of the synchronizer and wear of the synchronizer, and reduce transmission efficiency, which can create excessive vibration.

At this time, the rotational speed of the motor shaft 3 can be adjusted based on the rotational speed of the second motor shaft gear 32, by controlling the first motor-generator 51. For example, the rotational speed of the second motor shaft gear 32 can be used as a target to increase or reduce the rotational speed of the motor shaft 3, which makes the rotational speed of the motor shaft 3 to match with the second motor shaft gear 32 (i.e., approximately equal or close to) in a shortest time, thereby making the motor shaft synchronizer 33c to couple the second motor shaft gear 32 with the motor shaft 3 quickly, reducing synchronization time of the motor shaft synchronizer 33c, and improving the transmission efficiency, synchronization controllability and real-time synchronization of the vehicle greatly. In addition, lifetime of the motor shaft synchronizer 33c can be extended, which reduces maintenance cost of the whole vehicle.

Similarly, in the process of switching from the second motor shaft gear 32 outputting the motor driving power to the first motor shaft gear 31 outputting the motor driving power, the first motor-generator 51 can adjust the rotational speed of the motor shaft 3 based on the rotational speed of the first motor shaft gear 31. For example, the rotational speed of the first motor shaft gear 31 can be used as a target to increase or reduce the rotational speed of the motor shaft 3, which makes the rotational speed of the motor shaft 3 to match with the first motor shaft gear 31 in a shortest time, thereby increasing the coupling efficiency of the motor shaft synchronizer 33c.

In summary, briefly, during the motor shaft synchronizer 33c switching from coupling with one of the first motor shaft gear 31 or the second motor shaft gear 32 to couple with another, the first motor-generator 51 is configured to perform speed adjustment to the motor shaft 3 according to the rotational speed of the another of the first motor shaft gear 31 or the second motor shaft gear 32 as the target.

For the function of speed adjustment of the first motor-generator 51, the typical working condition is under electric-vehicle mode where the first motor-generator 51 drives the vehicle to move. Of course, the present disclosure is not limited to this condition. For other modes, for example, a hybrid-electric-vehicle mode, where the motor shaft synchronizer 33c may needed to switch the first motor shaft gear 31 and the second motor shaft gear 32, the first motor-generator 51 can be used to perform speed adjustment to the motor shaft 3.

Thus, the power transmission system 100, according to embodiments of the present disclosure, when the coupling position is switched between the first motor shaft gear 31 and the second motor shaft gear 32, makes the rotational speed of the motor shaft 3 to match with the rotational speed of a to-be-coupled gear (e.g., the rotational speed of the first motor shaft gear 31 or the second motor shaft gear 32) through the first motor-generator 51 performing speed adjustment to the motor shaft 3. That is to say, the first motor-generator 51 can use the rotational speed of the to-be-coupled gear as a target to perform the speed adjustment to the rotational speed of the motor shaft 3, which makes the rotational speed of the motor shaft 3 to match with the rotational speed of the to-be-coupled gear in a short time and is convenient for coupling of the motor shaft synchronizer 33c, thereby increasing the transmission efficiency greatly and reducing the transmission loss of intermediate energy.

The power transmission system 100, according to some embodiments of the present disclosure, can further add a second motor-generator 52 to increase power performance of the power transmission system 100 and to increase the number of transmission modes.

For example, in some embodiments, the second motor-generator 52 can transfer the driving power with the primary decelerator driven gear 74. For example, gears can be set on a motor shaft of the second motor-generator 52 and the gears mesh with the primary decelerator driven gear 74 directly. In some embodiments, the second motor-generator 52 can also be set to be connected with the first input shaft 11 or with the first output shaft 21. In some embodiments, the number of the second motor-generator 52 is two and the second motor-generators 52 are set at two sides of the differential 75. For example, the two second motor-generators 52 can be integrated with the differential 75.

Configurations and typical working conditions of the power transmission system 100 in each specific embodiment are simply described together with FIG. 2 to FIG. 4.

Embodiment 1

As shown in FIG. 2, the engine 4 is connected with the input terminal 23d of the dual clutch transmission 2d. The first output terminal 21d of the dual clutch transmission 2d is connected with the first input shaft 11. The second output terminal 22d of the dual clutch transmission 2d is connected with the second input shaft 12. The input terminal 23d of the dual clutch transmission 2d can uncouple from the first output terminal 21d and the second output terminal 22d of the dual clutch transmission 2d simultaneously, or the input terminal 23d of the dual clutch transmission 2d can couple with one of the first output terminal 21d or the second output terminal 22d, or the input terminal 23d of the dual clutch transmission 2d can couple with the first output terminal 21d and the second output terminal 22d simultaneously.

The second input shaft 12 is a hollow-shaft structure. The first input shaft 11 is a solid shaft. The second input shaft 12 is sleeved on the first input shaft 11 coaxially, and one part of the first input shaft 11 extends outwards from the second input shaft 12 along an axial direction.

A gear-one driving gear 1a, a gear-three driving gear 3a, and a gear-five driving gear 5a, which rotate synchronously with the first input shaft 11, are set on the first input shaft 11. The gear-one driving gear 1a is at a right side of the gear-five driving gear 5a. The gear-three driving gear 3a is at a left side of the gear-five driving gear 5a.

A gear-two driving gear 2a, and a gear-four driving gear 4a, which rotate synchronously with the second input shaft 12, are set on the second input shaft 12. The gear-two driving gear 2a is at a left side and the gear-four driving gear 4a is at a right side.

The first output shaft 21 is arranged in parallel with the two input shafts. A gear-one driven gear 1b, a gear-two driven gear 2b, a gear-three driven gear 3b and a gear-four driven gear 4b are sleeved on the first output shaft 21. The gear-one driven gear 1b meshes with the gear-one driving gear 1a directly. The gear-two driven gear 2b meshes with the gear-two driving gear 2a directly. The gear-three driven gear 3b meshes with the gear-three driving gear 3a directly. The gear-four driven gear 4b meshes with the gear-four driving gear 4a directly.

A gear-one-three synchronizer 13c and a gear-two-four synchronizer 24c are set on the first output shaft 21. The gear-one-three synchronizer 13c is located between the gear-one driven gear 1b and the gear-three driven gear 3b and can selectively synchronize the gear-one driven gear 1b or the gear-three driven gear 3b with the first output shaft 21. The gear-two-four synchronizer 24c is located between the gear-two driven gear 2b and the gear-four driven gear 4b and can selectively synchronize the gear-two driven gear 2b or the gear-four driven gear 4b with the first output shaft 21.

The second output shaft 22 is also arranged in parallel with the two input shafts. A gear-five driven gear 5b is sleeved on the second output shaft 22. The gear-five driven gear 5b meshes with the gear-five driving gear 5a directly. A gear-five synchronizer 5c is further set on the second output shaft 22. The gear-five synchronizer 5c is configured to synchronize the gear-five driven gear 5b with the second output shaft 22.

The motor shaft 3 is arranged in parallel with the two input shafts and the two output shafts. The first motor shaft gear 31 and the second motor shaft gear 32 are sleeved on the motor shaft 3. The first motor shaft gear 31 is on a left side. The second motor shaft gear 32 is on a right side. The motor shaft synchronizer 33c is set on the motor shaft 3. The motor shaft synchronizer 33c is configured to selectively synchronize the first motor shaft gear 31 and the motor shaft 3, or synchronize the second motor shaft gear 32 and the motor shaft 3.

In addition, as shown in FIG. 2, a transmission gear 6, rotating synchronously with the second output shaft 22, is set on the second output shaft 22 and a reverse intermediate gear 72 is sleeved on the second output shaft 22. The transmission gear 6 meshes with the second motor shaft gear 32 directly. A gear sleeve 721 is formed on a side of the reverse intermediate gear 72. The gear sleeve 721 is sleeved on the second output shaft 22. The intermediate idler gear 73 is sleeved on the gear sleeve 721. The intermediate idler gear 73 meshes with the gear-two driving gear 2a and the first motor shaft gear 31. The reverse-gear synchronizer 74c is arranged on the gear sleeve 721 and is configured to couple with the intermediate idler gear 73.

Reverse gear 71 can be configured as a double helical gear. One teeth portion 712 of the reverse gear 71 meshes with the reverse intermediate gear 72 and another teeth portion 711 meshes with the primary decelerator driven gear 74. Meanwhile, a first output-shaft output gear 211, meshing with the primary decelerator driven gear 74, is fixed on the first output shaft 21. A second output-shaft output gear 221, meshing with the primary decelerator driven gear 74, is fixed on the second output shaft 22.

The first motor-generator 51 is connected with the motor shaft 3 coaxially.

Detailed descriptions are made to the typical working conditions of the power transmission system 100, as shown in FIG. 2.

A working condition of parked and electric power generation.

The input terminal 23*d* of the dual clutch transmission 2*d* couples with the second output terminal 22*d* and becomes uncoupling from the first output terminal 21*d*. The motor shaft synchronizer 22*c* couples with the first motor shaft gear 31. Therefore, the driving power outputted by the engine 4 is transferred to the first motor-generator 51 through the input terminal 23*d* of the dual clutch transmission 2*d*, the second output terminal 22*d*, the second input shaft 12, the gear-two driving gear 2*a*, the intermediate idler gear 73, the first motor shaft gear 31, the motor shaft synchronizer 33*c* and the motor shaft 3, thereby driving the first motor-generator 51 to generate electric power.

The working condition can achieve a fixed-speed-ratio charging. The transmission efficiency of energy is higher. The choice of speed ratio can be determined by various factors, for example, the rotational speed of the engine 4 when the vehicle is parked, type of the first motor-generator 51, and the highest rotational speed tolerated by additional components, for example peripheral bearings. For those skilled in the art, the transmission speed ratio can be flexibly designed by considering the above factors, which allows the power transmission system 100, under the aforementioned working condition, to maximize the use of energy of the engine 4 and to achieve the goal of fast charging.

The Electric-Vehicle Working Condition:

Path 1: the motor shaft synchronizer 33*c* couples with the first motor shaft gear 31. The driving power outputted by the first motor-generator 51 is outputted to the second input shaft 12 through the first motor shaft gear 31 and the intermediate idler gear 73. The gear-two-four synchronizer 24*c* couples with the gear-two driven gear 2*b* or the gear-four driven gear 4*b*, enabling the driving power of the first motor-generator 51 to be outputted through the gear-two gear pair or the gear-four gear pair.

Path 2: the motor shaft synchronizer 33*c* couples with the second motor shaft gear 32. The driving power outputted by the first motor-generator 51 is outputted from the second output shaft 22 through the second motor shaft gear 32 and the transmission gear 6.

Thus, when the power transmission system 100 is under the electric-vehicle working condition, the first motor-generator 51 can output the driving power to the wheels through the above two paths of different speed ratios, thereby driving the vehicle to move.

Preferably, when switching the above paths, the first motor-generator 51 can perform speed adjustment to the motor shaft 3.

The switching from Path 1 to Path 2 is described as follows. During the switching, the motor shaft synchronizer 33*c* moves from a position where the motor shaft synchronizer 33*c* couples with the first motor shaft gear 31, to a position where the motor shaft synchronizer 33*c* couples with the second motor shaft gear 32. During this period, the first motor-generator 51 can use the rotational speed of the second motor shaft gear 32 as a target to perform speed adjustment to the motor shaft 3, which makes the rotational speed of the motor shaft 3 to match with the second motor shaft gear 32, thereby enabling the motor shaft synchronizer 33*c* to become coupling with the second motor shaft gear 32 quickly, and synchronization efficiency can be improved.

The switching from Path 2 to Path 1 is described as follows. During the switching, the motor shaft synchronizer 33*c* moves from a position where the motor shaft synchronizer 33*c* couples with the second motor shaft gear 32 to a position where the motor shaft synchronizer 33*c* couples with the first motor shaft gear 31. During this period, the first motor-generator 51 can use the rotational speed of the first motor shaft gear 31 as a target to perform speed adjustment to the motor shaft 3, which makes the rotational speed of the motor shaft 3 to match with the first motor shaft gear 31, thereby enabling the motor shaft synchronizer 33*c* to become coupling with the first motor shaft gear 31 quickly, and synchronization efficiency can be improved.

Of course, it is understood that, the above speed-adjustment mode is not only for the electric-vehicle working condition, but also for other working conditions, for example a hybrid-electric-vehicle working condition, etc. The above speed-adjustment mode can be use as long as it relates to working conditions where the coupling state of the motor shaft synchronizer 33*c* changes (e.g., switching from coupling with the first motor shaft gear 31 to coupling with the second motor shaft gear 32, or from coupling with the second motor shaft gear 32 to coupling with the first motor shaft gear 31).

Scheme One for the Hybrid-Electric-Vehicle Working Conditions in Different Gears:

When the power transmission system 100 is under gear-one hybrid-electric-vehicle working condition, the gear-one-three synchronizer 13*c* couples with the gear-one driven gear 1*b*. The input terminal 23*d* of the dual clutch transmission 2*d* couples with the first output terminal 21*d* and uncouples from the second output terminal 22*d*. The motor shaft synchronizer 33*c* couples with the second motor shaft gear 32. Therefore, the driving power outputted by the engine 4 is outputted from the first output shaft 21 through the first input shaft 11 and the gear-one gear pair. The driving power outputted by the first motor-generator 51 is outputted from the second output shaft 22 through the second motor shaft gear 32 and the transmission gear 6. The two parts of driving power are then coupled at the primary decelerator driven gear 74. The coupled driving power is distributed to two-side wheels from the differential 75.

Under this hybrid-electric-vehicle working condition, the first motor-generator 51 can perform speed adjustment, which allows the primary decelerator driven gear 74 to receive the driving power from the engine 4 and from the first motor-generator 51 synchronously in a balanced manner. The smoothness and coordination of transmission is improved.

When the power transmission system 100 is under gear-two hybrid-electric-vehicle working condition, the gear-two-four synchronizer 24*c* couples with the gear-two driven gear 2*b*. The input terminal 23*d* of the dual clutch transmission 2*d* couples with the second output terminal 22*d* and uncouples from the first output terminal 21*d*. The motor shaft synchronizer 33*c* couples with the second motor shaft gear 32. Therefore, the driving power outputted by the engine 4 is outputted from the first output shaft 21 through the second input shaft 12 and the gear-two gear pair. The driving power outputted by the first motor-generator 51 is outputted from the second output shaft 22 through the second motor shaft gear 32 and the transmission gear 6. The two parts of driving power are then coupled at the primary decelerator driven gear 74. The coupled driving power is distributed to two-side wheels from the differential 75.

Under this hybrid-electric-vehicle working condition, the first motor-generator 51 can perform speed adjustment, which allows the primary decelerator driven gear 74 to receive the driving power from the engine 4 and from the first motor-generator 51 synchronously in a balanced manner. The smoothness and coordination of transmission is improved.

When the power transmission system 100 is under gear-three hybrid-electric-vehicle working condition, it operates similarly to when it is under gear-one hybrid working condition. The differences can be that the gear-one-three synchronizer 13c couples with the gear-three driven gear 3b, and the driving power of the engine 4 is outputted through the gear-three gear pair. The rest are substantially the same as the gear-one hybrid-electric-vehicle transmission and are not repeated here.

When the power transmission system 100 is under gear-four hybrid-electric-vehicle working condition, it operates similarly to when it is under gear-two hybrid-electric-vehicle working condition. The differences can be that the gear-two-four synchronizer 24c couples with the gear-four driven gear 4b, and the driving power of the engine 4 is outputted through the gear-four gear pair. The rest are substantially the same as the gear-two hybrid-electric-vehicle transmission and are not repeated here.

When the power transmission system 100 is under gear-five hybrid-electric-vehicle working condition, the gear-five synchronizer 5c couples with the gear-five driven gear 5b. The input terminal 23d of the dual clutch transmission 2d couples with the first output terminal 21d and uncouples from the second output terminal 22d. The motor shaft synchronizer 33c couples with the second motor shaft gear 32. Therefore, the driving power outputted by the engine 4 is outputted from the second output shaft 22 through the first input shaft 11 and the gear-five gear pair. The driving power outputted by the first motor-generator 51 is outputted from the second output shaft 22 through the second motor shaft gear 32 and the transmission gear 6. The two parts of driving power are then coupled at the second output shaft 22. The coupled driving power is distributed to two-side wheels from the differential 75.

Under this hybrid-electric-vehicle working condition, the first motor-generator 51 can perform speed adjustment, which allows the second output shaft 22 to receive the driving power from the engine 4 and from the first motor-generator 51 synchronously in a balanced manner. The smoothness and coordination of transmission is improved.
Scheme Two for the Hybrid Working Conditions in Different Gears:

When the power transmission system 100 is under gear-one hybrid-electric-vehicle working condition, the gear-one-three synchronizer 13c couples with the gear-one driven gear 1b. The gear-two-four synchronizer 24c couples with the gear-two driven gear 2b (or the gear-four gear pair). The input terminal 23d of the dual clutch transmission 2d couples with the first output terminal 21d and uncouples from the second output terminal 22d. The motor shaft synchronizer 33c couples with the first motor shaft gear 31.

Therefore, the driving power outputted by the engine 4 is outputted to the first output shaft 21 through the first input shaft 11 and the gear-one gear pair. The driving power outputted by the first motor-generator 51 is outputted to the first output shaft 21 through the first motor shaft gear 31, the intermediate idler gear 73, the gear-two gear pair and the gear-two-four synchronizer 24c. The two parts of driving power are then coupled at the first output shaft 21. The coupled driving power is distributed to two-side wheels from the differential 75.

Under this hybrid-electric-vehicle working condition, the first motor-generator 51 can perform speed adjustment, which allows the first output shaft 21 to receive the driving power from the engine 4 and the first motor-generator 51 synchronously in a balanced manner. The smoothness and coordination of transmission is improved.

When the power transmission system 100 is under gear-two hybrid-electric-vehicle working condition, the gear-two-four synchronizer 24c couples with the gear-two driven gear 2b. The input terminal 23d of the dual clutch transmission 2d couples with the second output terminal 22d and uncouples from the first output terminal 21d. The motor shaft synchronizer 33c couples with the first motor shaft gear 31. Therefore, the driving power outputted by the engine 4 is outputted to the gear-two gear pair through the second input shaft 12. The driving power outputted by the first motor-generator 51 is outputted to the gear-two gear pair through the first motor shaft gear 31 and the intermediate idler gear 73. The two parts of driving power are then coupled at the gear-two gear pair. The coupled driving power is outputted from the first output shaft 21.

Under this hybrid-electric-vehicle working condition, the first motor-generator 51 can perform speed adjustment, which allows the gear-two gear pair to receive the driving power from the engine 4 and the first motor-generator 51 synchronously in a balanced manner. The smoothness and coordination of transmission is improved.

When the power transmission system 100 is under gear-three hybrid-electric-vehicle working condition, it operates similarly to when it is under gear-one hybrid-electric-vehicle working condition. The differences can be that the gear-one-three synchronizer 13c couples with the gear-three driven gear 3b, and the driving power of the engine 4 is outputted through the gear-three gear pair. The rest are substantially the same as the gear-one hybrid-electric-vehicle transmission and are not repeated here.

When the power transmission system 100 is under gear-five hybrid-electric-vehicle working condition, the gear-five synchronizer 5c couples with the gear-five driven gear 5b. The gear-two-four synchronizer 24c couples with the gear-two driven gear 2b. The input terminal 23d of the dual clutch transmission 2d couples with the first output terminal 21d and uncouples from the second output terminal 22d. The motor shaft synchronizer 33c couples with the first motor shaft gear 31.

Therefore, the driving power outputted by the engine 4 is outputted to the second output shaft 22 through the first input shaft 11 and the gear-five gear pair. The driving power outputted by the first motor-generator 51 is outputted to the first output shaft 21 through the first motor shaft gear 31, the intermediate idler gear 73, the gear-two gear pair and the gear-two-four synchronizer 24c. The two parts of driving power are then coupled at the primary decelerator driven gear 74. The coupled driving power is distributed to two-side wheels from the differential 75.

Under this hybrid-electric-vehicle working condition, the first motor-generator 51 can perform speed adjustment, which allows the primary decelerator driven gear 74 to receive the driving power from the engine 4 and from the first motor-generator 51 synchronously in a balanced manner. The smoothness and coordination of transmission is improved.

It is noted that, the above scheme two for the hybrid-electric-vehicle working conditions at different gears takes the gear-two-four synchronizer 24c coupling with the gear-two driven gear 2b for an example. Of course, the gear-two-four synchronizer 24c can also couple with the gear-four driven gear 4b under this mode. At this time, the hybrid principle is substantially the same as the above and is not repeated here. The principle is the same as that in the above mode of not implementing the gear-four hybrid-electric-vehicle working condition.

In summary, for those skilled in the art, any hybrid paths in Scheme one and Scheme two can be selected flexibly according to a practical need. This enriches the transmission mode of the power transmission system 100 greatly, and improves the driving joy, and allows the vehicle to better adapt to different road conditions, and improves power performance and fuel economy of the vehicle.

Scheme One for the Working Condition of Driving while Charging of the Engine:

When the power transmission system 100 is under a gear-one driving-while-charging working condition, the gear-one-three synchronizer 13c couples with the gear-one driven gear 1b. The input terminal 23d of the dual clutch transmission 2d couples with the first output terminal 21d and uncouples from the second output terminal 22d. The motor shaft synchronizer 33c couples with the second motor shaft gear 32. Therefore, the driving power outputted by the engine 4 is outputted from the first output shaft 21 through the first input shaft 11 and the gear-one gear pair. Meanwhile, anti-dragging energy from the wheels is outputted to the first motor-generator 51 through the second output shaft 22, the transmission gear 6, the second motor shaft gear 32 and the motor shaft 3, thereby driving the first motor-generator 51 to generate electric power.

When the power transmission system 100 is under a gear-two driving-while-charging working condition, the gear-two-four synchronizer 24c couples with the gear-two driven gear 2b. The input terminal 23d of the dual clutch transmission 2d couples with the second output terminal 22d and uncouples from the first output terminal 21d. The motor shaft synchronizer 33c couples with the first motor shaft gear 31. Therefore, part of the driving power outputted by the engine 4 is outputted from the first output shaft 21 through the second input shaft 12 and the gear-two gear pair. Another part of the driving power outputted by the engine 4 is outputted to the first motor-generator 51 through the second input shaft 22, the intermediate idler gear 73, the first motor shaft gear 31 and the motor shaft 3, thereby driving the first motor-generator 51 to generate electric power.

When the power transmission system 100 is under a gear-three driving-while-charging working condition, its operation is substantially the same as when under the gear-one driving-while-charging working condition. The differences are that the gear-one-three synchronizer 13c couples with the gear-three driven gear 3b.

When the power transmission system 100 is under a gear-four driving-while-charging working condition, it is substantially the same as when the power transmission system 100 is under the gear-two driving-while-charging working condition. The differences can be that the gear-two-four synchronizer 24c couples with the gear-four driven gear 4b.

When the power transmission system 100 is under a gear-five driving-while-charging working condition, the gear-five synchronizer 5c couples with the gear-five driven gear 5b. The input terminal 23d of the dual clutch transmission 2d couples with the first output terminal 21d and uncouples from the second output terminal 22d. The motor shaft synchronizer 33c couples with the second motor shaft gear 32. Therefore, the driving power outputted by the engine 4 is outputted from the second output shaft 22 through the first input shaft 11 and the gear-five gear pair. Meanwhile, part of the driving power on the second output shaft 22 is further outputted to the first motor-generator 51 through the transmission 6, the second motor shaft gear 32 and the motor shaft 3, thereby driving the first motor-generator 51 to generate electric power.

Scheme Two for the Working Condition of Driving while Charging of the Engine 4:

In the above introduced scheme one for the working condition of driving-while-charging of the engine 4, when transmitting the driving power, only one clutch of the dual clutch transmission 2d couples to work, for example, the input terminal 23d thereof couples with the first output terminal 21d, or the input terminal 23d thereof couples with the second output terminal 22d. Particularly, the power transmission system 100, according to embodiments of the present disclosure, can also achieve a driving-while-charging working condition under a condition of the input terminal 23d of the dual clutch transmission 2d coupling with the first output terminal 21d and the second output terminal 22d simultaneously.

Under this condition, when the power transmission system 100 is under gear-one driving-while-charging working condition, the input terminal 23d of the dual clutch transmission 2d couples with the first output terminal 21d and the second output terminal 22d simultaneously. The gear-one-three synchronizer 13c couples with the gear-one driven gear 1b. The motor shaft synchronizer 33c couples with the first motor shaft gear 31. Therefore, one part of the driving power outputted by the engine 4 is outputted from the first output shaft 21 through the first input shaft 11 and the gear-one gear pair. Another part of the driving power outputted by the engine 4 is outputted to the first motor-generator 51 through the second input shaft 12, the intermediate idler gear 73, the first motor shaft gear 31 and the motor shaft 3, thereby driving the first motor-generator 51 to generator electric power.

Under this condition, when the power transmission system 100 is under a gear-three driving-while-charging working condition, or under a gear-five driving-while-charging working condition, its operation is substantially the same as when under the gear-one driving-while-charging working condition. The differences can be that, when in gear-three transmission, the gear-one-three synchronizer 13c couples with the gear-three driven gear 3b, when in gear-five transmission, the gear-five synchronizer 5c couples with the gear-five driven gear 5b and the driving power is outputted from the second output shaft 22.

In summary, for those skilled in the art, any transmission paths in Scheme one and Scheme two can be selected flexibly according to a practical need. This enriches the transmission mode of the power transmission system 100 greatly, and improves the driving joy, and allows the vehicle to better adapt to different road conditions, and improves power performance and fuel economy of the vehicle.

Reverse Working Condition:

When the power transmission system 100 is under a mechanical reverse-gear working condition, the reverse-gear synchronizer 74c synchronizes the reverse intermediate gear 72 and the intermediate idler gear 73. The input terminal 23*d* of the dual clutch transmission 2*d* couples with the second output terminal 22*d* and uncouples from the first output terminal 21*d*. The driving power outputted by the engine 4 is outputted from the reverse gear 71 through the second input shaft 12, the intermediate idler gear 73, and the reverse intermediate gear 72.

When the power transmission system 100 is under an electric reverse-gear working condition, the motor shaft synchronizer 33*c* synchronizes the motor shaft 3 and the first motor shaft gear 31. The reverse-gear synchronizer 74*c* synchronizes the reverse intermediate gear 72 and the intermediate idler gear 73. The driving power outputted by the first motor-generator 51 is outputted from the reverse gear 71 through the motor shaft 3, the first motor shaft gear 31, the intermediate idler gear 73 and the reverse intermediate gear 72.

When the power transmission system 100 is under a hybrid-electric-vehicle reverse-gear working condition, the motor shaft synchronizer 33*c* synchronizes the motor shaft 3 and the first motor shaft gear 31. The reverse-gear synchronizer 74*c* synchronizes the reverse intermediate gear 72 and the intermediate idler gear 73. The driving power outputted by the engine 4 is outputted to the intermediate idler gear 73 through the second input shaft 12. The driving power outputted by the first motor-generator 51 is outputted to the intermediate idler gear 73 through the motor shaft 3 and the first motor shaft gear 31. The two parts of driving power are coupled at the intermediate idler gear 73, and then are outputted from the reverse gear 71 through the reverse intermediate gear 72.

Under the above introduced parked-and-electric-power-generation working condition, the electric working condition, Scheme one for the hybrid-electric-vehicle working conditions in different gears, Scheme two for the hybrid-electric vehicle working condition in different gears, Scheme one for the driving-while-charging working condition of the engine, Scheme two for the driving-while-charging working condition of the engine and the reverse working condition, the first motor-generator 51 can rotate along a same preset direction, i.e., when working as an electric motor and as a power generator, the first motor-generator 51 can rotate along the same preset direction. Particularly, in the process of switching from the electric working condition, e.g., Scheme one for the hybrid-electric-vehicle working conditions in different gears, Scheme two for the hybrid-electric-vehicle working conditions in different gears to the reverse working condition, the first motor-generator 51 may not need to change direction, which allows the first motor-generator 51 to keep rotating along the same direction under any involved working conditions. This can reduce vibration brought by changing direction of the electric motor, and extends the lifetime of the power transmission system 100.

Embodiment 2

As shown in FIG. 3, the main differences between the power transmission system 100 in this embodiment and the power transmission system 100 as shown in FIG. 2 are that the reverse intermediate gear 72, the intermediate idler gear 73 and the reverse-gear synchronizer 74*c*. In this embodiment, the reverse intermediate gear 72 and the intermediate idler gear 73 are sleeved on the second output shaft 22 next to each other. The reverse-gear synchronizer 74*c* is set on the intermediate idler gear 73 and is configured to couple with the reverse intermediate gear 72. The rest are substantially the same as those in the power transmission system 100 in the embodiment of FIG. 2, and are not repeated here.

Embodiment 3

As shown in FIG. 4, the main differences between the power transmission system 100 in this embodiment and the power transmission system 100 as shown in FIG. 3 are configuration of the intermediate idler gear 73. In this embodiment, the intermediate idler gear 73 is configured to be a double helical gear and has teeth portions 731, 732. One teeth portion 731 meshes with a gear-two driving gear (i.e., with the driving gear on the one of the input shafts), and another teeth portion 732 meshes with the first motor shaft gear 31. The rest are substantially the same as those in the power transmission system 100 in the embodiment of FIG. 3, and are not repeated here.

In addition, embodiments of the present disclosure further provide a vehicle including the above power transmission system 100. It is understood that, other structures, for example a driving system, a turning system, a braking system, etc. of the vehicle are current technologies and are known by those skilled in the art. Therefore, detailed descriptions of these known structures are omitted here.

Based on the structures of the above power transmission system, a shifting control method for a hybrid vehicle, a power transmission system of the hybrid vehicle and the hybrid vehicle having the power transmission system, according to embodiments of the present disclosure, are described with the figures.

Figure 5:
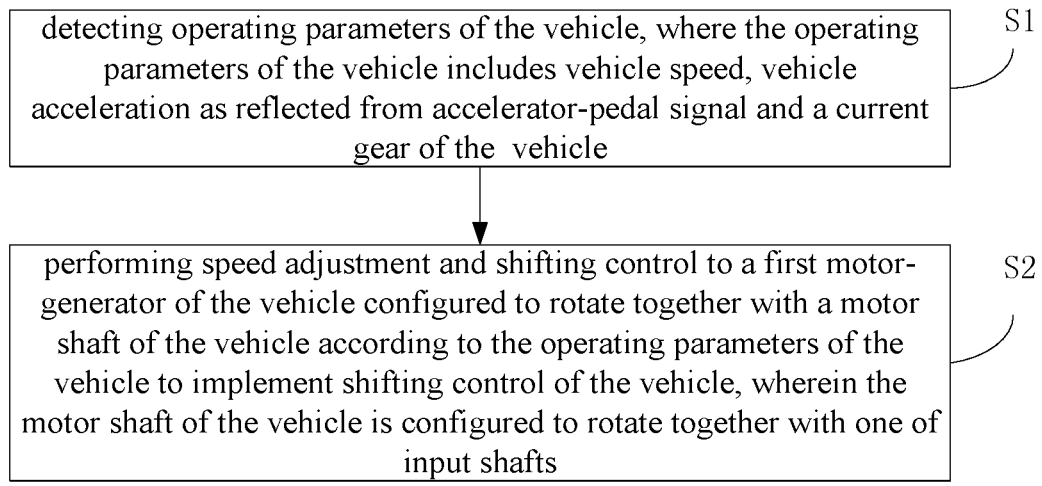
FIG. 5 is a flow chart illustrating an exemplary transmission control method for a vehicle according to one embodiment of the present disclosure.
Figure 6:
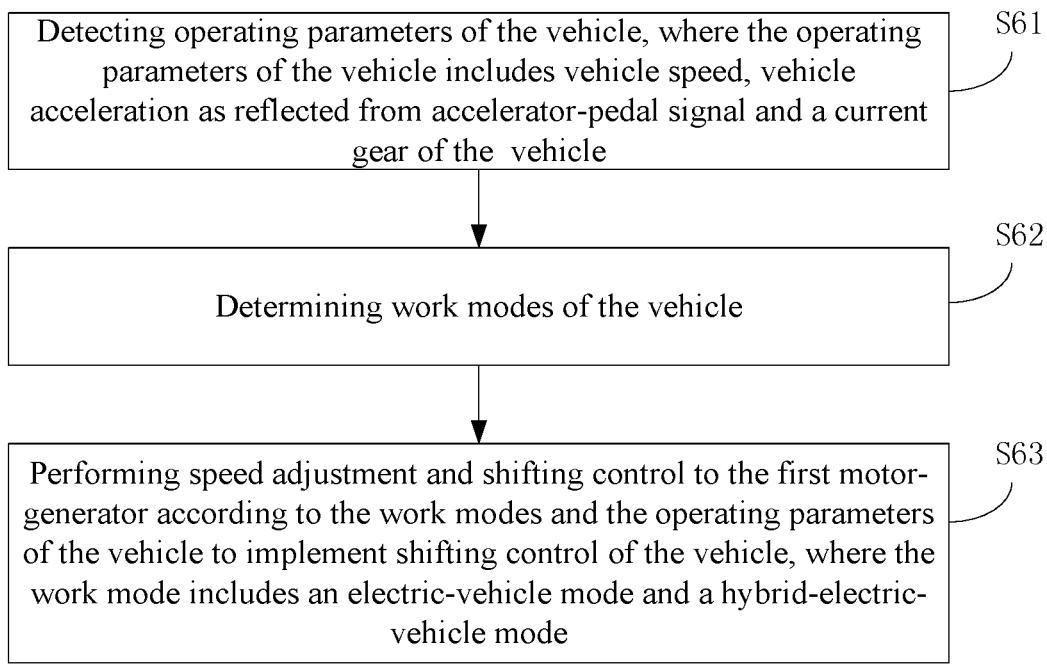
FIG. 6 is a flow chart illustrating an exemplary transmission control method for a hybrid vehicle according to one embodiment of the present disclosure.

FIG. 5 is a flow chart illustrating an exemplary shifting control method for a vehicle, according to one embodiment of the present disclosure. The power transmission system of the vehicle includes a number of input shafts, a number of output shafts, a motor shaft 3 and a first motor-generator 51. A gear driving gear is set on each of the input shafts. A gear driven gear is set on each of the output shafts. The gear driven gear meshes with the gear driving gear correspondingly. The motor shaft 3 is configured to rotate together with one of the input shafts. The first motor-generator 51 is configured to rotate together with the motor shaft, and when the motor shaft rotates together with one of the input shafts, the first motor-generator can use at least parts of driving power outputted by the engine to generate electric power when the vehicle moves or is parked. As shown in FIG. 6, the shifting control method, according to embodiments of the present disclosure, includes following steps:

S1: detecting operating parameters of the vehicle, where the operating parameters of the hybrid vehicle include vehicle speed, vehicle acceleration as reflected from accelerator-pedal signal and a current gear of the vehicle.

S2: performing speed adjustment and shifting control to a first motor-generator of the vehicle configured to rotate together with a motor shaft of the vehicle according to the operating parameters of the vehicle to implement shifting control of the vehicle, wherein the motor shaft of the vehicle is configured to rotate together with one of input shafts.

FIG. 6 is a flow chart illustrating an exemplary shifting control method for a hybrid vehicle, according to one embodiment of the present disclosure. The power transmission system of the vehicle further includes an engine 4, and the engine 4 is configured to selectively couple with at least one of the input shafts. As shown in FIG. 6, the shifting control method, according to embodiments of the present disclosure, includes following steps:

S61: detecting operating parameters of the vehicle, where the operating parameters of the hybrid vehicle include vehicle speed, vehicle acceleration as reflected from accelerator-pedal signal and a current gear of the vehicle.

S62: determining work modes of the vehicle.

Specifically, a vehicle according to embodiments of the present disclosure supports two work modes: EV (electric vehicle) and HEV (hybrid electric vehicle). There are also two running modes: ECO (economical) and S (sport), under each of the EV and HEV modes. The EV mode is a mode where only the first motor-generator works and is involved in driving. The HEV mode is a mode where either or all of the engine and the first motor-generator is involved in driving. The two running modes (i.e., ECO mode and S mode) are described as follows: the ECO mode is configured to facilitate, when the vehicle moves under the EV mode or the HEV mode, the engine or the first motor-generator working in a more economical range; while the S mode is configured to meet the requirement of power performance. Thus, the vehicle has EV_ECO mode, EV_S mode, HEV ECO mode, and HEV_S mode. Assistance of the motor-generator works primarily in the HEV_ECO mode and the HEV_S mode.

S63: performing speed adjustment and shifting control to the first motor-generator according to the work modes and the operating parameters of the vehicle to implement shifting control of the hybrid vehicle, where the work modes includes an electric-vehicle mode and a hybrid-electric-vehicle mode.

Specifically, for example, speed adjustment and shifting control is performed to the first motor-generator according to the work modes and the operating parameters of the hybrid vehicle, where there are several working conditions in performing speed adjustment and shifting control to the first motor-generator, for example, speed adjustment and shifting control when upshifting/downshifting under the EV mode, speed adjustment and shifting control when upshifting/downshifting under the HEV mode, speed adjustment and shifting control when upshifting/downshifting under switching from the EV mode to the HEV mode, speed adjustment and shifting control when generating electric power in place to moving at gear D, etc.

In embodiments of the present disclosure, the first motor-generator has three gears: a first gear, a second gear and a third gear, i.e., EV1 gear, direct gear and EV2 gear.

As shown in FIG. 1 to FIG. 4, when the first motor-generator 51 is at an EV1 gear (e.g., the first gear), the motor shaft synchronizer 33c and the gear-two-four synchronizer 24c move left. At this time, the driving power of the first motor-generator 51 is transferred to the wheels through the motor shaft synchronizer 33c, the first motor shaft gear 31, the intermediate idler gear 73, the gear-two driving gear 2a, the gear-two driven gear 2b, the gear-two-four synchronizer 24c, the first output shaft 21, the first output-shaft output gear 211, the primary decelerator driven gear 74 and the power transmission system of the vehicle, thereby achieving a speed control.

When the first motor-generator 51 is at an EV2 gear (e.g., the third gear), the motor shaft synchronizer 33c moves left, and the gear-two-four synchronizer 24c move right. At this time, the driving power of the first motor-generator 51 is transferred to the wheels through the motor shaft synchronizer 33c, the first motor shaft gear 31, the intermediate idler gear 73, the gear-four driving gear 4a, the gear-four driven gear 4b, the gear-two-four synchronizer 24c, the first output shaft 21, the first output-shaft output gear 211, the primary decelerator driven gear 74 and the power transmission system of the vehicle, thereby achieving a speed control.

When the first motor-generator 51 is at a direct gear (e.g., the second gear), the motor shaft synchronizer 33c moves right. At this time, the driving power of the first motor-generator 51 is transferred to the wheels through the motor shaft synchronizer 33c, the second motor shaft gear 32, the transmission gear 6, the second output shaft 22, the second output-shaft output gear 221, the primary decelerator driven gear 74 and the power transmission system of the vehicle, thereby achieving a speed control.

When the hybrid vehicle is under EV mode, as the vehicle speed increases, the first motor-generator 51 is to be switched from the EV1 gear to the direct gear. However, because, when the motor shaft synchronizer moves from the left position to the right position, the rotational speed of the first motor-generator may not meet the requirement according to the current vehicle speed and the difference is larger, performing speed adjustment to the first motor-generator is needed until the rotational speed of the first motor-generator is adjusted to a target rotational speed corresponding to a target gear. The motor shaft synchronizer acts to shift. This improves smoothness and comfort of the vehicle.

Figure 7:
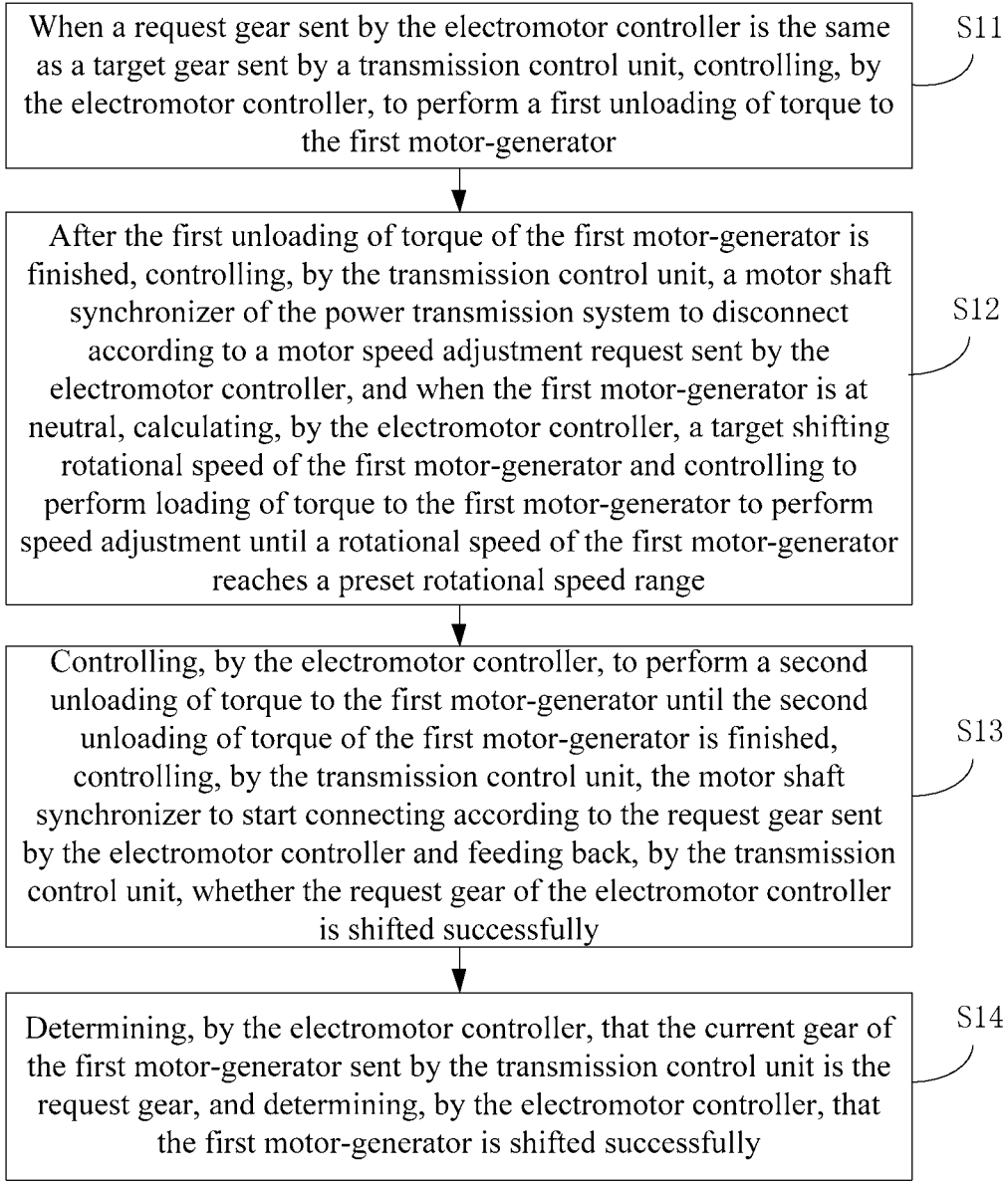
FIG. 7 is a flow chart illustrating an exemplary method of performing speed adjustment and shifting control to a first motor-generator under an electric vehicle (EV) mode according to one embodiment of the present disclosure.

In one embodiment of the present disclosure, as shown in FIG. 7, when the work mode of the hybrid vehicle is the electric-vehicle mode (EV mode), if an ECN (electromotor controller) determines that the first motor-generator needs to be performed the shifting control according to the vehicle speed, the vehicle acceleration and the current gear of the hybrid vehicle, performing speed adjustment and shifting control to the first motor-generator includes following steps:

S11: when a request gear sent by the electromotor controller is the same as a target gear sent by a transmission control unit, controlling, by the electromotor controller, to perform a first unloading of torque to the first motor-generator;

S12: after the first unloading of torque of the first motor-generator is finished, controlling, by the transmission control unit, a motor shaft synchronizer of the power transmission system to disconnect according to a motor speed adjustment request sent by the electromotor controller, and when the first motor-generator is at neutral, calculating, by the electromotor controller, a target shifting rotational speed of the first motor-generator and controlling to perform loading of torque to the first motor-generator to perform speed adjustment until a rotational speed of the first motor-generator reaches a preset rotational speed range;

S13: controlling, by the electromotor controller, to perform a second unloading of torque to the first motor-generator until the second unloading of torque of the first motor-generator is finished, controlling, by the transmission control unit, the motor shaft synchronizer to start connecting according to the request gear sent by the electromotor controller and feeding back, by the transmission control unit, whether the request gear of the electromotor controller is shifted successfully;

S14: determining, by the electromotor controller, that the current gear of the first motor-generator sent by the transmission control unit is the request gear, and determining, by the electromotor controller, that the first motor-generator is shifted successfully.

In one embodiment of the present disclosure, in step S12, the preset rotational speed range is in a preset motor shifting target rotational speed range, and the preset motor shifting target rotational speed range is obtained according to a target shifting rotational speed of the first motor-generator. For example, the preset motor shifting target rotational speed range is plus or minus 500 rpm on the basis of the target shifting rotational speed of the first motor-generator. In the preset motor shifting target rotational speed range, the motor shaft synchronizer can be connected or disconnected successfully.

In the process of speed adjustment of the motor, if the motor torque starts to be unloaded when the rotational speed of the motor reaches the target shifting rotational speed, and because unloading of the motor takes time, the motor can be over-adjusted easily. In addition, if the motor torque starts to be unloaded when the rotational speed of the motor reaches the target shifting rotational speed range, because of rotation inertia of the motor itself, the rotation speed can be over-adjusted in a certain degree. Because there is a time lag between a transmission control unit (TCU) receiving finish of unloading torque, and controlling synchronizer to couple and shift, during the time lag the synchronizer couples to shift, the rotational speed of the motor changes out of the shifting target rotational speed range. As a result, the synchronizer cannot be shifted, or shifting smoothness can be affected. For example, when the rotational speed of the first motor-generator reaches the shifting target rotational speed range and the motor shaft synchronizer is about to couple, if over-adjustment exists at this time, this will result in that the rotational speed of the first motor-generator deviates from the shifting target rotational speed, and the shifting time will be affected.

In embodiments of the present disclosure, in order to ensure shifting performance of the motor, by adjusting a time for a second unloading of torque of the first motor-generator, before the rotational speed of the first motor-generator does not reaches the target shifting rotational speed, torque is loaded to the first motor-generator to perform the second unloading. This is to say, when performing speed adjustment to the first motor-generator, and the rotational speed of the first motor-generator reaches the preset motor rotational speed, the electromotor controller controls to perform the second unloading of torque to the first motor-generator.

In one embodiment of the present disclosure, in step S12, when the electromotor controller determines that the first motor-generator needs to be performed upshifting control, the preset rotational speed range is greater than an upper limit of a target shifting rotational speed range of the first motor-generator. When the first motor-generator needs to be upshifted, the first motor-generator may need to slow down. Within a time lag, the rotational speed of the first motor-generator has a downward trend. When the rotational speed of the first motor-generator is larger than the upper limit of the target shifting rotational speed range of the first motor-generator, speed adjustment starts to be performed to the first motor-generator; as a result, after finishing the second unloading of torque to the first motor-generator, the rotational speed of the first motor-generator can be in the target shifting rotational speed range. This avoids the problem of over-adjustment of the first motor-generator. When the electromotor controller determines that the first motor-generator needs to be performed downshifting control, the preset rotational speed range is smaller than a lower limit of the target shifting rotational speed range of the first motor-generator. When the first motor-generator needs to be downshifted, the first motor-generator may need to speed up. Within a time lag, the rotational speed of the first motor-generator has an upward trend. When the rotational speed of the first motor-generator is smaller than the lower limit of the target shifting rotational speed range of the first motor-generator, speed adjustment starts to be performed to the first motor-generator; as a result, after finishing the second unloading of torque to the first motor-generator, the rotational speed of the first motor-generator can be in the target shifting rotational speed range. This avoids the problem of over-adjustment of the first motor-generator.

Specifically, the following descriptions are made regarding a specific process of speed adjustment and shifting control of the first motor-generator under EV mode in an embodiment of the present disclosure.

Figure 8A:
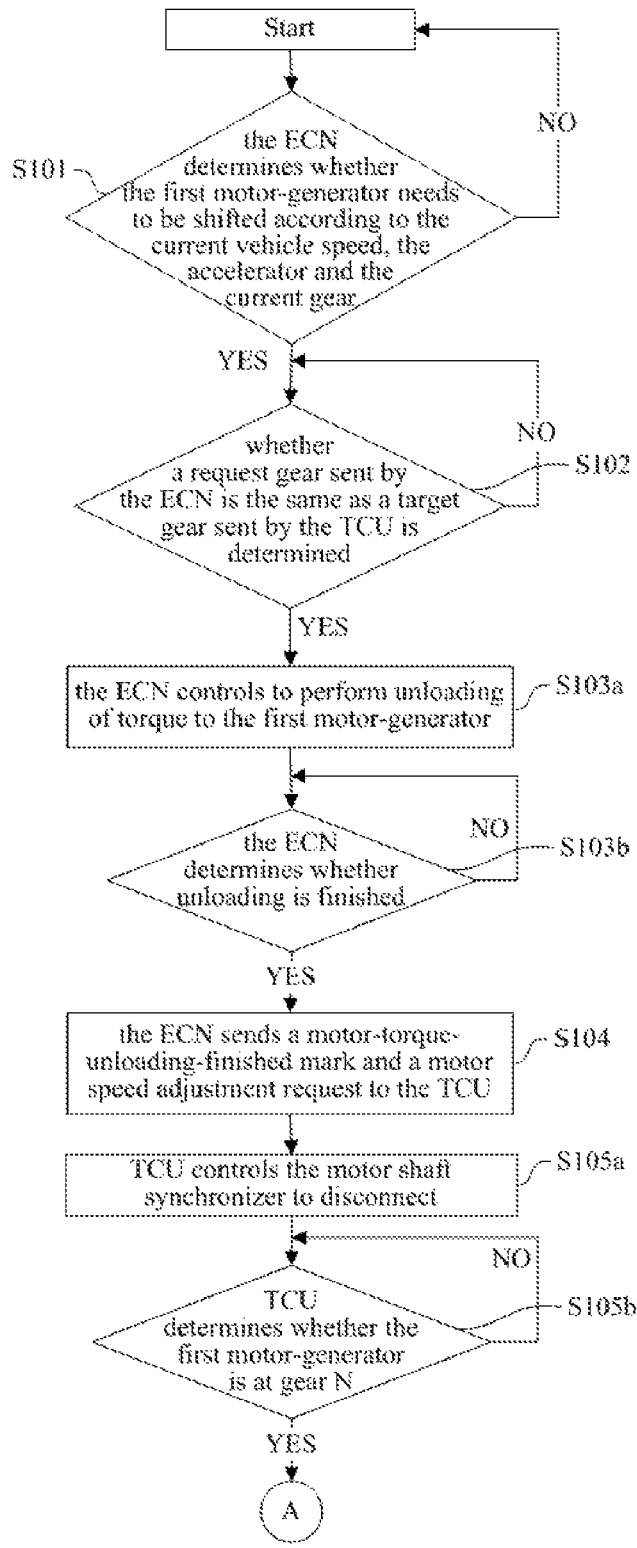
FIGS. 8A-8C show a flow chart illustrating an exemplary method of performing speed adjustment and shifting control to a first motor-generator under EV mode according to one embodiment of the present disclosure.
Figure 8B:
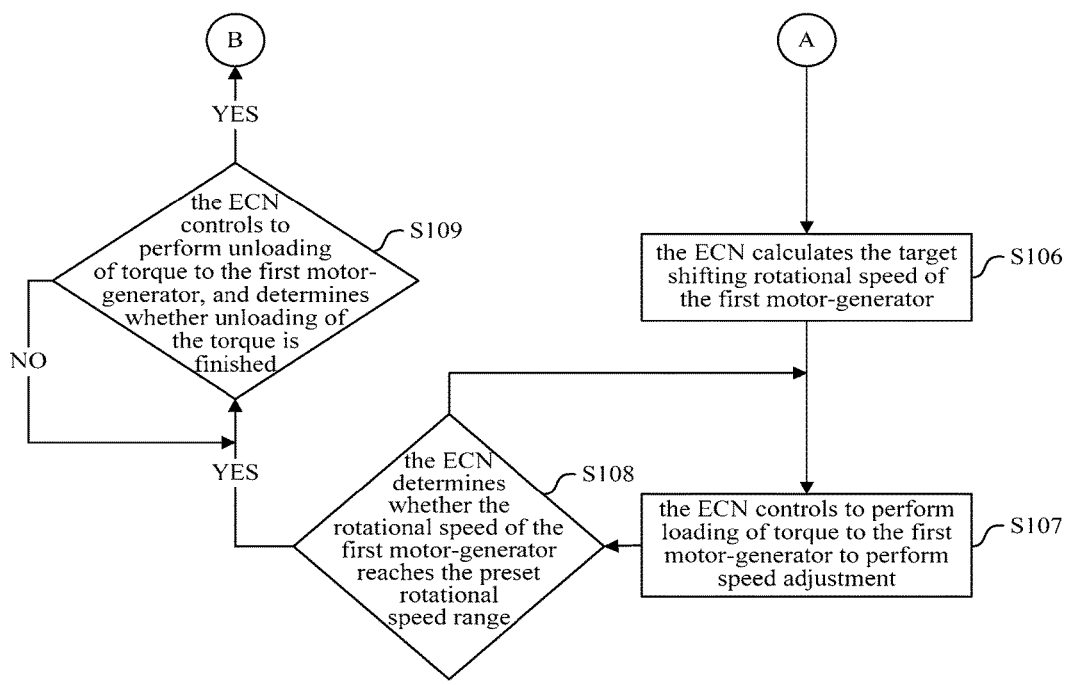
Figure 8C:
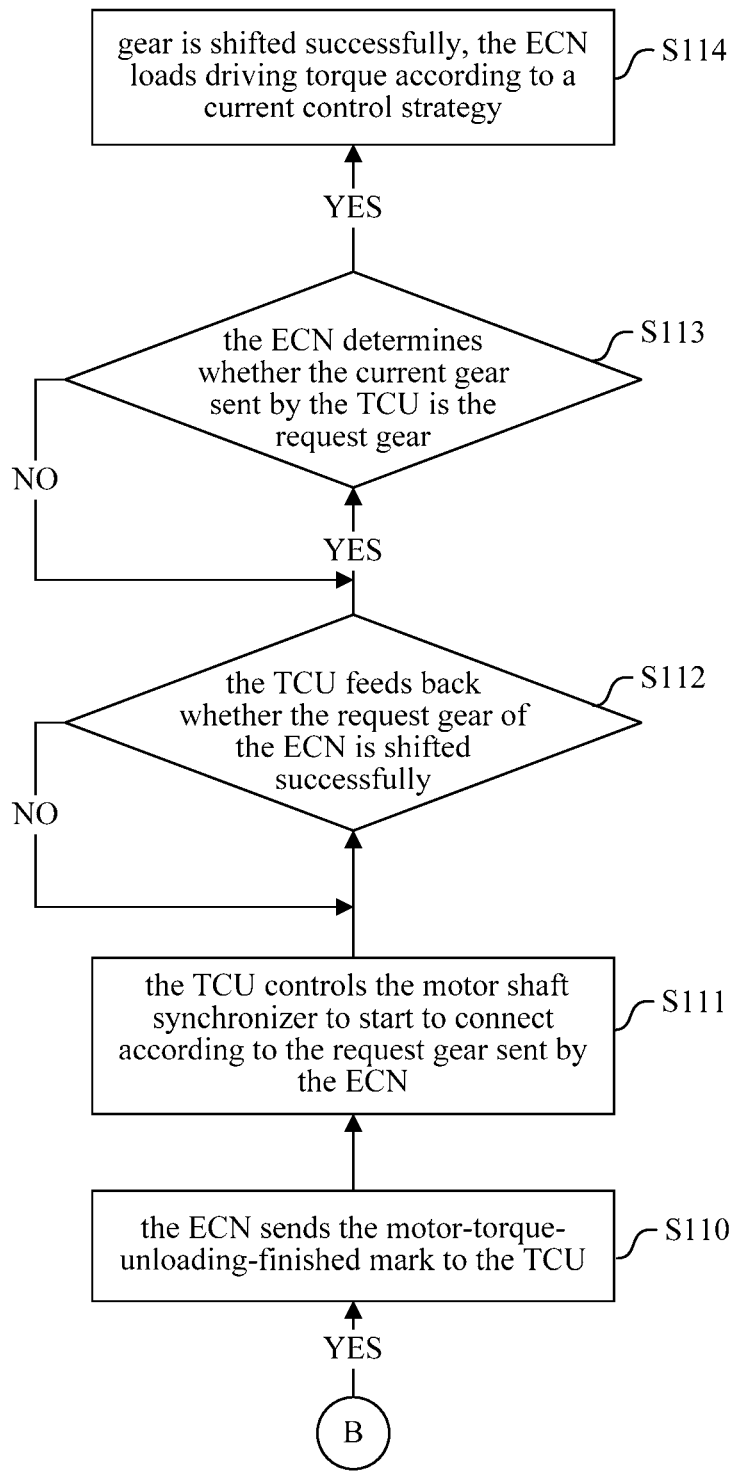

As shown in FIGS. 8A-8C, a method of speed adjustment and shifting control of the first motor-generator under EV mode includes:

S101: the ECN determines whether the first motor-generator needs to be shifted according to the current vehicle speed, the accelerator and the current gear, if yes, execute S102, if no, continue to execute S101.

S102: whether a request gear sent by the ECN is the same as a target gear sent by the TCU is determined, if yes, execute S103a, if no, continue to execute S102.

S103a: the ECN controls to perform unloading of torque to the first motor-generator.

S103b: the ECN determines whether unloading is finished, if yes, execute S104, if no, continue to execute S103b.

S104: the ECN sends a motor-torque-unloading-finished mark and a motor speed adjustment request to the TCU.

S105a: the TCU controls the motor shaft synchronizer to disconnect.

S105b: the TCU determines whether the first motor-generator is at neutral (i.e., gear N), if yes, execute S106, if no, return to S105b to continue to monitor whether the first motor-generator is at neutral.

S106: the ECN calculates the target shifting rotational speed of the first motor-generator.

S107: the ECN controls to perform loading of torque to the first motor-generator to perform speed adjustment.

S108: the ECN determines whether the rotational speed of the first motor-generator reaches the preset rotational speed range, if yes, execute S109, if no, go back to S107.

S109: the ECN controls to perform unloading of torque to the first motor-generator, and determines whether unloading of the torque is finished, if yes, execute S110, if no, continue to execute S109.

S110: the ECN sends the motor-torque-unloading-finished mark to the TCU.

S111: the TCU controls the motor shaft synchronizer to start to connect according to the request gear sent by the ECN.

S112: the TCU feeds back whether the request gear of the ECN is shifted successfully, if yes, execute S113, if no, continue to execute S112.

S113: the ECN determines whether the current gear sent by the TCU is the request gear, if yes, execute S114, if no, continue to execute S113.

S114: gear is shifted successfully, the ECN loads driving torque according to a current control strategy.

In one embodiment of the present disclosure, when performing speed adjustment and shifting control to the first motor-generator, the method further includes: the motor controller performs PID adjustment to the first motor-generator to reduce speed-adjustment time of the first motor-generator.

Figure 9:
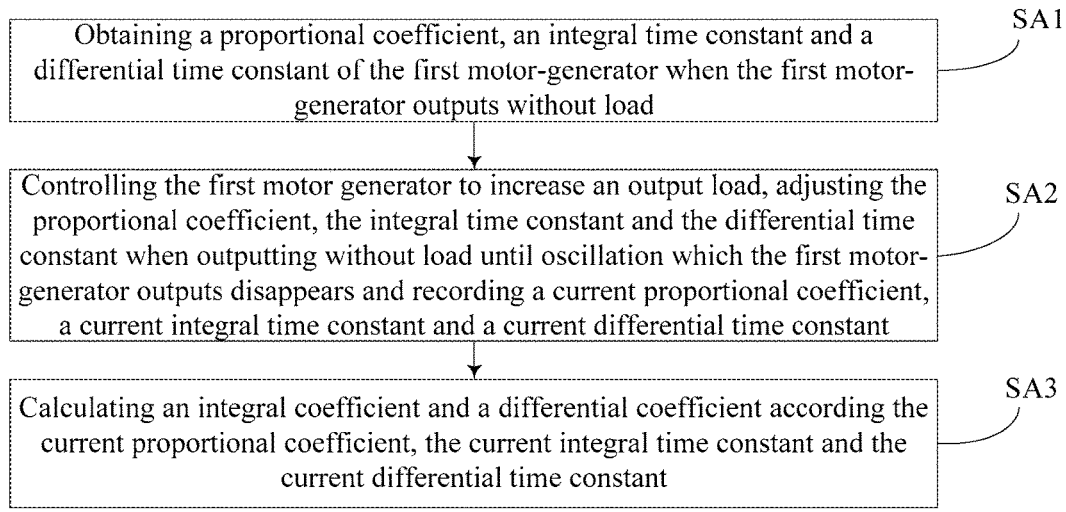
FIG. 9 is a flow chart illustrating an exemplary electromotor controller configured to perform PID (proportion integration differentiation) adjustment to a first motor-generator, according to one embodiment of the present disclosure.

Specifically, in embodiments of the present disclosure, as shown in FIG. 9, the electromotor controller performing PID adjustment to the first motor-generator includes:

SA1: obtaining a proportional coefficient, an integral time constant and a differential time constant of the first motor-generator when the first motor-generator outputs without load.

For example, when the first motor-generator outputs without load, (1) the proportional coefficient Kp is determined. When the proportional coefficient Kp is determined, the integral term and the differential term of PID are removed firstly. The integral time constant Ti is set to 0 (Ti=0) and the differential time constant Td is set to 0 (Td=0), which makes it to be a pure proportional adjustment. For example, input is set to be 60%~70% of maximum of output which the first motor-generator allows. The proportional coefficient Kp is adjusted to increase from 0 gradually until oscillation appears in the output of the first motor-generator. Then the proportional coefficient Kp is adjusted to reduce gradually until the system oscillation disappears. The current proportional coefficient Kp is recorded. A proportional coefficient Kp of PID is set to 60%~70% of the current value; (2) The integral time constant Ti is determined. After the proportional coefficient Kp is determined, Td is set to 0 and a bigger the integral time constant Ti is set. Then the integral time constant Ti is reduced gradually until oscillation appears in the output of the first motor-generator. Then Ti is increased gradually until the oscillation disappears. The current Ti is recorded. An integral time constant Ti of PID is set to 150%~180% of the current value; (3) the differential time constant Td is determined. Generally, the differential time constant Td does not need to be set, and is equal to 0. At this time, PID adjustment is switched to PI adjustment. If it needs to be set, the method is the same as the method of determining Ti. A bigger differential time constant Td may be set. Then Td is reduced gradually until oscillation appears in the output of the first motor-generator. Then Td is increased gradually until the oscillation disappears. The current Td is recorded. A differential time constant Td of PID is set to 30% of the current value.

SA2: controlling the first motor generator to increase an output load, adjusting the proportional coefficient, the integral time constant and the differential time constant when outputting without load until oscillation which the first motor-generator outputs disappears and recording a current proportional coefficient, a current integral time constant and a current differential time constant.

SA3: calculating an integral coefficient and a differential coefficient according the current proportional coefficient, the current integral time constant and the current differential time constant.

Specifically, for example, Ki=Kp/Ti, Kd=Kp/Td. Thus, adjustment is performed to the first motor-generator according to optimized PID parameters. Therefore, speed-adjustment time of the first motor-generator is reduced and the driving power interruption is avoided.

Figure 10:
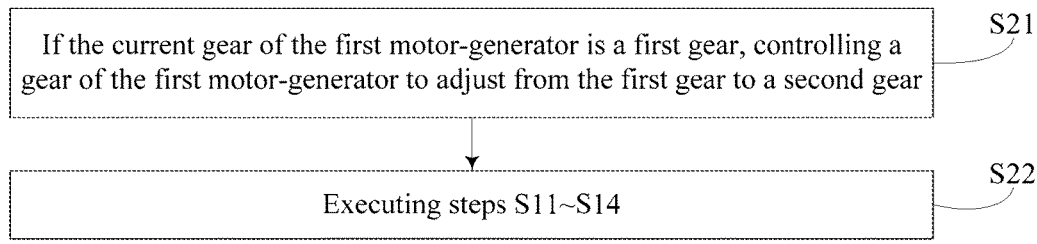
FIG. 10 is a flow chart illustrating an exemplary method of performing speed adjustment and shifting control to a first motor-generator under HEV mode according to one embodiment of the present disclosure.

In one embodiment of the present disclosure, when the work mode of the hybrid vehicle is hybrid-electric-vehicle mode, if the transmission control unit determines that the engine needs to be performed upshifting control according to the vehicle speed and the vehicle acceleration of the hybrid vehicle, referring to FIG. 10, performing speed adjustment and shifting control to the first motor-generator (speed adjustment and shifting control performed to the first motor-generator is based on the gear of the engine, when the gear of the vehicle changes, sometimes, this can cause that the gear of the first motor-generator needs to change, i.e., when to shift the gear of the first motor-generator is determined according to the gear of the engine) includes:

S21: if the current gear of the first motor-generator is a first gear, controlling a gear of the first motor-generator to adjust from the first gear to a second gear;

S22, executing steps S11~S14.

In one embodiment of the present disclosure, the power transmission system further includes a dual clutch transmission, and after determining the first motor-generator is shifted successfully, the transmission control unit controls a first clutch of the dual clutch transmission to disengage (i.e., the input terminal of the dual clutch transmission is disconnected with the first output terminal), that is, controls the clutch corresponding to the target gear of the engine to disengage and a second clutch to engage (i.e., the input terminal of the dual clutch transmission is connected with the second output terminal), and determines the engine is upshifted successfully.

Specifically, for example, under HEV mode, if the engine needs to be upshifted from gear three to gear four, because the first motor-generator is at EV1 gear currently, when the engine is upshifted from gear three to gear four, the gear-two-four synchronizer 24c needs to move right, while the gear-two-four synchronizer 24c is at left position when the first motor-generator is at EV1 gear. Therefore, in order to prevent the above situation, before the engine is upshifted from gear three to gear four, if the current gear of the first motor-generator is at EV1 gear, the first motor-generator can be shifted from EV1 gear to direct gear. When the first motor-generator works at direct gear, the driving power thereof does not pass the gear-two-four synchronizer 24c, then the engine is upshifted from gear three to gear four.

More specifically, the following are descriptions regarding, an exemplary process of speed adjustment and shifting control of the first motor-generator under HEV mode in an embodiment of the present disclosure, when the engine is upshifted from gear three to gear four.

Figure 11A:
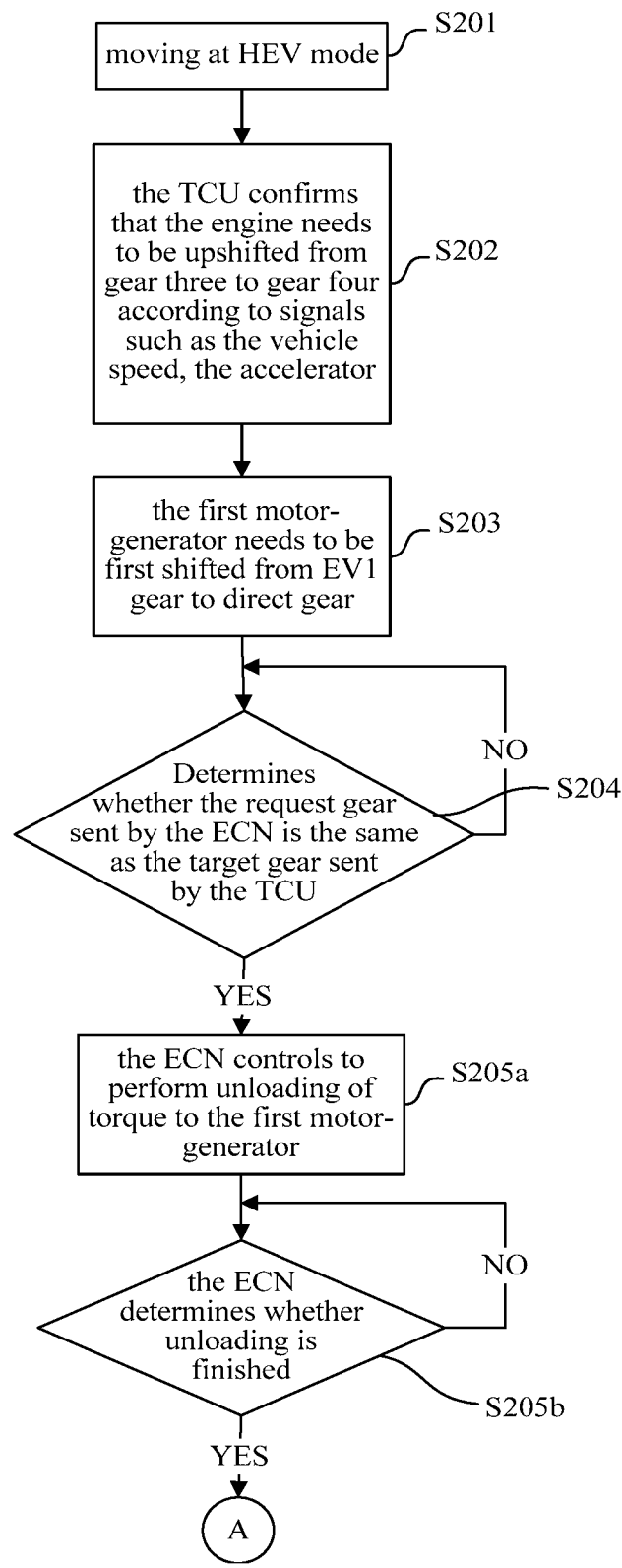
FIGS. 11A-11C show a flow chart illustrating an exemplary method of performing speed adjustment and shifting control to a first motor-generator when an engine is upshifted from gear three to gear four under HEV mode, according to one embodiment of the present disclosure.
Figure 11B:
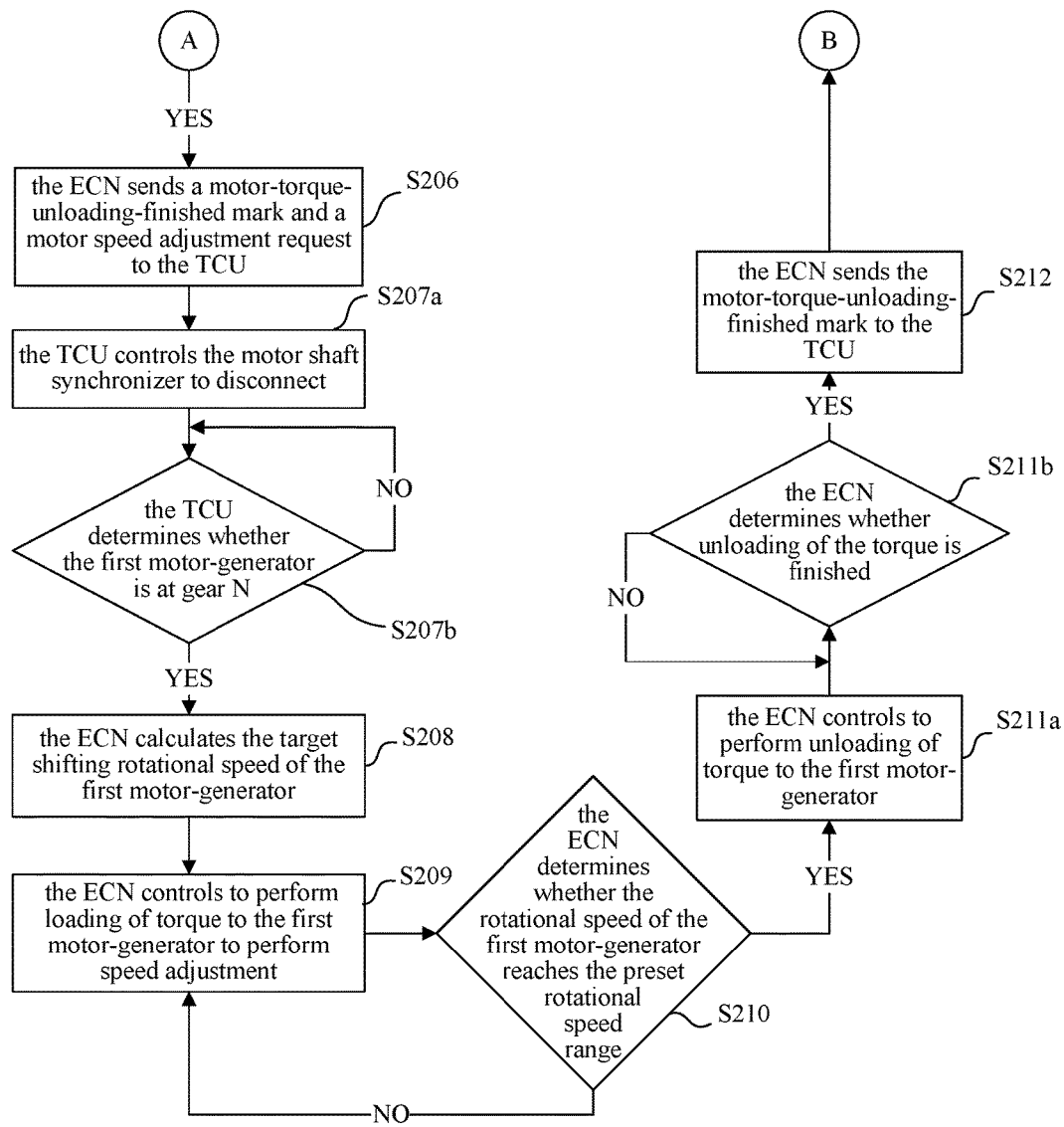
Figure 11C:
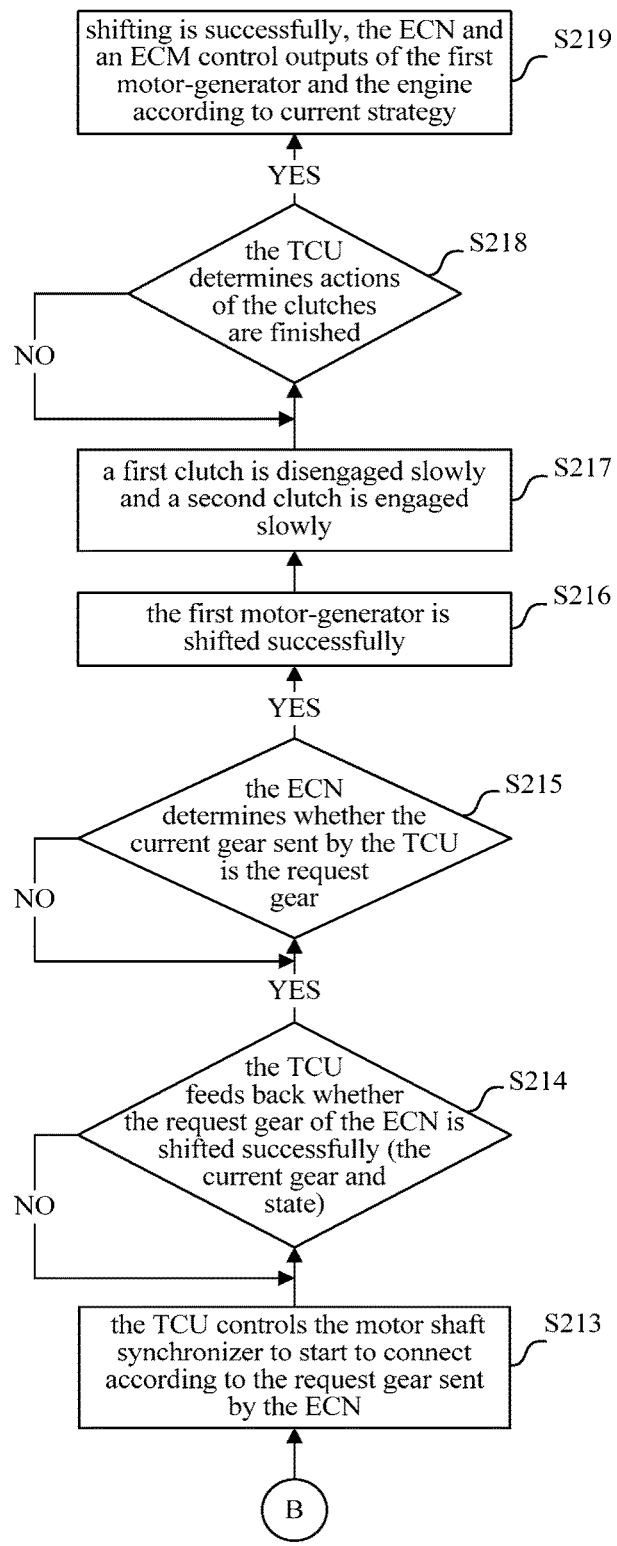

As shown in FIGS. 11A-11C, when the engine is upshifted from gear three to gear four, speed adjustment and shifting control of the first motor-generator under HEV mode includes:

S201: the vehicle moves at HEV mode.

S202: the TCU confirms that the engine needs to be upshifted from gear three to gear four according to signals such as the vehicle speed, the accelerator.

S203: the first motor-generator needs to be shifted from EV1 gear to direct gear firstly and gear three of the engine is maintained.

S204: determines whether the request gear sent by the ECN is the same as the target gear sent by the TCU, if yes, execute S205a, if no, continue to execute S204.

S205a: the ECN controls to perform unloading of torque to the first motor-generator.

S205b: the ECN determines whether unloading is finished, if yes, execute S206, if no, continue to execute S205b.

S206: the ECN sends a motor-torque-unloading-finished mark and a motor speed adjustment request to the TCU.

S207a: the TCU controls the motor shaft synchronizer to disconnect.

S207b: the TCU determines whether the first motor-generator is at neutral (i.e., gear N), if yes, execute S208, if no, continue to execute S207b.

S208: the ECN calculates the target shifting rotational speed of the first motor-generator.

S209: the ECN controls to perform loading of torque to the first motor-generator to perform speed adjustment.

S210: the ECN determines whether the rotational speed of the first motor-generator reaches the preset rotational speed range, if yes, execute S211a, if no, execute S209.

S211a: the ECN controls to perform unloading of torque to the first motor-generator.

S211b: the ECN determines whether unloading of the torque is finished, if yes, execute S212, if no, continue to execute S211b.

S212: the ECN sends the motor-torque-unloading-finished mark to the TCU.

S213: the TCU controls the motor shaft synchronizer to start to connect according to the request gear sent by the ECN.

S214: the TCU feeds back whether the request gear of the ECN is shifted successfully, if yes, execute S215, if no, continue to execute S214.

S215: the ECN determines whether the current gear sent by the TCU is the request gear, if yes, execute S216, if no, continue to execute S215.

S216: the first motor-generator is shifted successfully.

S217: a first clutch of the dual clutch transmission disengages slowly and a second clutch of the dual clutch transmission engages slowly.

S218: the TCU determines whether actions of the clutches are finished, if yes, execute S219, if no, execute S218 to continue determining.

S219: the engine is shifted successfully, the ECN and an ECM (engine control module) control outputs of the first motor-generator and the engine according to current strategy.

In one embodiment of the present disclosure, when the hybrid vehicle is switched from the electric-vehicle mode to the hybrid-electric-vehicle mode, the electromotor controller determines whether the engine needs to be started; if no, the electromotor controller further determines whether the first motor-generator needs to be performed speed adjustment and shifting control; if the electromotor controller determines that the first motor-generator needs to be performed speed adjustment and shifting control, steps S11~S14 of FIG. 7 are executed.

Figure 12:
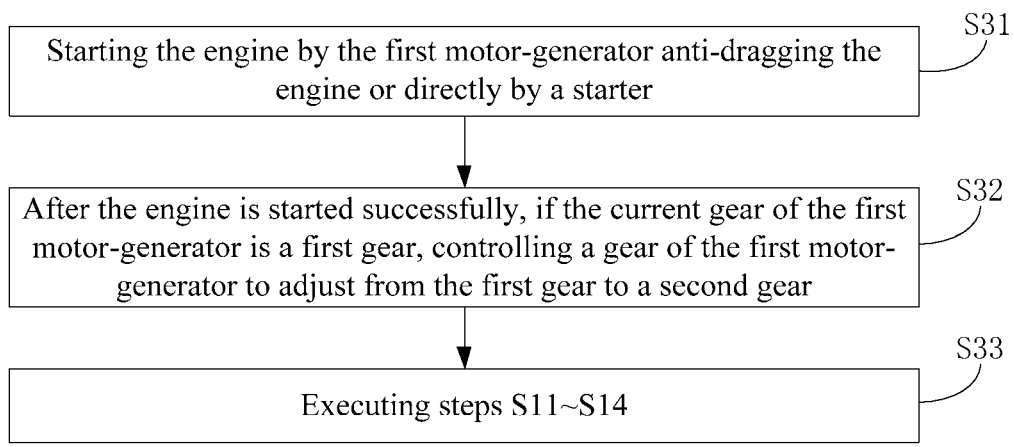
FIG. 12 is a flow chart illustrating an exemplary method of performing speed adjustment and shifting control to a first motor-generator when an engine needs to be performed upshifting control, according to one embodiment of the present disclosure.

In addition, in one embodiment of the present disclosure, if the electromotor controller determines that the engine needs to be started, and the transmission control unit determines that the engine needs to be performed upshifting control according to the vehicle speed and the vehicle acceleration of the hybrid vehicle, referring to FIG. 12, performing speed adjustment and shifting control to the first motor-generator includes:

S31, starting the engine by the first motor-generator anti-dragging the engine or directly by a starter;

S32, after the engine is started successfully, if the current gear of the first motor-generator is a first gear, controlling a gear of the first motor-generator to adjust from the first gear to a second gear;

S33, executing steps S11~S14.

Further, in one embodiment of the present disclosure, the power transmission system further includes a dual clutch transmission, and after determining the first motor-generator is shifted successfully, the transmission control unit controls a first clutch of the dual clutch transmission to disengage and a second clutch of the dual clutch transmission to engage, and determines that the engine is upshifted successfully.

Furthermore, when EV mode is switched to HEV mode and the engine is upshifted, if the engine needs to be shifted to gear four when started, and the gear of the first motor-generator is at EV1 gear. At this time, it is the same as the situation when the engine is upshifted from gear three to gear four, speed adjustment and shifting control of the first motor-generator is performed under HEV mode. In addition, generally the gear of an engine is upshifted gradually, but, when EV mode is switched to HEV mode, the vehicle speed has reached a certain value; therefore, a higher gear is shifted directly. This is similar to upshifting control of the engine.

Figure 13A:
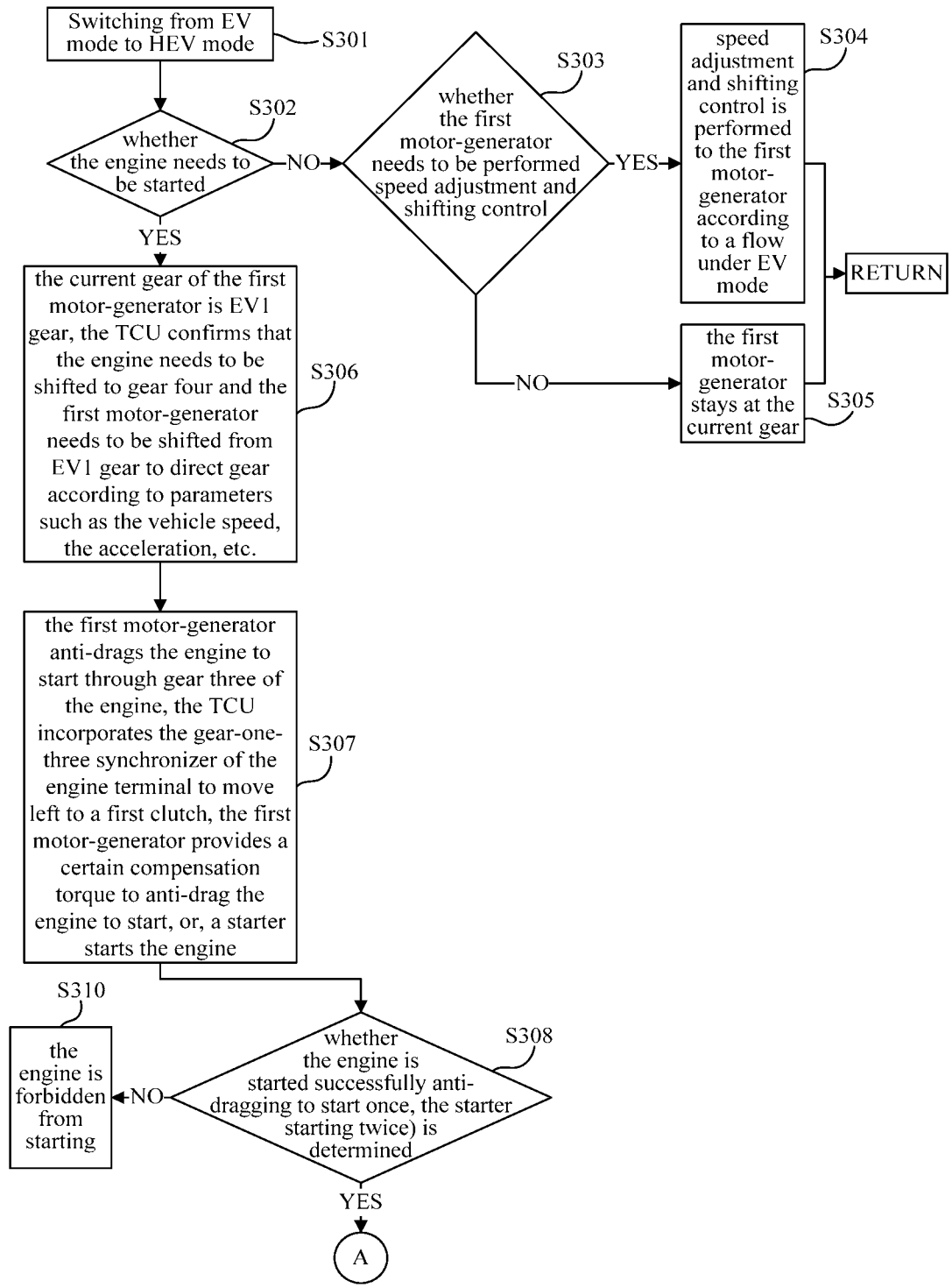
FIGS. 13A-13C show a flow chart illustrating an exemplary method of performing speed adjustment and shifting control to a first motor-generator when EV mode is switched to HEV mode and an engine is upshifted, according to one embodiment of the present disclosure.
Figure 13B:
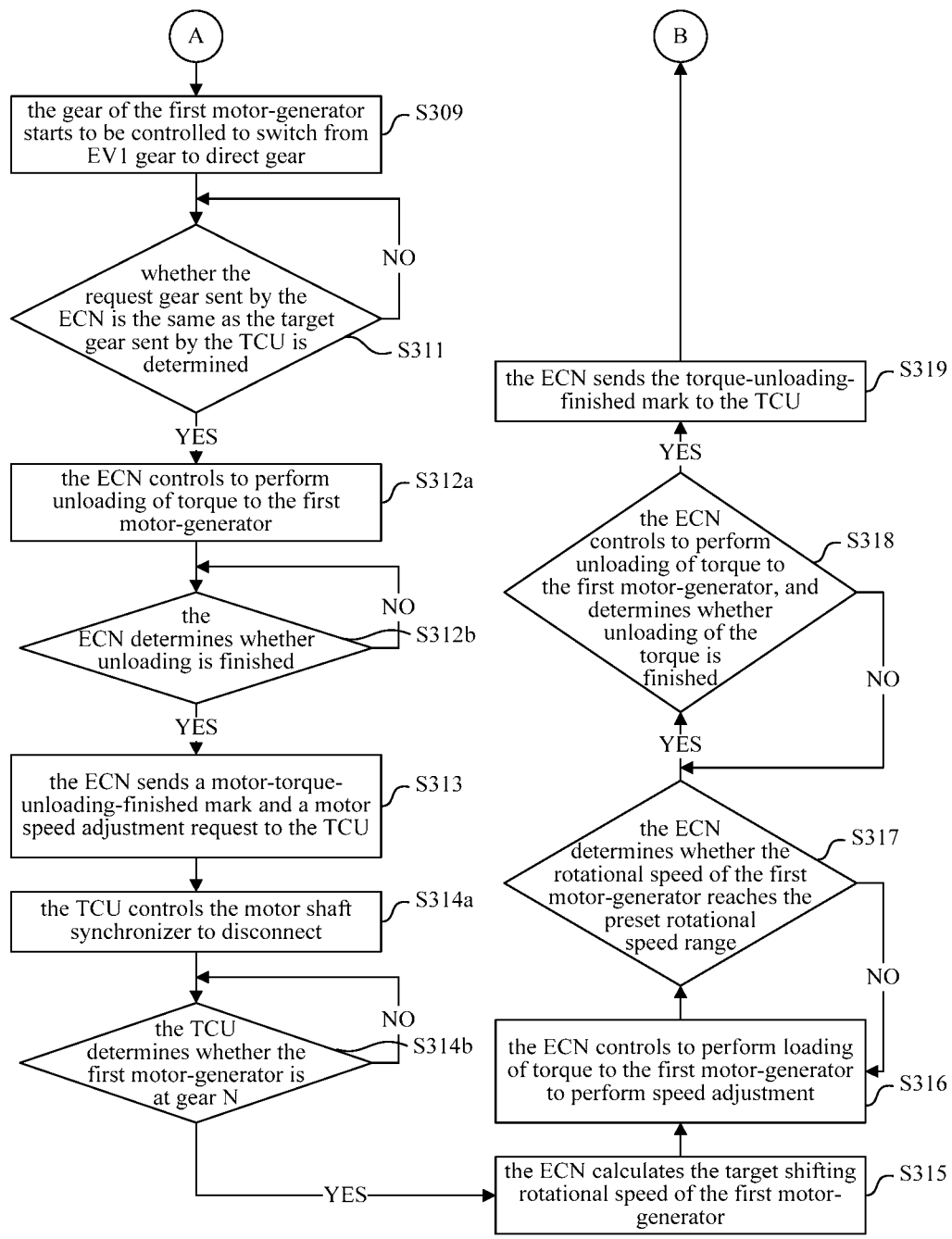
Figure 13C:
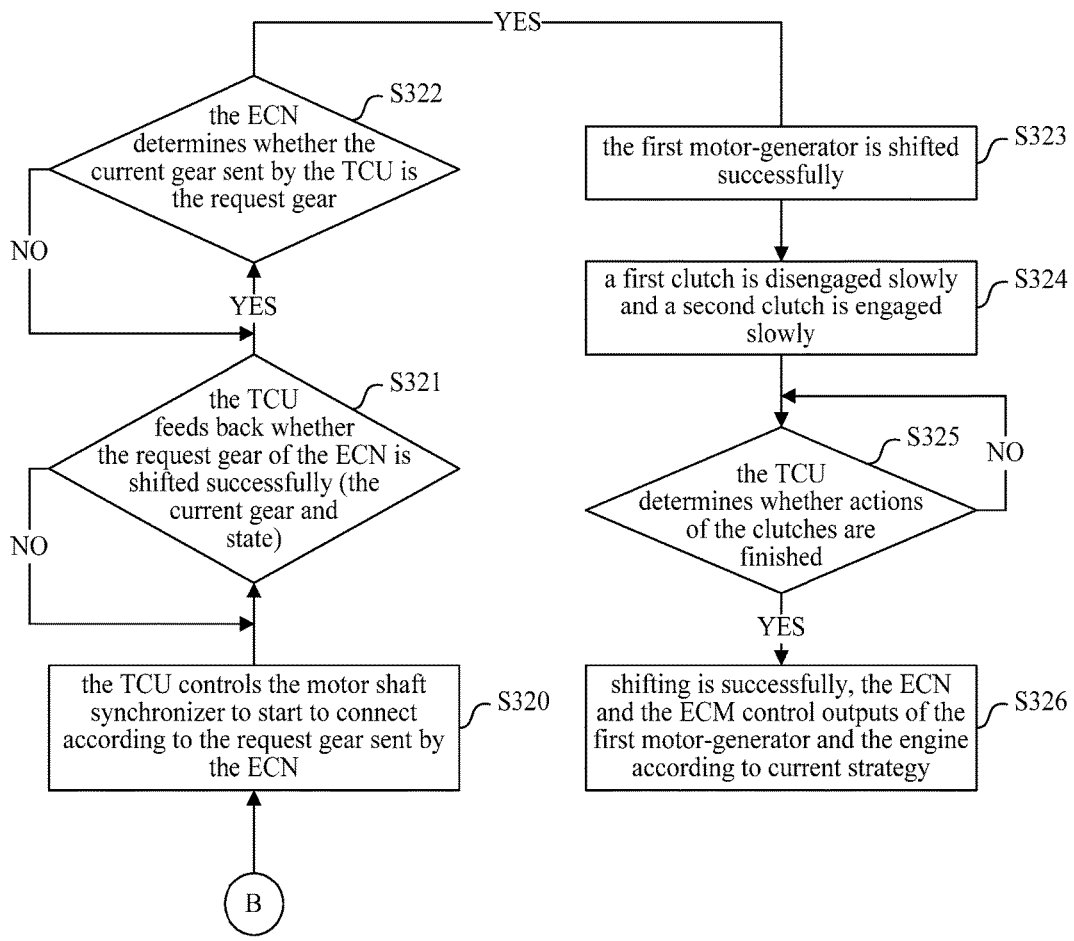

As shown in FIGS. 13A-13C, when EV mode is switched to HEV mode and the engine is upshifted, speed adjustment and shifting control of the first motor-generator includes:

S301: switching from EV mode to HEV mode.

S302: the ECN determines whether the engine needs to be started, if yes, execute S306, if no, execute S303.

S303: the ECN determines whether the first motor-generator needs to be performed speed adjustment and shifting control, if yes, execute S304, if no, execute S305.

S304: speed adjustment and shifting control is performed to the first motor-generator according to a flow under EV mode (i.e., the flow in steps S11~S14).

S305: the first motor-generator stays at the current gear.

S306: the current gear of the first motor-generator is EV1 gear, the TCU confirms that the engine needs to be shifted to gear four and the first motor-generator needs to be shifted from EV1 gear to direct gear according to parameters such as the vehicle speed, the acceleration, etc.

S307: the first motor-generator anti-drags the engine to start through gear three of the engine, the TCU incorporates the gear-one-three synchronizer of the engine terminal to move left to a first clutch, the first motor-generator provides a certain compensation torque to anti-drag the engine to start, or, a starter starts the engine directly. A clutch corresponding to odd gears of the engine is the first clutch K1. A clutch corresponding to even gears of the engine is the second clutch K2.

S308: whether the engine is started successfully (anti-dragging to start once, the starter starting twice) is determined. If anti-dragging is not successful, the starter can be used to start the engine. Anti-dragging to start is allowed once, and the starter starting is allowed twice. If the engine is started successfully, execute S309, if the starting is not successful, execute S310.

S309: the gear of the first motor-generator starts to be controlled to switch from EV1 gear to direct gear.

S310: the engine is forbidden from starting.

S311: whether the request gear sent by the ECN is the same as the target gear sent by the TCU is determined, if yes, execute S312a, if no, continue to execute S311.

S312a: the ECN controls to perform unloading of torque to the first motor-generator.

S312b: the ECN determines whether unloading is finished, if yes, execute S313, if no, continue to execute S312b.

S313: the ECN sends a motor-torque-unloading-finished mark and a motor speed adjustment request to the TCU.

S314a: the TCU controls the motor shaft synchronizer to disconnect.

S314b: the TCU determines whether the first motor-generator is at neutral (i.e., gear N), if yes, execute S315, if no, execute S314b to continue determining.

S315: the ECN calculates the target shifting rotational speed of the first motor-generator.

S316: the ECN controls to perform loading of torque to the first motor-generator to perform speed adjustment.

S317: the ECN determines whether the rotational speed of the first motor-generator reaches the preset rotational speed range, if yes, execute S318, if no, execute S316 to continue speed adjustment.

S318: the ECN controls to perform unloading of torque to the first motor-generator, and determines whether unloading of the torque is finished, if yes, execute S319, if no, continue to execute S318.

S319: the ECN sends the torque-unloading-finished mark to the TCU.

S320: the TCU controls the motor shaft synchronizer to start to connect according to the request gear sent by the ECN.

S321: the TCU feeds back whether the request gear of the ECN is shifted successfully (the current gear and state), if yes, execute S322, if no, continue to execute S321.

S322: the ECN determines whether the current gear sent by the TCU is the request gear, if yes, execute S323, if no, continue to execute S322.

S323: the first motor-generator is shifted successfully.

S324: a first clutch of the dual clutch transmission disengages slowly and a second clutch of the dual clutch transmission engages slowly.

S325: the TCU determines whether actions of the clutches are finished, if yes, execute S326, if no, continue determining.

S325: the engine is shifted successfully, the ECN and the ECM control outputs of the first motor-generator and the engine according to current strategy.

Figure 14:
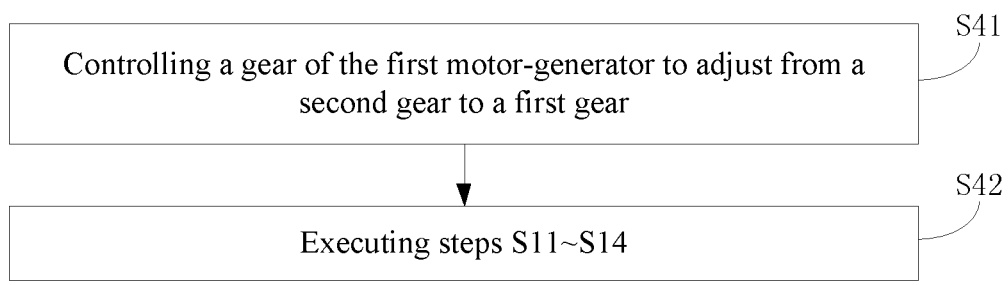
FIG. 14 is a flow chart illustrating an exemplary method of performing speed adjustment and shifting control to a first motor-generator under HEV mode when an engine needs to be performed downshifting control, according to one embodiment of the present disclosure.

In one embodiment of the present disclosure, when the work mode of the hybrid vehicle is the hybrid-electric-vehicle mode, if the transmission control unit determines that the engine needs to be performed downshifting control according to the vehicle speed and the vehicle acceleration of the hybrid vehicle, referring to FIG. 14, performing speed adjustment and shifting control to the first motor-generator includes:

S41, controlling a gear of the first motor-generator to adjust from a second gear to a first gear;

S42, executing steps S11~S14.

Further, in one embodiment of the present disclosure, the power transmission system further includes a dual clutch transmission, and after determining the first motor-generator is shifted successfully, the transmission control unit controls a first clutch of the dual clutch transmission to disengage and a second clutch of the dual clutch transmission to engage, and determines that the engine is downshifted successfully.

Specifically, for example, under HEV mode, in the process of downshifting, if the engine needs to be downshifted from gear three to gear two, the first motor-generator needs to be downshifted from direct gear to EV1 gear. At this time, if the engine is first downshifted from gear three to gear two, because the second clutch is at an engaging state, there is driving power outputted from the first motor shaft gear. The motor shaft synchronizer cannot move left, and as a result, the first motor-generator cannot be shifted to EV1 gear. In order to avoid the above situation, when the engine is downshifted from gear three to gear two, the first motor-generator may need to be first downshifted from direct gear to EV1 gear. This ensures that the first motor-generator is first downshifted from direct gear to EV1 gear. When the first motor-generator is at EV1 gear, the motor shaft synchronizer moves left, and then the engine is downshifted from gear three to gear two.

Figure 15A:
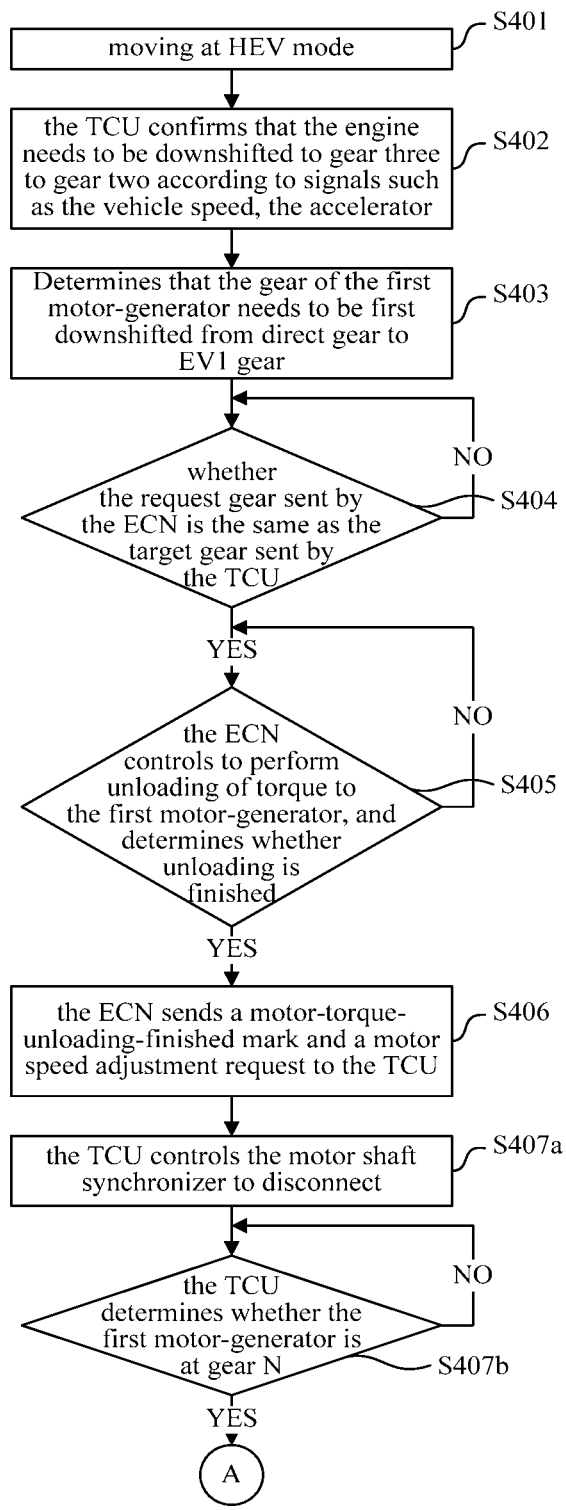
FIGS. 15A-15C show a flow chart illustrating an exemplary method of performing speed adjustment and shifting control to a first motor-generator when an engine is downshifted from gear three to gear two under HEV mode, according to one embodiment of the present disclosure.
Figure 15B:
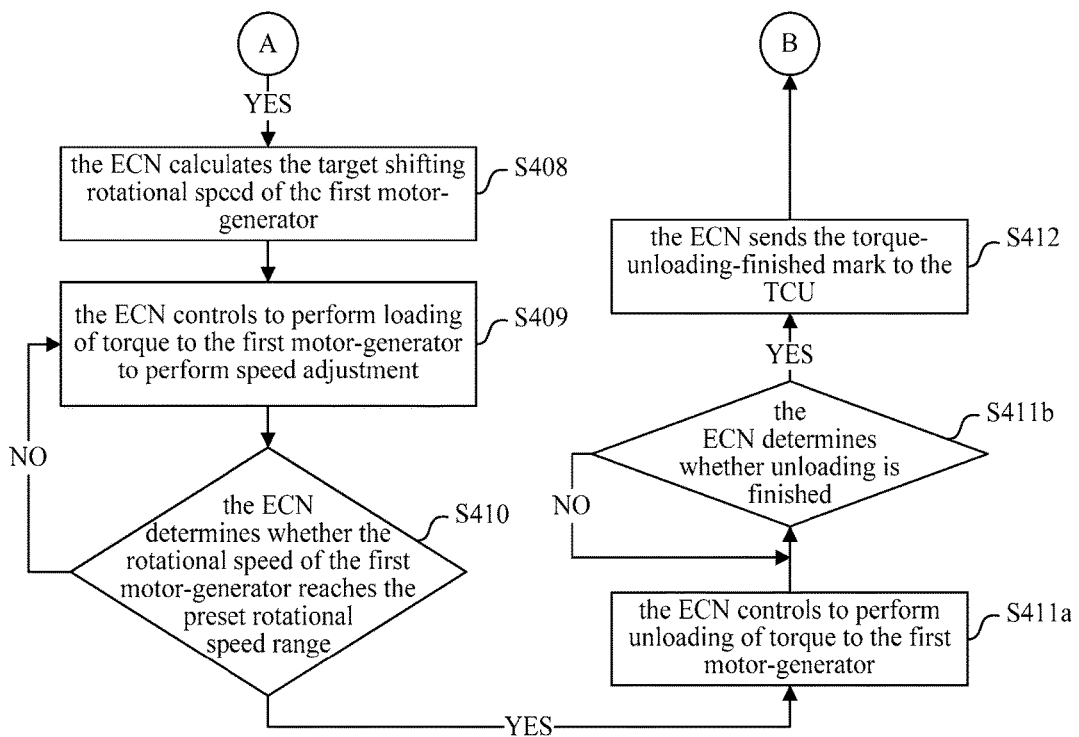
Figure 15C:
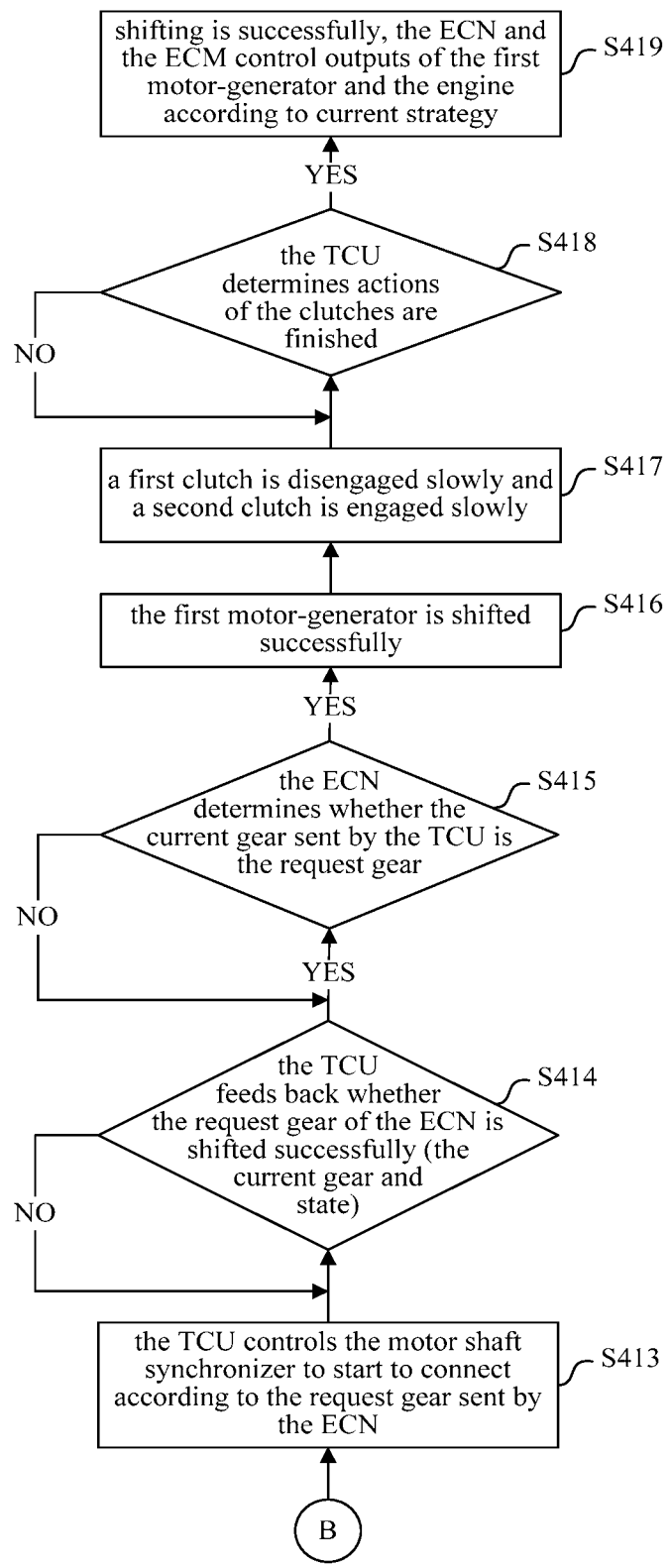

In some embodiments, as shown in FIGS. 15A-15C, when the engine is downshifted from gear three to gear two, speed adjustment and shifting control of the first motor-generator under HEV mode includes:

S401: the vehicle moves at HEV mode.

S402: the TCU confirms that the engine needs to be downshifted to gear three to gear two according to signals such as the vehicle speed, the accelerator.

S403: determines that the gear of the first motor-generator needs to be first downshifted from direct gear to EV1 gear.

S404: whether the request gear sent by the ECN is the same as the target gear sent by the TCU is determined, if yes, execute S405, if no, continue to execute S404.

S405: the ECN controls to perform unloading of torque to the first motor-generator, and determines whether unloading is finished, if yes, execute S406, if no, continue to execute S405.

S406: the ECN sends a motor-torque-unloading-finished mark and a motor speed adjustment request to the TCU.

S407a: the TCU controls the motor shaft synchronizer to disconnect.

S407b: the TCU determines whether the first motor-generator is at neutral (i.e., gear N), if yes, execute S408, if no, continue to execute S407b.

S408: the ECN calculates the target shifting rotational speed of the first motor-generator.

S409: the ECN controls to perform loading of torque to the first motor-generator to perform speed adjustment.

S410: the ECN determines whether the rotational speed of the first motor-generator reaches the preset rotational speed range, if yes, execute S411a, if no, execute S209 to continue speed adjustment.

S411a: the ECN controls to perform unloading of torque to the first motor-generator.

S411b: the ECN determines whether unloading of the torque is finished, if yes, execute S412, if no, execute S411a to continue unloading.

S412: the ECN sends the torque-unloading-finished mark to the TCU.

S413: the TCU controls the motor shaft synchronizer to start to connect according to the request gear sent by the ECN.

S414: the TCU feeds back whether the request gear of the ECN is shifted successfully (the current gear and state), if yes, execute S415, if no, execute S414 to continue determining.

S415: the ECN determines whether the current gear sent by the TCU is the request gear, if yes, execute S416, if no, execute S215 to continue determining.

S416: the first motor-generator is shifted successfully.

S417: a first clutch disengages slowly and a second clutch engages slowly.

S418: the TCU determines whether actions of the clutches are finished, if yes, execute S419, if no, execute S418 to continue determining.

S419: the engine is shifted successfully, the ECN and the ECM control outputs of the first motor-generator and the engine according to current strategy.

In one embodiment of the present disclosure, when the hybrid vehicle is switched from the electric-vehicle mode to the hybrid-electric-vehicle mode, the electromotor controller determines whether the engine needs to be started; if no, the electromotor controller further determines whether the first motor-generator needs to be performed speed adjustment and shifting control; if the electromotor controller determines that the first motor-generator needs to be performed speed adjustment and shifting control, steps S11~S14 are executed.

Figure 16:
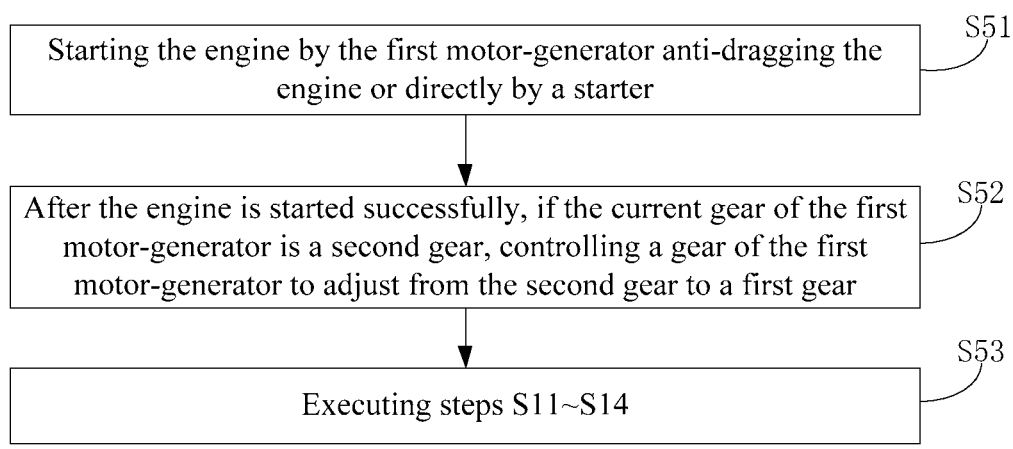
FIG. 16 is a flow chart illustrating an exemplary method of performing speed adjustment and shifting control to a first motor-generator under HEV mode when an engine needs to be performed downshifting control, according to one embodiment of the present disclosure.

In addition, in one embodiment of the present disclosure, if the electromotor controller determines that the engine needs to be started, and the transmission control unit determines that the engine needs to be performed downshifting control according to the vehicle speed and the vehicle acceleration of the hybrid vehicle, referring to FIG. 16, performing speed adjustment and shifting control to the first motor-generator includes:

S51, starting the engine by the first motor-generator anti-dragging the engine or directly by a starter;

S52, after the engine is started successfully, if the current gear of the first motor-generator is a second gear, controlling a gear of the first motor-generator to adjust from the second gear to a first gear;

S53, executing steps S11~S14.

Further, in one embodiment of the present disclosure, the power transmission system further includes a dual clutch transmission, and after determining the first motor-generator is shifted successfully, the transmission control unit controls a first clutch of the dual clutch transmission to disengage and a second clutch of the dual clutch transmission to engage, and determines that the engine is downshifted successfully.

More specifically, following are descriptions made to, when EV mode is switched to HEV mode and the engine is downshifted, a specific process of speed adjustment and shifting control of the first motor-generator in a specific embodiment.

When EV mode is switched to HEV mode and the engine is downshifted, if the first motor-generator is at EV1 gear and the engine needs to be shifted to gear two. At this time, it is the same as the situation where when the engine is downshifted from gear three to gear two, speed adjustment and shifting control of the first motor-generator is performed under HEV mode. Generally, the gear of an engine is downshifted gradually, but, when EV mode is switched to HEV mode, the vehicle speed has been dropped to a certain value, therefore, a lower gear is shifted directly. Here is equivalent to downshift control of the engine.

Figure 17A:
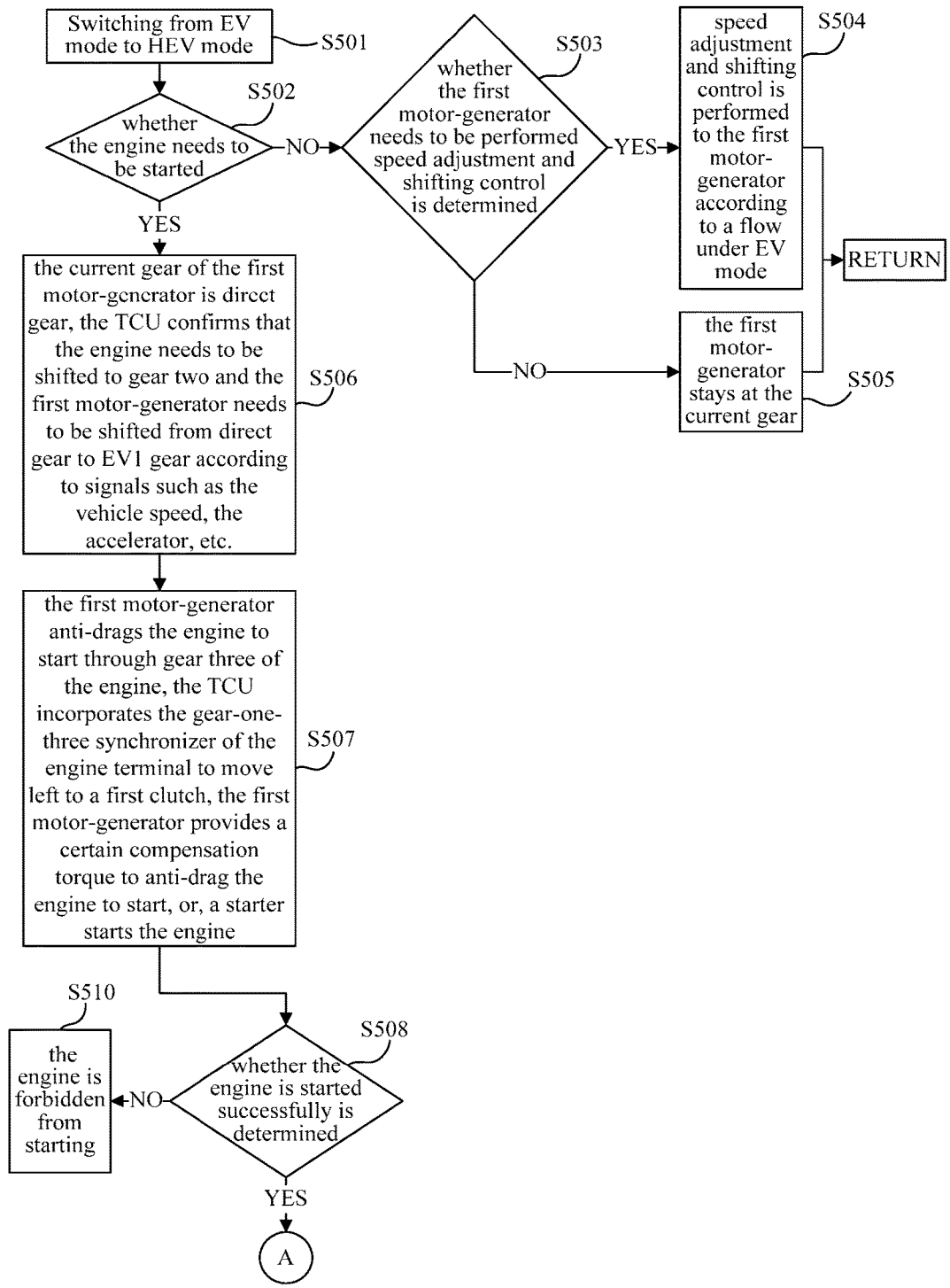
FIGS. 17A-17C show a flow chart illustrating an exemplary method of performing speed adjustment and shifting control to a first motor-generator when EV mode is switched to HEV mode and an engine is downshifted, according to one embodiment of the present disclosure.
Figure 17B:
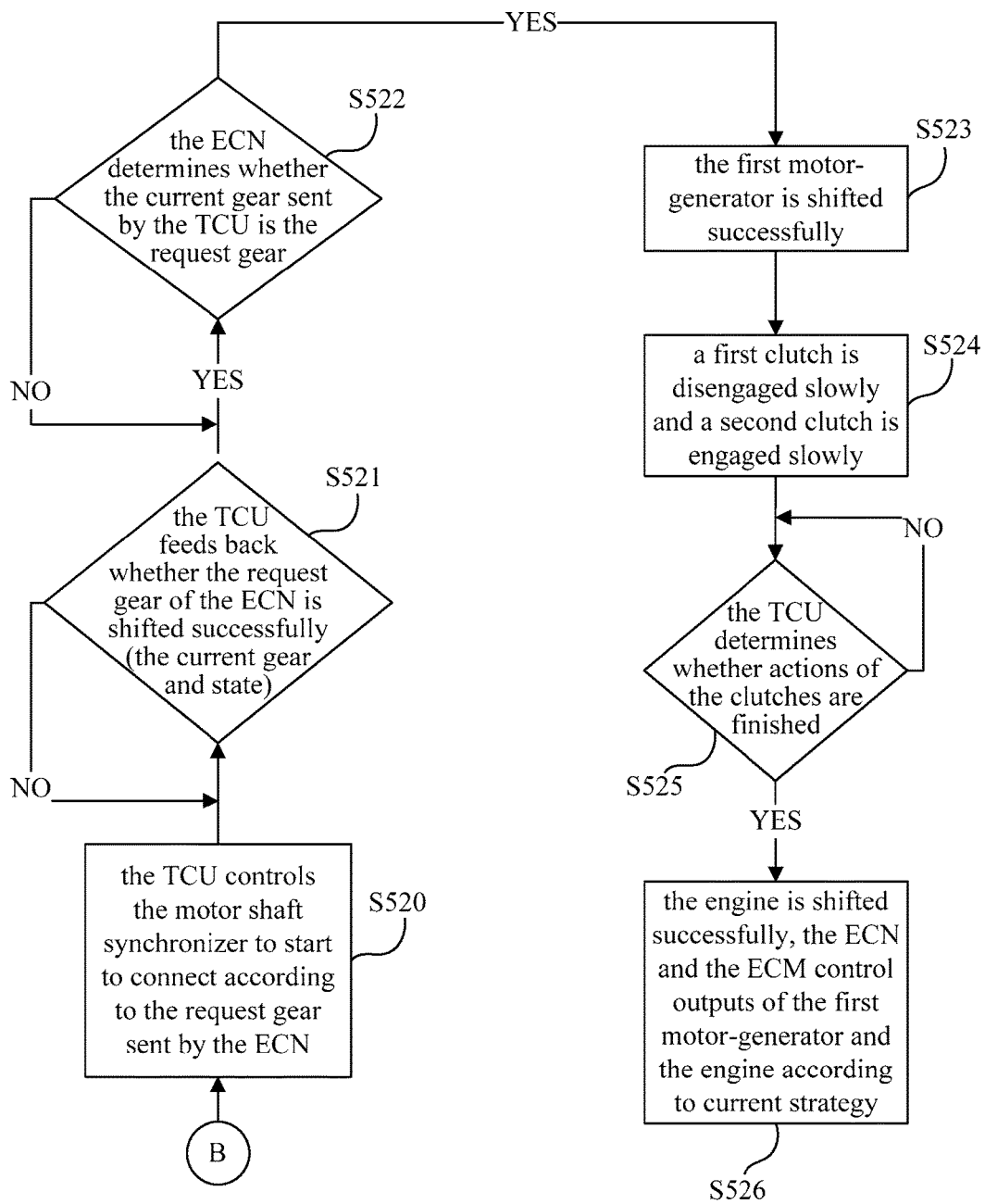
Figure 17C:
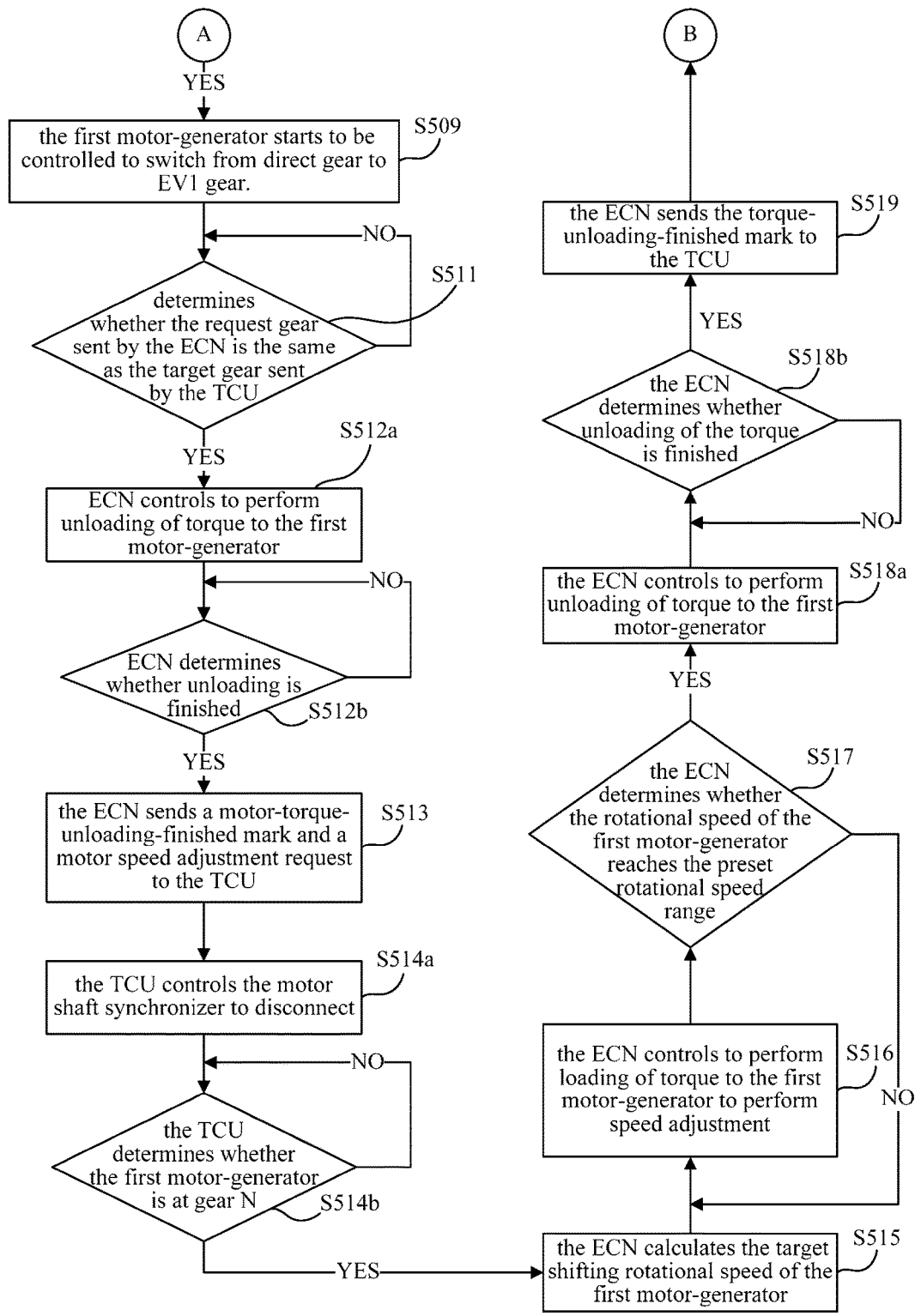

As shown in FIGS. 17A-17C, when EV mode is switched to HEV mode and the engine is downshifted, speed adjustment and shifting control of the first motor-generator includes:

S501: switching from EV mode to HEV mode.

S502: the ECN determines whether the engine needs to be started, if yes, execute S506, if no, execute S503.

S503: the ECN determines whether the first motor-generator needs to be performed speed adjustment and shifting control, if yes, execute S504, if no, execute S505.

S504: speed adjustment and shifting control is performed to the first motor-generator according to a flow under EV mode (i.e., the flow in steps S11~S14).

S505: the first motor-generator stays at the current gear.

S506: the current gear of the first motor-generator is direct gear, the TCU confirms that the engine needs to be shifted to gear two and the first motor-generator needs to be shifted from direct gear to EV1 gear according to signals such as the vehicle speed, the accelerator, etc.

S507: the first motor-generator anti-drags the engine to start through gear three of the engine, the TCU incorporates the gear-one-three synchronizer of the engine terminal to move left to a first clutch, the first motor-generator provides a certain compensation torque to anti-drag the engine to start, or, a starter starts the engine directly.

S508: whether the engine is started successfully (anti-dragging to start once, the starter starting twice) is determined. If anti-dragging is not successful, the starter can be used to start the engine. Anti-dragging to start is allowed once, and the starter starting is allowed twice. If the engine is started successfully, execute S509, if the starting is unsuccessful, execute S510.

S509: the first motor-generator starts to be controlled to switch from direct gear to EV1 gear.

S510: the engine is forbidden from starting.

S511: determines whether the request gear sent by the ECN is the same as the target gear sent by the TCU, if yes, execute S512a, if no, execute S511 to continue determining.

S512a: the ECN controls to perform unloading of torque to the first motor-generator.

S512b: the ECN determines whether unloading is finished, if yes, execute S513, if no, execute S512b to continue unloading.

S513: the ECN sends a motor-torque-unloading-finished mark and a motor speed adjustment request to the TCU.

S514a: the TCU controls the motor shaft synchronizer to disconnect.

S514b: the TCU determines whether the first motor-generator is at gear N, if yes, execute S515, if no, execute S514b to continue monitoring whether the first motor-generator is at gear N.

S515: the ECN calculates the target shifting rotational speed of the first motor-generator.

S516: the ECN controls to perform loading of torque to the first motor-generator to perform speed adjustment.

S517: the ECN determines whether the rotational speed of the first motor-generator reaches the preset rotational speed range, if yes, execute S518a, if no, execute S516 to continue speed adjustment.

S518a: the ECN controls to perform unloading of torque to the first motor-generator.

S518b: the ECN determines whether unloading of the torque is finished, if yes, execute S519, if no, execute S518b to continue unloading.

S519: the ECN sends the torque-unloading-finished mark to the TCU.

S520: the TCU controls the motor shaft synchronizer to start to connect according to the request gear sent by the ECN.

S521: the TCU feeds back whether the request gear of the ECN is shifted successfully (the current gear and state), if yes, execute S522, if no, execute S521 to continue determining.

S522: the ECN determines whether the current gear sent by the TCU is the request gear, if yes, execute S523, if no, execute S522 to continue determining.

S523: the first motor-generator is shifted successfully.

S524: a first clutch disengages slowly and a second clutch engages slowly.

S525: the TCU determines whether actions of the clutches are finished, if yes, execute S526, if no, continue determining.

S526: the engine is shifted successfully, the ECN and the ECM control outputs of the first motor-generator and the engine according to current strategy.

Other shifting processes of the engine are described as follows. In upshifting processes of the engine, when the engine is upshifted from gear one to gear two, the gear-two-four synchronizer needs to be at left position. At this time, the first motor-generator is at EV1 gear. The gear-two-four synchronizer is at the left position. Therefore, the first motor-generator may not need to be performed shifting control. When the engine is upshifted from gear two to gear three, the gear-one-three synchronizer may need to be at left position. At this time, the first motor-generator is at EV1 gear, and the gear-two-four synchronizer is at the left position, which may not cause effect to the engine at gear three position. Therefore, the first motor-generator may not need to be performed shifting control. When the engine is upshifted from gear four to gear five, the gear-five synchronizer needs to be at right position. At this time, the first motor-generator is at direct gear, which may not cause effect to the engine at gear five position. Therefore, the first motor-generator may not need to be performed shifting control.

In downshifting processes of the engine, when the engine is downshifted from gear five to gear four, the gear-five synchronizer may need to be at right position. At this time, the first motor-generator is at direct gear, which may not cause effect to the engine at gear five position. Therefore, the first motor-generator may not need to be performed shifting control. When the engine is downshifted from gear four to gear three, the gear-one-three synchronizer is at left position. At this time, the first motor-generator is at direct gear, which may not cause effect to the engine at gear three position. Therefore, the first motor-generator may not need to be performed shifting control. When the engine is downshifted from gear two to gear one, the gear-one-three synchronizer is at right position. The first motor-generator is at EV1 gear, which may not cause effect to the engine at gear one position. Therefore, the first motor-generator does not need to be performed shifting control.

Figure 18:
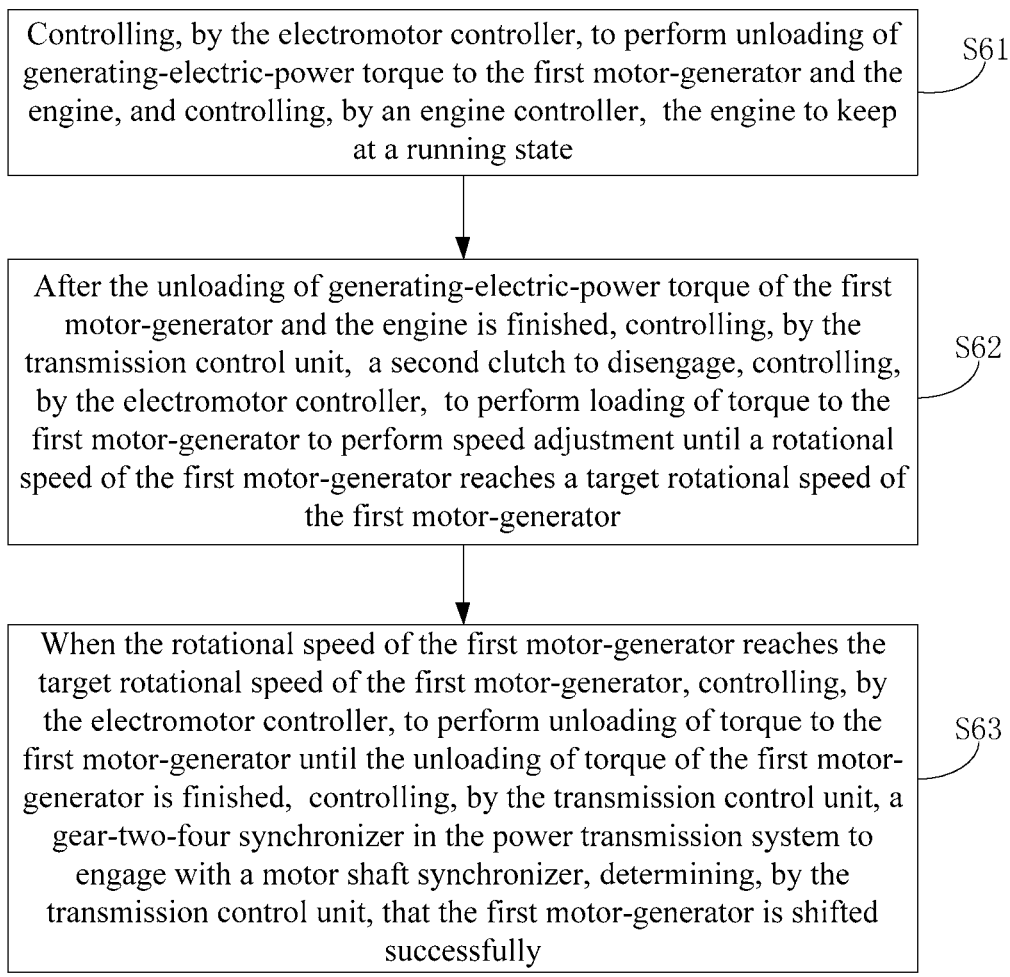
FIG. 18 is a flow chart illustrating an exemplary method of performing speed adjustment and shifting control to a first motor-generator under HEV mode when an electromotor controller cancels generating electric power in place of the hybrid vehicle, according to one embodiment of the present disclosure.

In one embodiment of the present disclosure, when the hybrid vehicle stays in place and the engine drives the first motor-generator to generate electric power, if the current gear of the hybrid vehicle is gear D, a transmission control unit controls the engine to be pre-shifted to gear one and controls a gear-one-three synchronizer in the power transmission system to move towards a first direction, after a brake pedal of the hybrid vehicle is released and an electromotor controller cancels generating electric power in place of the hybrid vehicle and the transmission control unit controls a first clutch to engage, referring to FIG. 18, performing speed adjustment and shifting control to the first motor-generator includes:

S61: controlling, by the electromotor controller, to perform unloading of generating-electric-power torque to the first motor-generator and the engine, and controlling, by an engine controller, the engine to keep at a running state.

S62: after the unloading of generating-electric-power torque of the first motor-generator and the engine is finished, controlling, by the transmission control unit, a second clutch to disengage, controlling, by the electromotor controller, to perform loading of torque to the first motor-generator to perform speed adjustment until a rotational speed of the first motor-generator reaches a target rotational speed of the first motor-generator.

S63: when the rotational speed of the first motor-generator reaches the target rotational speed of the first motor-generator, controlling, by the electromotor controller, to perform unloading of torque to the first motor-generator until the unloading of torque of the first motor-generator is finished, controlling, by the transmission control unit, a gear-two-four synchronizer in the power transmission system to engage with a motor shaft synchronizer, determining, by the transmission control unit, that the first motor-generator is shifted successfully.

Specifically, for example, the vehicle stays in place to generate electric power, and the second clutch engages, and the motor shaft synchronizer moves left. At this time, the engine drives the first motor-generator to generate electric power at a certain rotational speed. When the gear is switched to gear D to be ready to move the vehicle, at this time, speed adjustment may need to be performed to the first motor-generator, causing its rotational speed to zero. Then shifting is performed to the first motor-generator. If the engine is stopped while the speed adjustment and shifting of the first motor-generator are going on, the first motor-generator may not respond in time to the accelerator opening degree, resulting in the delayed movement of vehicle. In order to avoid the above situation, when a battery charge increases above a certain valve, and the vehicle speed exceeds zero, and vehicle speed start-stop conditions are met or HEV mode is switched to EV mode, the engine will be stopped. Otherwise the engine will not be stopped until the vehicle speed becomes zero and the battery charge exceeds a limited point of generating electric power in place.

Figure 19A:
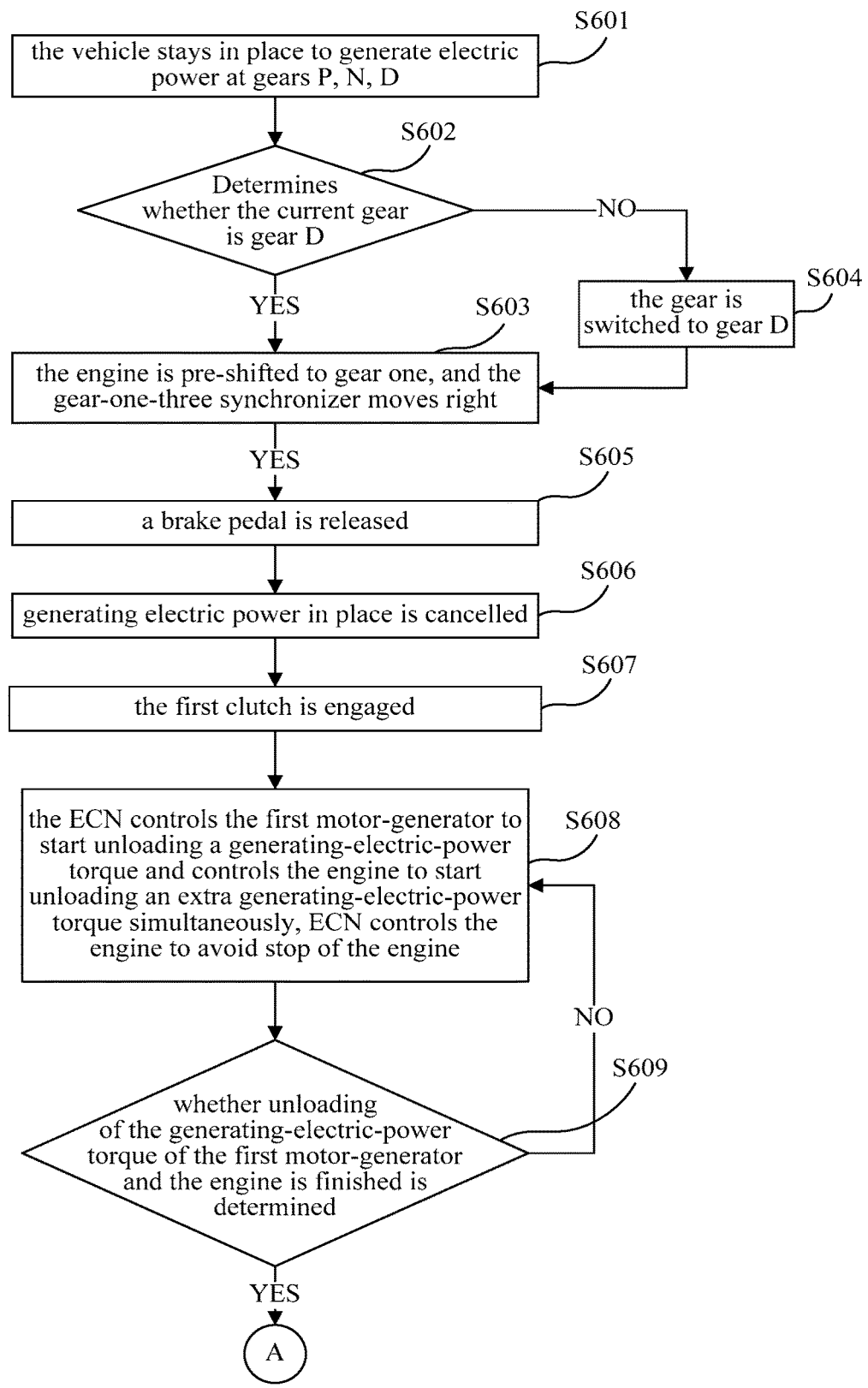
FIGS. 19A and 19B show a flow chart illustrating an exemplary method of performing speed adjustment and shifting control to a first motor-generator when generating electric power in place to moving at gear for forward driving, according to one embodiment of the present disclosure.
Figure 19B:
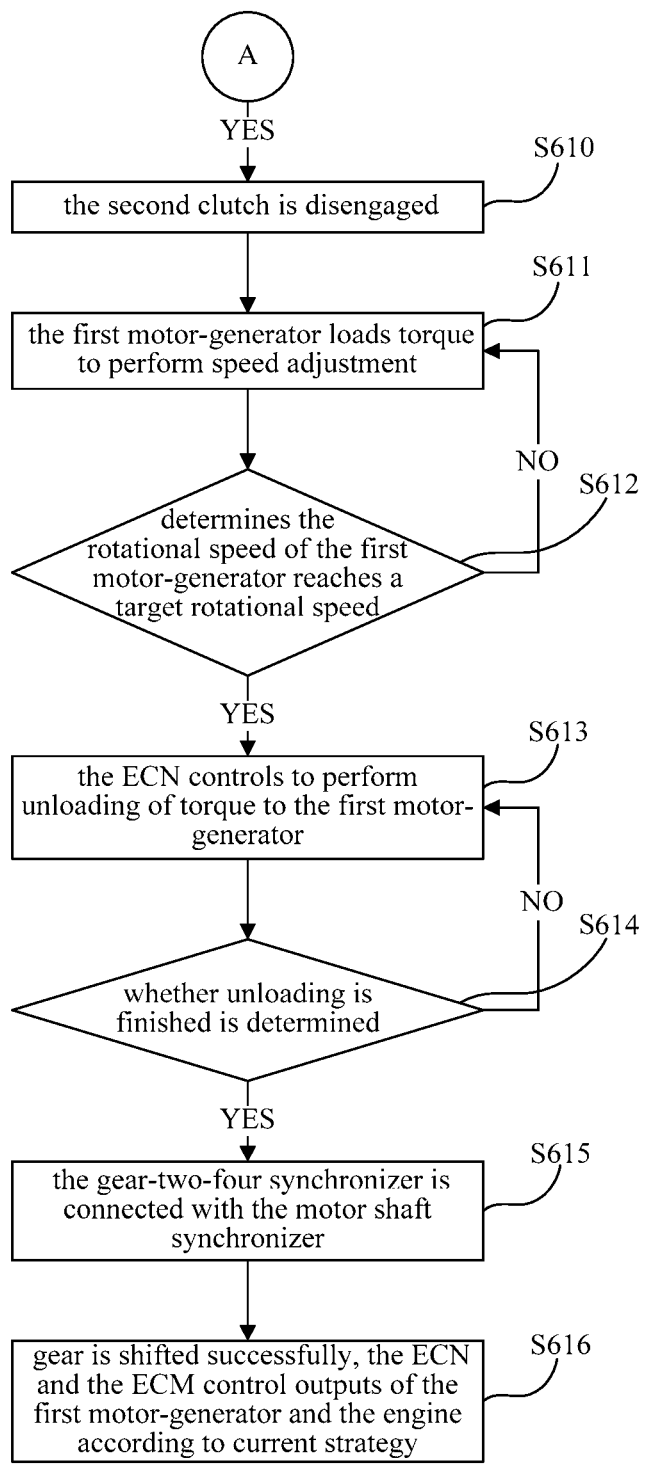

In some embodiments, as shown in FIGS. 19A-19B, when generating electric power in place to moving at gear D, a process of speed adjustment and shifting control of the first motor-generator includes:

S601: the vehicle stays in place to generate electric power at gears P, N, D.

S602: determines whether the current gear is gear D, if yes, execute S603, if no, execute S604.

S603: the engine is pre-shifted to gear one, and the gear-one-three synchronizer moves right.

S604: the gear is switched to gear D.

S605: determines whether a brake pedal is released, if yes, execute S606, if no, generating electric power in place is maintained.

S606: generating electric power in place is cancelled.

S607: the first clutch engages.

S608: the ECN controls the first motor-generator to start unloading a generating-electric-power torque and controls the engine to start unloading an extra generating-electric-power torque simultaneously.

S609: whether unloading of the generating-electric-power torque of the first motor-generator and the engine is finished is determined, if yes, execute S610, if no, continue to unloading.

S610: the second clutch disengages.

S611: the first motor-generator loads torque to perform speed adjustment.

S612: determines whether the rotational speed of the first motor-generator reaches a target rotational speed, if yes, execute S613, if no, continue speed adjustment.

S613: the ECN controls to perform unloading of torque to the first motor-generator.

S614: determines whether unloading is finished, if yes, execute S615, if no, continue unloading.

S615: the gear-two-four synchronizer is connected with the motor shaft synchronizer.

S616: gear is shifted successfully, the ECN and the ECM control outputs of the first motor-generator and the engine according to current strategy.

The shifting control method for the hybrid vehicle, according to embodiments of the present disclosure, detects operating parameters of the hybrid vehicle, determines work mode of the hybrid vehicle, then performs speed adjustment and shifting control to the first motor-generator 51 according to work mode and the operating parameters of the hybrid vehicle to implement shifting control of the hybrid vehicle. The method includes various configurations for performing speed adjustment and shifting control to the first motor-generator, for example speed adjustment and shifting control when upshifting/downshifting under the EV mode, speed adjustment and shifting control when upshifting/downshifting under the HEV mode, speed adjustment and shifting control when upshifting/downshifting under switching from the EV mode to the HEV mode, speed adjustment and shifting control when generating electric power in place to moving at gear D. This improves smoothness and comfort of the vehicle. The method is applicable to various working conditions, thereby widening the scope of usage.

In order to implement the above embodiments, the present disclosure also provides a power transmission system 100 of a hybrid vehicle.

Figure 20:
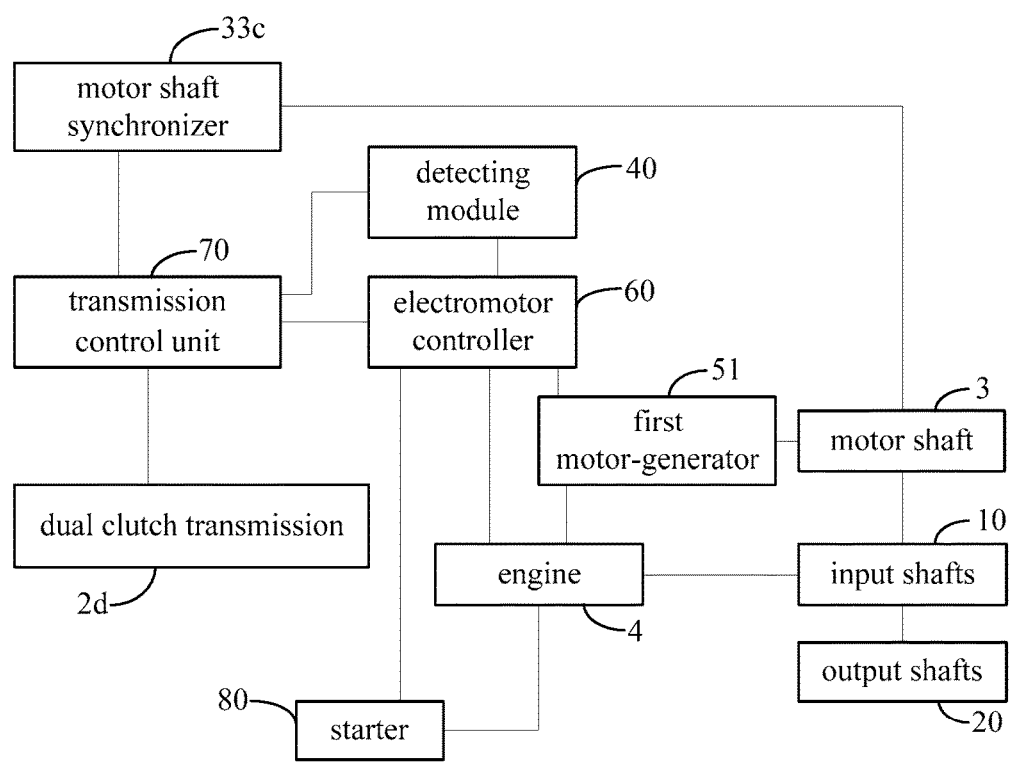
FIG. 20 is a block diagram of a power transmission system of a hybrid vehicle, according to one embodiment of the present disclosure.

Referring to FIG. 20, the power transmission system 100 of the hybrid vehicle, according to embodiments of the present disclosure, includes an engine 4, a number of input shafts 10, a number of output shafts 20, a motor shaft 3, a first motor-generator 51, a detecting module 40 and an electromotor controller 60.

The engine 4 is configured to selectively couple with at least one of the input shafts 10. A gear driving gear is set on each of the input shafts 10. The output shafts 20, a gear driven gear is set on each of the output shafts 20. The gear driven gear meshes with the gear driving gear correspondingly. The motor shaft 3 is configured to rotate together with one of the input shafts 10. The first motor-generator 51 is configured to rotate together with the motor shaft 3.

The detecting module 40 is configured to detect operating parameters of the hybrid vehicle, where the operating parameters of the hybrid vehicle include vehicle speed, vehicle acceleration as reflected from accelerator pedal signal, and a current gear of the hybrid vehicle.

The electromotor controller (ECN) 60 is configured to determine a work mode of the hybrid vehicle, and perform speed adjustment and shifting control to the first motor-generator 51 according to a work mode and the operating parameters of the hybrid vehicle to implement shifting control of the hybrid vehicle, where the work mode includes an electric-vehicle mode and a hybrid-electric-vehicle mode.

Specifically, for example, the electromotor controller 60 performs speed adjustment and shifting control to the first motor-generator 51 according to a work mode and the operating parameters of the hybrid vehicle, where there are several working conditions in performing speed adjustment and shifting control to the first motor-generator 51, for example speed adjustment and shifting control when upshifting/downshifting under the EV mode, speed adjustment and shifting control when upshifting/downshifting under the HEV mode, speed adjustment and shifting control when upshifting/downshifting under switching from the EV mode to the HEV mode, speed adjustment and shifting control when generating electric power in place to moving at gear D, etc.

In embodiments of the present disclosure, the first motor-generator 51 has three gears: a first gear, a second gear and a third gear, i.e., EV1 gear, direct gear and EV2 gear.

When the hybrid vehicle is under EV mode, as the vehicle speed increases, the first motor-generator 51 can be switched from EV1 gear to direct gear. However, when a motor shaft synchronizer 33c moves from the left position to the right position, the rotational speed of the first motor-generator 51 may not meet the requirement according to the current vehicle speed and the difference can be larger; therefore, performing speed adjustment to the first motor-generator 51 is needed until the rotational speed of the first motor-generator 51 is adjusted to a target rotational speed corresponding to a target gear. The motor shaft synchronizer 33c acts to shift. This improves smoothness and comfort of the vehicle. Detailed descriptions are made to a specific process of speed adjustment and shifting control of the first motor-generator 51 when the hybrid vehicle is under EV mode.

In one embodiment of the present disclosure, the power transmission system 100 of the hybrid vehicle further includes a transmission control unit (TCU) 70. The transmission control unit 70 communicates with the electromotor controller 60 by a communication network of the hybrid vehicle. When the work mode of the hybrid vehicle is the electric-vehicle mode, if the electromotor controller 60 determines that the first motor-generator 51 needs to be performed the shifting control according to the vehicle speed, the vehicle acceleration and the current gear of the hybrid vehicle, the electromotor controller 60 performing speed adjustment and shifting control to the first motor-generator 51 includes:

When a request gear sent by the electromotor controller 60 is the same as a target gear sent by the transmission control unit 70, the electromotor controller 60 controlling to perform a first unloading of torque to the first motor-generator 51; after the first unloading of torque of the first motor-generator 51 is finished, the transmission control unit 70 controlling the motor shaft synchronizer 33c of the power transmission system 100 to disconnect according to a motor speed adjustment request sent by the electromotor controller 60, and when the first motor-generator 51 is at neutral, the electromotor controller 60 calculating a target shifting rotational speed of the first motor-generator 51 and controlling to perform loading of torque to the first motor-generator to perform speed adjustment until a rotational speed of the first motor-generator 51 reaches a preset rotational speed range; the electromotor controller 60 controlling to perform a second unloading of torque to the first motor-generator 51 until the second unloading of torque of the first motor-generator is finished, the transmission control unit 70 controlling the motor shaft synchronizer 33c to start connecting according to the request gear sent by the electromotor controller 60 and feeding back whether the request gear of the electromotor controller 60 is shifted successfully; the electromotor controller 60 determining that the current gear of the first motor-generator 51 sent by the transmission control unit 70 is the request gear, the electromotor controller 60 determining that the first motor-generator 51 is shifted successfully.

In one embodiment of the present disclosure, the preset rotational speed range is in a preset motor shifting target rotational speed range, and the preset motor shifting target rotational speed range is obtained according to a target shifting rotational speed of the first motor-generator 51. For example, the preset motor shifting target rotational speed range is plus or minus 500 rpm on the basis of the target shifting rotational speed of the first motor-generator 51. In the preset motor shifting target rotational speed range, the motor shaft synchronizer 33c can be connected or disconnected successfully.

In one embodiment of the present disclosure, when the electromotor controller 60 determines that the first motor-generator 51 needs to be performed upshifting control, the preset rotational speed range is greater than an upper limit of a target shifting rotational speed range of the first motor-generator 51. When the electromotor controller 60 determines that the first motor-generator 51 needs to be performed downshifting control, the preset rotational speed range is smaller than a lower limit of the target shifting rotational speed range of the first motor-generator 51.

In one embodiment of the present disclosure, when performing speed adjustment and shifting control to the first motor-generator, 51 the electromotor controller 60 further performs PID adjustment to the first motor-generator 51 to reduce speed-adjustment time of the first motor-generator 51.

Specifically in embodiments of the present disclosure, the electromotor controller 60 performs PID adjustment to the first motor-generator 51 includes: obtaining a proportional coefficient, an integral time constant and a differential time constant of the first motor-generator 51 when the first motor-generator 51 outputs without load; controlling the first motor generator 51 to increase an output load, adjusting the proportional coefficient, the integral time constant and the differential time constant when outputting without load until oscillation which the first motor-generator 51 outputs disappears and recording a current proportional coefficient, a current integral time constant and a current differential time constant; and calculating an integral coefficient and a differential coefficient according the current proportional coefficient, the current integral time constant and the current differential time constant.

The following descriptions are made to a specific process of speed adjustment and shifting control of the first motor-generator 51 when the hybrid vehicle is under HEV mode.

In one embodiment of the present disclosure, when the work mode of the hybrid vehicle is the hybrid-electric-vehicle mode, if the transmission control unit 70 determines that the engine 4 needs to be performed upshifting control according to the vehicle speed and the vehicle acceleration of the hybrid vehicle, then before the electromotor controller 60 performs speed adjustment and shifting control to the first motor-generator 51, if the current gear of the first motor-generator 51 is a first gear, the electromotor controller 60 further controls a gear of the first motor-generator 51 to adjust from the first gear (EV1 gear) to a second gear (direct gear). The control process of the electromotor controller 60 performing speed adjustment and shifting control to the first motor-generator 51 is the same as that in the above embodiment.

In one embodiment of the present disclosure, the power transmission system 100 of the hybrid vehicle further includes a dual clutch transmission 2*d*, and after the electromotor controller 60 determines the first motor-generator 51 is shifted successfully, the transmission control unit 70 controls a first clutch of the dual clutch transmission 2*d* to disengage and a second clutch of the dual clutch transmission 2*d* to engage, and the electromotor controller 60 determines that the engine 4 is upshifted successfully.

The following descriptions made to a specific process of speed adjustment and shifting control of the first motor-generator 51 when the hybrid vehicle is switched from EV mode to HEV mode.

In one embodiment of the present disclosure, when the hybrid vehicle is switched from the electric-vehicle mode to the hybrid-electric-vehicle mode, the electromotor controller 60 determines whether the engine 4 needs to be started; if no, the electromotor controller 60 further determines whether the first motor-generator 51 needs to be performed speed adjustment and shifting control; if the electromotor controller 60 determines that the first motor-generator 51 needs to be performed speed adjustment and shifting control, then the electromotor controller 60 performs specific speed adjustment and shifting control to the first motor-generator 51.

In one embodiment of the present disclosure, if the electromotor controller 60 determines that the engine 4 needs to be started, and the transmission control unit 70 determines that the engine 4 needs to be performed upshifting control according to the vehicle speed and the vehicle acceleration of the hybrid vehicle, before the electromotor controller 60 performs speed adjustment and shifting control to the first motor-generator 51, the engine 4 is started by the first motor-generator 51 anti-dragging the engine 4 or directly by a starter 80. After the engine 4 is started successfully, if the current gear of the first motor-generator 51 is a first gear, the electromotor controller 60 further controls a gear of the first motor-generator 51 to adjust from the first gear (EV1 gear) to a second gear (direct gear).

In one embodiment of the present disclosure, the power transmission system 100 of the hybrid vehicle further includes a dual clutch transmission 2*d*, and after the electromotor controller 60 determines the first motor-generator 51 is shifted successfully, the transmission control unit 70 controls a first clutch of the dual clutch transmission 2*d* to disengage and a second clutch of the dual clutch transmission 2*d* to engage, and the electromotor controller 60 determines that the engine 4 is upshifted successfully.

Following are descriptions made to a specific process of speed adjustment and shifting control of the first motor-generator 51 when the hybrid vehicle is under HEV mode.

In one embodiment of the present disclosure, when the work mode of the hybrid vehicle is the hybrid-electric-vehicle mode, if the transmission control unit 70 determines that the engine needs to be performed downshifting control according to the vehicle speed and the vehicle acceleration signal of the hybrid vehicle, before the electromotor controller 60 performs speed adjustment and shifting control to the first motor-generator 51, the electromotor controller 60 further controls a gear of the first motor-generator 51 to adjust from a second gear (direct gear) to a first gear (EV1 gear).

In one embodiment of the present disclosure, the power transmission system 100 of the hybrid vehicle further includes a dual clutch transmission 2*d*, and after the electromotor controller 60 determines the first motor-generator 51 is shifted successfully, the transmission control unit 70 controls a first clutch of the dual clutch transmission 2*d* to disengage and a second clutch of the dual clutch transmission 2*d* to engage, and the electromotor controller 60 determines that the engine 4 is downshifted successfully.

In one embodiment of the present disclosure, when the hybrid vehicle is switched from the electric-vehicle mode to the hybrid-electric-vehicle mode, if the electromotor controller 60 determines that the engine 4 needs to be started, and the transmission control unit 70 determines that the engine 4 needs to be performed downshifting control according to the vehicle speed and the vehicle acceleration of the hybrid vehicle, before the electromotor controller 60 performs speed adjustment and shifting control to the first motor-generator 51, the engine 4 is started by the first motor-generator 51 anti-dragging the engine 4 or directly by a starter 80, and after the engine 4 is started successfully, if the current gear of the first motor-generator 51 is a second gear (direct gear), the electromotor controller 60 further controls a gear of the first motor-generator 51 to adjust from the second gear (direct gear) to a first gear (EV1 gear).

In one embodiment of the present disclosure, the power transmission system 100 of the hybrid vehicle further includes a dual clutch transmission 2*d*, and after the electromotor controller 60 determines the first motor-generator 51 is shifted successfully, the transmission control unit 70 controls a first clutch of the dual clutch transmission 2*d* to disengage and a second clutch of the dual clutch transmission 2*d* to engage, and the electromotor controller 60 determining that the engine 4 is downshifted successfully.

When the vehicle stays in place to generate electric power, and the second clutch engages, and the motor shaft synchronizer 33*c* moves downward. At this time, the engine 4 drives the first motor-generator 51 to generate electric power at a certain rotational speed. When the gear is switched to gear D to be ready to move, at this time, speed adjustment needs to be performed to the first motor-generator 51, causing its rotational speed to zero. Then shifting is performed to the first motor-generator. If the engine 4 is stopped at this time while the speed adjustment and shifting of the first motor-generator 51 needs a certain time to be finished, the first motor-generator 51 cannot respond in time to the accelerator opening degree, resulting in the delayed movement of vehicle. In order to avoid the above situation, when a battery charge increases above a certain valve, and the vehicle speed>0, and vehicle speed start-stop conditions are met or HEV mode is switched to EV mode, the engine 4 is stopped at this time. Otherwise the engine 4 will not be stopped until the vehicle speed is zero and the battery charge exceeds a limited point of generating electric power in place.

Specifically, following are descriptions made to, when generating electric power in place to moving at gear D, a specific process of speed adjustment and shifting control of the first motor-generator 51.

In one embodiment of the present disclosure, when the hybrid vehicle stays in place and the engine 4 drives the first motor-generator 51 to generate electric power, if the current gear of the hybrid vehicle is gear D, a transmission control unit 70 controls the engine 4 to be pre-shifted to gear one and controls a gear-one-three synchronizer in the power transmission system 100 to move towards a first direction (i.e., move right). After a brake pedal of the hybrid vehicle is released and the electromotor controller 60 cancels generating electric power in place of the hybrid vehicle and the transmission control unit 70 controls a first clutch to engage, the electromotor controller 60 performs speed adjustment and shifting control to the first motor-generator 51 includes:

the electromotor controller 60 controlling to perform unloading of generating-electric-power torque to the first motor-generator 51 and the engine 4, and an engine controller in the power transmission system 100 controlling the engine 4 to keep at a running state; after the unloading of generating-electric-power torque of the first motor-generator 51 and the engine is finished, the transmission control unit 70 controlling a second clutch to disengage, the electromotor controller 60 controlling to perform loading of torque to the first motor-generator 51 to perform speed adjustment until a rotational speed of the first motor-generator 51 reaches a target rotational speed of the first motor-generator 51; when the rotational speed of the first motor-generator 51 reaches the target rotational speed of the first motor-generator 51, the electromotor controller 60 controlling to perform unloading of torque to the first motor-generator 51 until the unloading of torque of the first motor-generator 51 is finished, the transmission control unit 70 controlling a gear-two-four synchronizer in the power transmission system 100 to engage with a motor shaft synchronizer 33c, the electromotor controller 60 determining that the first motor-generator 51 is shifted successfully.

In one embodiment of the present disclosure, the motor shaft 3 is further configured to rotate together with one of the output shafts 10. When the motor shaft 10 engages with the one of the output shafts 20, the first motor-generator 51 is capable of outputting driving force generated through the one of the output shafts 20. The power transmission system 100 further includes: a motor shaft synchronizer 33c, the motor shaft synchronizer 33c being set on the motor shaft 3, the motor shaft 3 being configured to selectively engage with one of the input shafts 10 or one of the output shafts 20 through synchronization of the motor shaft synchronizer 33c.

In one embodiment of the present disclosure, the power transmission system 100 further includes: a first motor shaft gear and a second motor shaft gear. The first motor gear and the second motor shaft gear are sleeved on the motor shaft 3. The first motor shaft gear is configured to rotate together with one of the input shafts 10. The second motor shaft gear is configured to rotate together with one of the output shafts 20. The motor shaft synchronizer 33c is set between the first motor shaft gear and the second motor shaft gear.

In one embodiment of the present disclosure, during switching of engagement of the motor shaft synchronizer 33c with one of the first motor shaft gear or the second motor shaft gear to another of the first motor shaft gear or the second motor shaft gear, the first motor-generator 51 is configured to perform speed adjustment to the motor shaft using a rotational speed of the another of the first motor shaft gear or the second motor shaft gear as a target, to make a gear of the first motor-generator switch between a first gear and a second gear.

According to the power transmission system of the hybrid vehicle of embodiments of the present disclosure, the detecting module 40 detects operating parameters of the hybrid vehicle. The electromotor controller 60 determines a work mode of the hybrid vehicle, then performs speed adjustment and shifting control to the first motor-generator 51 according to work mode and the operating parameters of the hybrid vehicle to implement shifting control of the hybrid vehicle. The system 100 includes various working conditions for performing speed adjustment and shifting control to the first motor-generator 51, for example, speed adjustment and shifting control when upshifting/downshifting under the EV mode, speed adjustment and shifting control when upshifting/downshifting under the HEV mode, speed adjustment and shifting control when upshifting/downshifting under switching from the EV mode to the HEV mode, speed adjustment and shifting control when generating electric power in place to moving at gear D. This improves smoothness and comfort of the vehicle. The system 100 considers a lot of working conditions, thereby making the use scope wider.

In order to implement the above embodiments, the present disclosure further provides a hybrid vehicle. The hybrid vehicle includes a power transmission system 100 of the hybrid vehicle of the embodiments of the present disclosure.

Because the hybrid vehicle of embodiments of the present disclosure has the power transmission system 100 of the hybrid vehicle, and considers performing speed adjustment and shifting control under various working conditions. This improves smoothness and comfort of the vehicle and enlarges the use scope.

In descriptions of the present disclosure, it is understood that, the direction or position relationships, which are defined by terms such as "center", "longitudinal", "lateral", "length", "width", "thickness", "up", "down", "front", "rear", "left", "right", "vertical", "horizontal", "top", "bottom", "inside", "outside", "clockwise", "counterclockwise", "axial", "radial", "circumferential", etc., are based on direction or position relationships shown in the figures. They are only used for convenience of describing the present disclosure and simplifying the descriptions and are not intended to indicate or imply specific directions, specific structures and operations which the device or the element must have. Therefore, they cannot be understood as a limitation to the present disclosure.

In addition, terms such as "first" and "second" are used herein for purposes of description and are not intended to indicate or imply relative importance or significance or imply a number of technical features indicated. Therefore, a "first" or "second" feature may explicitly or implicitly include one or more features. Further, in the description, unless indicated otherwise, "a number of" refers to two or more.

In the present disclosure, unless indicated otherwise, terms such as "install", "connect", "fix", etc., should be understood broadly. For example, it can be a fixed connection, it also can be a detachable connection or an integration. It can be a mechanical connection, or can be an electrical connection. It can be a direct connection and also can be an indirect connection through an intermediate media. It can be a connection inside two elements or mutual relationships of two elements, unless indicated otherwise. For those skilled in the art, specific meaning of the above terms in the present disclosure can be understood according to specific situations.

In the present disclosure, unless indicated otherwise, a first feature "on" or "under" a second feature may include an embodiment in which the first feature directly contacts the second feature, and may also include an embodiment in which an additional feature is formed between the first feature and the second feature so that the first feature does not directly contact the second feature.

Reference throughout this specification to "an embodiment", "some embodiments", "one embodiment", "an example", "a specific example", or "some examples" means that a particular feature, structure, material, or characteristic described in connection with the embodiment or example is included in at least one embodiment or example of the disclosure. In the descriptions, expressions of the above terms does not need for same embodiments or examples. Furthermore, the feature, structure, material, or characteristic described can be incorporated in a proper way in any one or more embodiments or examples. In addition, under non-conflicting condition, those skilled in the art can incorporate or combine features described in different embodiments or examples.

Although explanatory embodiments have been shown and described, it would be appreciated by those skilled in the art that changes, alternatives, and modifications may be made in the embodiments without departing from spirit and principles of the disclosure. Such changes, alternatives, and modifications all fall into the scope of the claims and their equivalents.

What is claimed is:

1. A shifting control method for a vehicle comprising:
   detecting operating parameters of the vehicle, wherein the operating parameters of the vehicle comprises vehicle speed, vehicle acceleration as reflected from an accelerator-pedal signal, and a current gear of the vehicle;
   determining a work mode of the vehicle; and
   performing speed adjustment and shifting control to a first motor-generator of the vehicle configured to rotate together with a motor shaft of the vehicle according to the operating parameters of the vehicle and work modes to implement shifting control of the vehicle, wherein the motor shaft of the vehicle is configured to rotate together with one of input shafts, wherein the work modes comprises an electric-vehicle mode and a hybrid-electric-vehicle mode, and wherein when the work mode of the vehicle is the electric-vehicle mode, performing speed adjustment and shifting control to the first motor-generator comprises:
      controlling, by an electromotor controller, to perform a first unloading of torque to the first motor-generator, after determining that a request gear sent by the electromotor controller is the same as a target gear sent by a transmission control unit;
      after the first unloading of torque of the first motor-generator is finished, controlling, by the transmission control unit, a motor shaft synchronizer of the power transmission system to disconnect according to a motor speed adjustment request sent by the electromotor controller, and when the first motor-generator is at neutral, calculating, by the electromotor controller, a target shifting rotational speed of the first motor-generator and controlling, by the electromotor controller, to perform loading of torque to the first motor-generator to perform speed adjustment until a rotational speed of the first motor-generator reaches a preset rotational speed range;
      controlling, by the electromotor controller, to perform a second unloading of torque to the first motor-generator until the second unloading of torque of the first motor-generator is finished, controlling, by the transmission control unit, the motor shaft synchronizer to start connecting according to the request gear sent by the electromotor controller and feeding back, by the transmission control unit, whether the request gear of the electromotor controller is shifted successfully; and
      determining, by the electromotor controller, that the current gear of the first motor-generator sent by the transmission control unit is the request gear, and determining, by the electromotor controller, that the first motor-generator is shifted successfully.

2. The method of claim 1, wherein the preset rotational speed range is in a preset motor shifting target rotational speed range, and the preset motor shifting target rotational speed range is obtained according to the target shifting rotational speed of the first motor-generator.

3. The method of claim 1, wherein when the electromotor controller determines that the first motor-generator needs to be performed upshifting control, the preset rotational speed range is greater than an upper limit of a target shifting rotational speed range of the first motor-generator; and
   when the electromotor controller determines that the first motor-generator needs to be performed downshifting control, the preset rotational speed range is smaller than a lower limit of the target shifting rotational speed range of the first motor-generator.

4. The method of claim 1, when performing speed adjustment and shifting control to the first motor-generator, further comprising:
   performing, by the electromotor controller, PID adjustment to the first motor-generator to reduce speed-adjustment time of the first motor-generator.

5. The method of claim 4, wherein performing, by the electromotor controller, PID adjustment to the first motor-generator comprises:
   obtaining a proportional coefficient, an integral time constant and a differential time constant of the first motor-generator when the first motor-generator outputs without load;
   controlling the first motor generator to increase an output load, adjusting the proportional coefficient, the integral time constant and the differential time constant when outputting without load until oscillation which the first motor-generator outputs disappears and recording a current proportional coefficient, a current integral time constant and a current differential time constant; and
   calculating an integral coefficient and a differential coefficient according the current proportional coefficient, the current integral time constant and the current differential time constant.

6. The method of claim 1, wherein, when the work mode of the vehicle is the hybrid-electric-vehicle mode, if the transmission control unit determines that an engine needs an upshifting control according to the vehicle speed and the vehicle acceleration of the vehicle, performing speed adjustment and shifting control to the first motor-generator comprises:
  if the current gear of the first motor-generator is a first gear, controlling a gear of the first motor-generator to adjust from the first gear to a second gear;
  controlling, by the electromotor controller, to perform the first unloading of torque to the first motor-generator, after determining that the request gear sent by the electromotor controller is the same as the target gear sent by the transmission control unit;
  after the first unloading of torque of the first motor-generator is finished, controlling, by the transmission control unit, the motor shaft synchronizer of the power transmission system to disconnect according to the motor speed adjustment request sent by the electromotor controller, and when the first motor-generator is at neutral, calculating, by the electromotor controller, the target shifting rotational speed of the first motor-generator and controlling, by the electromotor controller, to perform loading of torque to the first motor-generator to perform speed adjustment until the rotational speed of the first motor-generator reaches the preset rotational speed range;
  controlling, by the electromotor controller, to perform the second unloading of torque to the first motor-generator until the second unloading of torque of the first motor-generator is finished, controlling, by the transmission control unit, the motor shaft synchronizer to start connecting according to the request gear sent by the electromotor controller and feeding back, by the transmission control unit, whether the request gear of the electromotor controller is shifted successfully; and
  determining, by the electromotor controller, that the current gear of the first motor-generator sent by the transmission control unit is the request gear, and determining, by the electromotor controller, that the first motor-generator is shifted successfully.

7. The method of claim 1, wherein, when the hybrid vehicle is switched from the electric-vehicle mode to the hybrid-electric-vehicle mode, the electromotor controller determines whether an engine needs to be started;
  if no, the electromotor controller further determines whether the first motor-generator needs to be performed speed adjustment and shifting control;
  if the electromotor controller determines that the first motor-generator needs to be performed speed adjustment and shifting control, controlling, by the electromotor controller, to perform the first unloading of torque to the first motor-generator, after determining that the request gear sent by the electromotor controller is the same as the target gear sent by the transmission control unit;
  after the first unloading of torque of the first motor-generator is finished, controlling, by the transmission control unit, the motor shaft synchronizer of the power transmission system to disconnect according to the motor speed adjustment request sent by the electromotor controller, and when the first motor-generator is at neutral, calculating, by the electromotor controller, the target shifting rotational speed of the first motor-generator and controlling, by the electromotor controller, to perform loading of torque to the first motor-generator to perform speed adjustment until the rotational speed of the first motor-generator reaches the preset rotational speed range;
  controlling, by the electromotor controller, to perform the second unloading of torque to the first motor-generator until the second unloading of torque of the first motor-generator is finished, controlling, by the transmission control unit, the motor shaft synchronizer to start connecting according to the request gear sent by the electromotor controller and feeding back, by the transmission control unit, whether the request gear of the electromotor controller is shifted successfully; and
  determining, by the electromotor controller, that the current gear of the first motor-generator sent by the transmission control unit is the request gear, and determining, by the electromotor controller, that the first motor-generator is shifted successfully.

8. The method of claim 7, wherein if the electromotor controller determines that the engine needs to be started, and the transmission control unit determines that the engine needs to be performed upshifting control according to the vehicle speed and the vehicle acceleration of the vehicle, before controlling, by the electromotor controller, to perform the first unloading of torque to the first motor-generator and after determining that the request gear sent by the electromotor controller is the same as the target gear sent by the transmission control unit, performing speed adjustment and shifting control to the first motor-generator comprises:
  starting the engine by the first motor-generator anti-dragging the engine or directly by a starter; and
  after the engine is started successfully, if the current gear of the first motor-generator is a first gear, controlling a gear of the first motor-generator to adjust from the first gear to a second gear.

9. The method of claim 1, wherein, when the work mode of the vehicle is the hybrid-electric-vehicle mode, if the transmission control unit determines that the engine needs to be performed downshifting control according to the vehicle speed and the vehicle acceleration of the vehicle, performing speed adjustment and shifting control to the first motor-generator comprises:
  controlling a gear of the first motor-generator to adjust from a second gear to a first gear; controlling, by the electromotor controller, to perform the first unloading of torque to the first motor-generator, after determining that the request gear sent by the electromotor controller is the same as the target gear sent by the transmission control unit; after the first unloading of torque of the first motor-generator is finished, controlling, by the transmission control unit, the motor shaft synchronizer of the power transmission system to disconnect according to the motor speed adjustment request sent by the electromotor controller, and when the first motor-generator is at neutral, calculating, by the electromotor controller, the target shifting rotational speed of the first motor-generator and controlling, by the electromotor controller, to perform loading of torque to the first motor-generator to perform speed adjustment until the rotational speed of the first motor-generator reaches the preset rotational speed range;
  controlling, by the electromotor controller, to perform the second unloading of torque to the first motor-generator until the second unloading of torque of the first motor-generator is finished, controlling, by the transmission control unit, the motor shaft synchronizer to start connecting according to the request gear sent by the electromotor controller and feeding back, by the transmission control unit, whether the request gear of the electromotor controller is shifted successfully; and determining, by the electromotor controller, that the current gear of the first motor-generator sent by the transmission control unit is the request gear, and determining, by the electromotor controller, that the first motor-generator is shifted successfully.

10. The method of claim 6, wherein, if the electromotor controller determines that the engine needs to be started, and the transmission control unit determines that the engine needs to be performed downshifting control according to the vehicle speed and the vehicle acceleration of the vehicle, before controlling, by the electromotor controller, to perform the first unloading of torque to the first motor-generator and after determining that the request gear sent by the electromotor controller is the same as the target gear sent by the transmission control unit, performing speed adjustment and shifting control to the first motor-generator comprises:

starting the engine by the first motor-generator anti-dragging the engine or directly by a starter; and after the engine is started successfully, if the current gear of the first motor-generator is the second gear, controlling the gear of the first motor-generator to adjust from the second gear to the first gear.

11. The method of claim 10, wherein the power transmission system further comprises a dual clutch transmission, and after determining the first motor-generator is shifted successfully, the transmission control unit controls a first clutch of the dual clutch transmission to disengage and a second clutch of the dual clutch transmission to engage, and determines that the engine is downshifted successfully.

12. The method of claim 1, wherein, when the vehicle stays in place and an engine drives the first motor-generator to generate electric power, if the current gear of the vehicle is gear D, the transmission control unit controls the engine to be pre-shifted to gear one and controls a gear-one-three synchronizer in the power transmission system to move towards a first direction, after a brake pedal of the vehicle is released and the electromotor controller cancels generating electric power in place of the vehicle and the transmission control unit controls a first clutch to engage, performing speed adjustment and shifting control to the first motor-generator comprises:

controlling, by the electromotor controller, to perform unloading of generating-electric-power torque to the first motor-generator and the engine, and controlling, by an engine controller, the engine to keep at a running state;

after the unloading of generating-electric-power torque of the first motor-generator and the engine is finished, controlling, by the transmission control unit, a second clutch to disengage, controlling, by the electromotor controller, to perform loading of torque to the first motor-generator to perform speed adjustment until the rotational speed of the first motor-generator reaches the target rotational speed of the first motor-generator; and when the rotational speed of the first motor-generator reaches the target rotational speed of the first motor-generator, controlling, by the electromotor controller, to perform unloading of torque to the first motor-generator until the unloading of torque of the first motor-generator is finished, controlling, by the transmission control unit, a gear-two-four synchronizer in the power transmission system to engage with the motor shaft synchronizer, determining, by the transmission control unit, that the first motor-generator is shifted successfully.

13. A power transmission system of a vehicle, comprising:

a plurality of input shafts, a gear driving gear being set on each of the input shafts;

a plurality of output shafts, a gear driven gear being set on each of the output shafts, the gear driven gear meshing with the gear driving gear correspondingly;

a motor shaft, the motor shaft being configured to rotate together with one of the input shafts;

a first motor-generator, the first motor-generator being configured to rotate together with the motor shaft;

a detecting module configured to detect operating parameters of the vehicle, wherein the operating parameters of the vehicle comprises a vehicle speed, vehicle acceleration as reflected from an accelerator-pedal signal and a current gear of the vehicle;

an electromotor controller configured to perform speed adjustment and shifting control to the first motor-generator according to work mode and the operating parameters of the vehicle to implement shifting control of the vehicle, wherein the work modes comprises an electric-vehicle mode and a hybrid-electric-vehicle mode; and a transmission control unit, the transmission control unit communicating with the electromotor controller by a communication network of the vehicle, wherein when the work mode of the vehicle is the electric-vehicle mode, if the electromotor controller determines that the first motor-generator needs to be performed the shifting control according to the vehicle speed, the vehicle acceleration and the current gear of the hybrid vehicle, the electromotor controller performing speed adjustment and shifting control to the first motor-generator comprises:

when a request gear sent by the electromotor controller is the same as a target gear sent by the transmission control unit, the electromotor controller controlling to perform a first unloading of torque to the first motor-generator;

after the first unloading of torque of the first motor-generator is finished, the transmission control unit controlling a motor shaft synchronizer of the power transmission system to disconnect according to a motor speed adjustment request sent by the electromotor controller, and when the first motor-generator is at neutral, the electromotor controller calculating a target shifting rotational speed of the first motor-generator and controlling to perform loading of torque to the first motor-generator to perform speed adjustment until a rotational speed of the first motor-generator reaches a preset rotational speed range;

the electromotor controller controlling to perform a second unloading of torque to the first motor-generator until the second unloading of torque of the first motor-generator is finished, the transmission control unit controlling the motor shaft synchronizer to start connecting according to the request gear sent by the electromotor controller and feeding back whether the request gear of the electromotor controller is shifted successfully; and the electromotor controller determining that the current gear of the first motor-generator sent by the transmission control unit is the request gear, the electromotor controller determining that the first motor-generator is shifted successfully.

14. The system of claim 13, wherein the preset rotational speed range is in a preset motor shifting target rotational speed range, and the preset motor shifting target rotational speed range is obtained according to the target shifting rotational speed of the first motor-generator; and wherein:
when the electromotor controller determines that the first motor-generator needs to be performed upshifting control, the preset rotational speed range is greater than an upper limit of a target shifting rotational speed range of the first motor-generator; and
when the electromotor controller determines that the first motor-generator needs to be performed downshifting control, the preset rotational speed range is smaller than a lower limit of the target shifting rotational speed range of the first motor-generator.

15. The system of claim 13, wherein when performing speed adjustment and shifting control to the first motor-generator, the electromotor controller further performs PID adjustment to the first motor-generator to reduce speed-adjustment time of the first motor-generator; wherein the electromotor controller performing PID adjustment to the first motor-generator comprises:

obtaining a proportional coefficient, an integral time constant and a differential time constant of the first motor-generator when the first motor-generator outputs without load; controlling the first motor generator to increase an output load, adjusting the proportional coefficient, the integral time constant and the differential time constant when outputting without load until oscillation which the first motor-generator outputs disappears and recording a current proportional coefficient, a current integral time constant and a current differential time constant; and
calculating an integral coefficient and a differential coefficient according the current proportional coefficient, the current integral time constant and the current differential time constant.

16. A hybrid vehicle, comprising the power transmission system of the hybrid vehicle of claim 13.

* * * * *